US012480747B2

(12) United States Patent
Sender et al.

(10) Patent No.: US 12,480,747 B2
(45) Date of Patent: Nov. 25, 2025

(54) CIRCUITRY TO DETECT DIFFERENCE BETWEEN LEAD LINE AND TARGET HITS

(71) Applicant: PLAN ALPHA LTD., Raanana (IL)

(72) Inventors: Haim Sender, Ganei Tal (IL); Tamir Weiss, Nechusha (IL)

(73) Assignee: PLAN ALPHA LTD., Raanan (IL)

( * ) Notice: Subject to any disclaimer, the term of this patent is extended or adjusted under 35 U.S.C. 154(b) by 529 days.

(21) Appl. No.: 17/797,938

(22) PCT Filed: Feb. 9, 2021

(86) PCT No.: PCT/IB2021/000069
§ 371 (c)(1),
(2) Date: Aug. 5, 2022

(87) PCT Pub. No.: WO2021/161097
PCT Pub. Date: Aug. 19, 2021

(65) Prior Publication Data
US 2023/0061730 A1 Mar. 2, 2023

Related U.S. Application Data

(60) Provisional application No. 62/972,202, filed on Feb. 10, 2020.

(51) Int. Cl.
*F41J 5/048* (2006.01)
*F41J 5/04* (2006.01)

(52) U.S. Cl.
CPC .................................. *F41J 5/041* (2013.01)

(58) Field of Classification Search
None
See application file for complete search history.

(56) References Cited

U.S. PATENT DOCUMENTS 4,357,531 A   11/1982  Knight
4,786,058 A * 11/1988  Baughman ................ F41J 5/04
                                                    273/371
(Continued)

FOREIGN PATENT DOCUMENTS

WO   WO 200/8033839 A2   3/2008

OTHER PUBLICATIONS

International Search Report and Written Opinion issued in PCT International Application No. PCT/IB2021/000069, dated Aug. 30, 2021 (19 pages).

(Continued)

*Primary Examiner* — Sunit Pandya
(74) *Attorney, Agent, or Firm* — Finnegan, Henderson, Farabow, Garrett & Dunner, LLP

(57) ABSTRACT

Circuitry for use in connection with a conductive target may include an interface, a conductive target zone, a plurality of conductive lead lines electrically connecting the interface to the at least one conductive target zone, and at least one processor. The at least one processor may detect via the interface, a first electrical signal representing severance of a portion of the conductive target zone by a projectile hit within the at least one conductive target zone; detect via the interface a second electrical signal, different from the first electrical signal, wherein the second electrical signal represents severance of one of the plurality of lead lines by a projectile hit on the one of the plurality of lead lines; trigger an indicator of a target hit in response to the first electrical signal; and prevent triggering of the target hit indicator in response to the second electrical signal.

21 Claims, 39 Drawing Sheets

(56) References Cited

U.S. PATENT DOCUMENTS

| | | | |
|---|---|---|---|
| 5,669,608 A | 9/1997 | Thomson et al. | |
| 8,523,185 B1 | 9/2013 | Gilbreath et al. | |
| 10,670,377 B2* | 6/2020 | Tessel | F41J 5/048 |
| 11,047,653 B1* | 6/2021 | Sender | F41J 5/04 |
| 2014/0091816 A1* | 4/2014 | Hodge | F41J 5/048 |
| | | | 324/679 |
| 2015/0369572 A1* | 12/2015 | Smolka | F41J 5/14 |
| | | | 273/371 |
| 2016/0379414 A1 | 12/2016 | Brown et al. | |
| 2017/0045338 A1 | 2/2017 | McGovern | |
| 2017/0059285 A1 | 3/2017 | Crivolio et al. | |
| 2018/0372458 A1* | 12/2018 | Janssen | F41G 3/26 |

OTHER PUBLICATIONS

Trainshot, "Trainshot electronic unit & targets manual", pp. 1-11, year 2018.
Trainshot, "Trainshot extender manual", pp. 1-3, year 2018.
Trainshot, "Trainshot long range communication unit", pp. 1-5, year 2018.
Trainshot, "Interactive smart shooting reactive targets", pp. 1-5, year 2018.
Trainshot, "Kits for smart target shooting", pp. 1-7, year 2018.

* cited by examiner

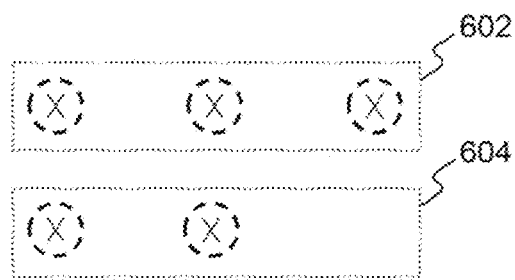
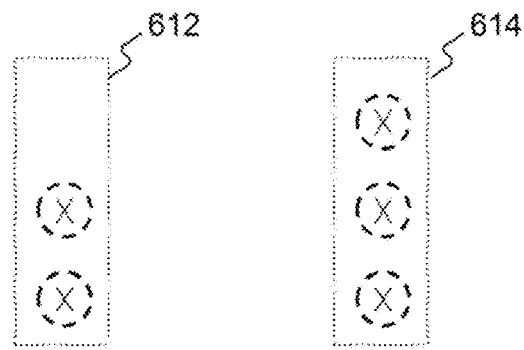
FIG. 6A                FIG. 6B
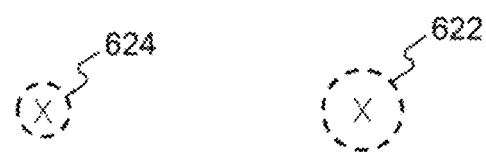
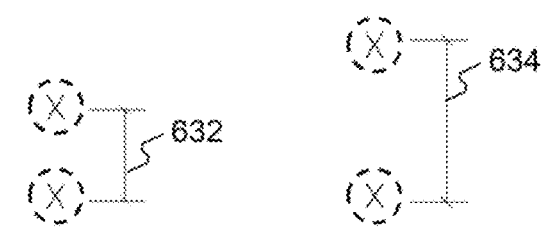
FIG. 6C                FIG. 6D

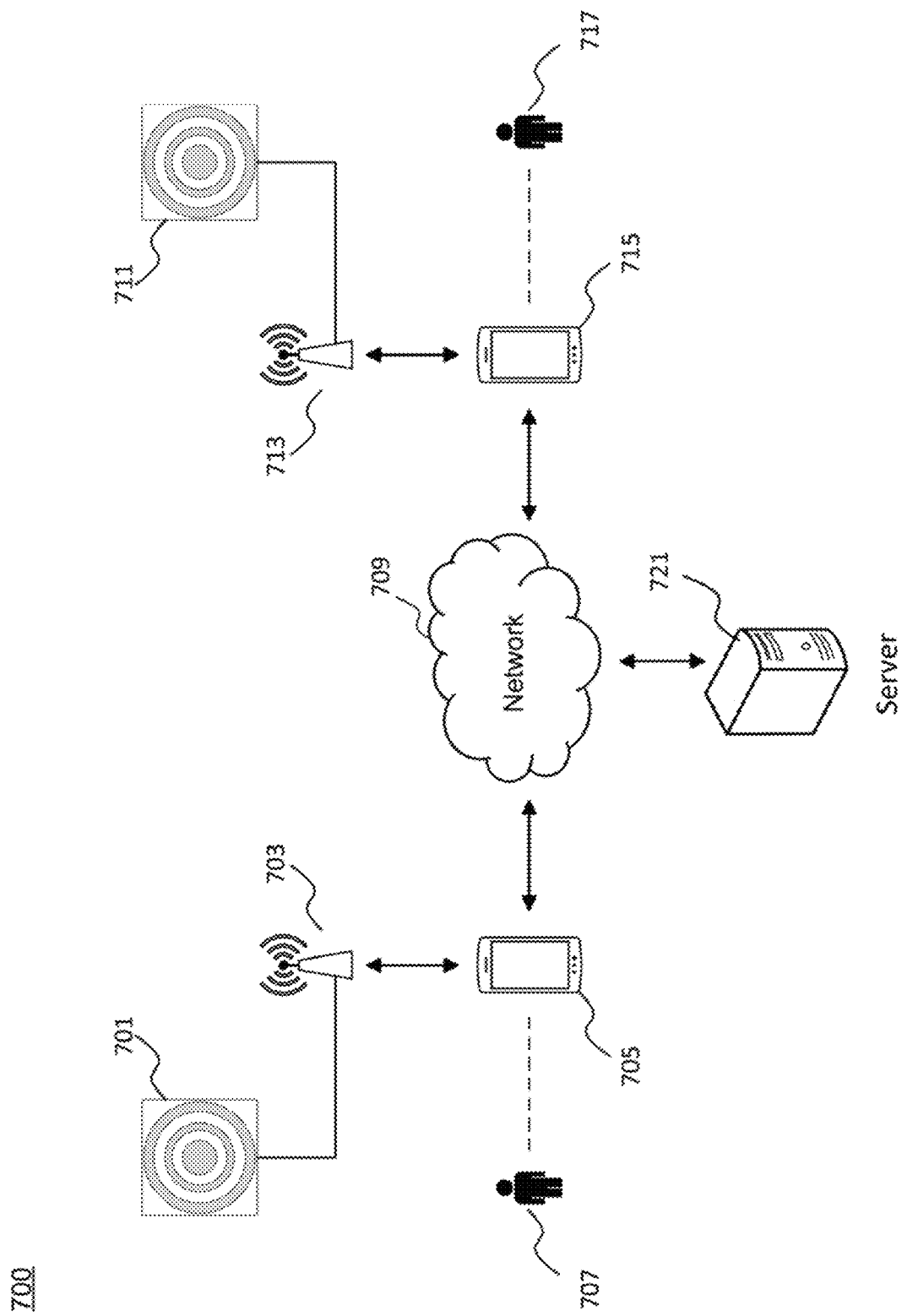

900

PAIRING A FIRST WIRELESS TRANSMITTER, TEMPORARILY ATTACHED TO A FIRST DISPOSABLE TARGET, WITH A FIRST MOBILE COMMUNICATIONS DEVICE ASSOCIATED WITH A FIRST SHOOTER
901

WIRELESSLY RECEIVING FROM THE FIRST TRANSMITTER, IN A FIRST WIRELESS HOP, SIGNALS INDICATIVE OF PROJECTILE HITS ON THE FIRST DISPOSABLE TARGET
903

ACCESSING INFORMATION INDICATIVE OF AN IDENTITY OF THE FIRST SHOOTER
905

ACCESSING AN ADDRESS OF A REMOTE SERVER WHERE A RECORD ASSOCIATED WITH THE FIRST SHOOTER IS MAINTAINED
907

CAUSING A SECOND WIRELESS TRANSMITTER LOCATED IN THE FIRST MOBILE COMMUNICATIONS DEVICE TO TRANSMIT THE INFORMATION INDICATIVE OF THE FIRST SHOOTER'S IDENTITY AND INFORMATION INDICATIVE OF PROJECTILE HITS
909

PAIRING A THIRD WIRELESS TRANSMITTER, TEMPORARILY ATTACHED TO A SECOND DISPOSABLE TARGET, WITH A SECOND MOBILE COMMUNICATIONS DEVICE ASSOCIATED WITH A SECOND SHOOTER
911

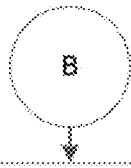

WIRELESSLY RECEIVING FROM THE THIRD WIRELESS TRANSMITTER, IN A THIRD WIRELESS HOP, SIGNALS INDICATIVE OF PROJECTILE HITS ON THE SECOND DISPOSABLE TARGET
913

ACCESSING INFORMATION INDICATIVE OF AN IDENTITY OF THE SECOND SHOOTER
915

ACCESSING THE ADDRESS OF THE REMOTE SERVER WHERE A RECORD ASSOCIATED WITH THE SECOND SHOOTER IS MAINTAINED
917

CAUSING A FOURTH WIRELESS TRANSMITTER LOCATED IN THE SECOND MOBILE COMMUNICATIONS DEVICE TO TRANSMIT IN A FOURTH HOP TO THE REMOTE SERVER FOR STORAGE IN THE SECOND SHOOTER'S ASSOCIATED RECORD, THE INFORMATION INDICATIVE OF THE SECOND SHOOTER'S IDENTITY AND INFORMATION INDICATIVE OF PROJECTILE HITS ON THE SECOND DISPOSABLE TARGET
919

TRANSMITTING FOR DISPLAY TO THE SECOND SHOOTER ON THE SECOND MOBILE COMMUNICATIONS DEVICE, INFORMATION ABOUT THE PROJECTILE HITS ON THE FIRST TARGET BY THE FIRST SHOOTER
921

TRANSMITTING FOR DISPLAY TO THE FIRST SHOOTER ON THE FIRST MOBILE COMMUNICATIONS DEVICE, INFORMATION ABOUT THE PROJECTILE HITS ON THE SECOND TARGET BY THE SECOND SHOOTER
923

RECEIVING FROM A MOBILE COMMUNICATIONS DEVICE OF A SHOOTER, TARGET HIT DATA OBTAINED VIA ELECTRONIC CIRCUITRY TEMPORARILY CONNECTED TO A DISPOSABLE CONDUCTIVE TARGET
1101

RECEIVING FROM THE MOBILE COMMUNICATIONS DEVICE OF THE SHOOTER, IDENTITY INFORMATION OF THE SHOOTER
1103

RECEIVING FROM THE MOBILE COMMUNICATIONS DEVICE OF THE SHOOTER, GPS LOCATION DATA REFLECTIVE OF A LOCATION WHERE SHOTS FROM WHICH THE TARGET HIT DATA WAS GENERATED WERE FIRED
1105

UPDATING A DATABASE, ASSOCIATING THE LOCATION WITH THE IDENTITY INFORMATION OF THE SHOOTER AND THE TARGET HIT DATA
1107

FIG. 10B

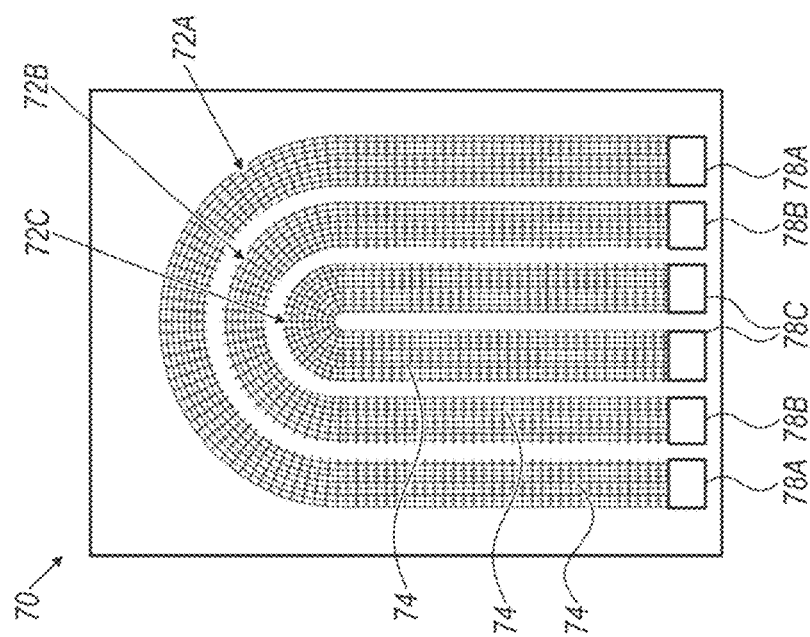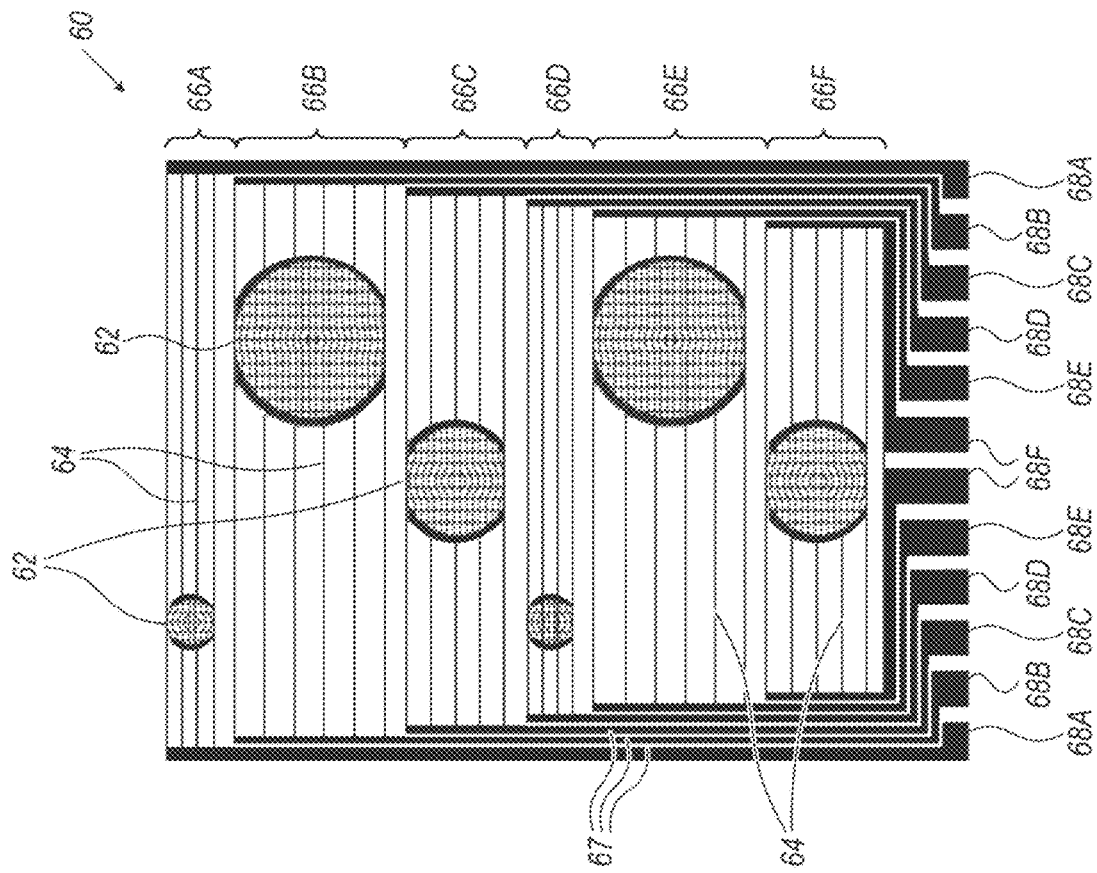

CIRCUITRY TO DETECT DIFFERENCE BETWEEN LEAD LINE AND TARGET HITS

CROSS REFERENCES TO RELATED APPLICATIONS

This application is a National Stage filing under 35 U.S.C. § 371 of International Application No. PCT/IB2021/000069, filed on Feb. 9, 2021, which is based on and claims benefit of priority of U.S. Provisional Patent Application No. 62/972,202, filed Feb. 10, 2020. The foregoing applications are incorporated herein by reference in their entirety.

BACKGROUND

Technical Field

The present disclosure relates generally to systems and methods for use with target shooting. In particular, the disclosed systems and methods may involve automatically detecting hits on conductive shooting targets.

Background Information

Conventional shooting ranges often feature paper or cardboard targets with a printed image. For example, users may fire bullets or other projectiles at these targets for training, practice, firearm usage qualifications, or competitions. Users must often manually inspect the targets to determine a number target hits and asses the user's performance. This process may lead to inefficiencies as a user must often wait for a "cease fire" period to collect and examine the target. Accordingly, the user does not have access to real-time statistics regarding his or her performance. Further, competitions or other statistical information is limited to users within the immediate vicinity of the target. Therefore, there is a need for unconventional approaches for automatically monitoring and analyzing projectile hits on a target in real time. Solutions should advantageously include mechanisms to ensure that external circuitry attached to a target for monitoring target hits is properly aligned.

Further, in the competitive shooting, players are typically located at a common location, such as a shooting range. In this way, shooters are able to compete in real time, monitoring each other's progress. Until now, shooters in different geographic locations had limited opportunity to effectively compete in real time. And even for shooters who do not compete in real time, tracking shooting improvement over time and comparing progress and scores with peers, whether locally or worldwide was cumbersome. In contrast, aspects of the current disclosure relate to unconventional approaches that efficiently and effectively permit competitions between shooters in different geographic locations and/or tracking of performance to permit self-comparison and comparisons between shooters, regardless of location.

Additionally, many shooting ranges, whether public or private, tend to lack the technology to track shooter attendance and performance, and take dynamic actions based on the tracked data. Shooters may wish to electronically track the ranges they have visited, and compare their statistics to other shooters. Shooters also may wish to tie their performance data (e.g., hits on target or scores) to specific shooting ranges, for example, to determine whether they perform better at one range as compared to another. Certain shooters may also visit various ranges at specific times or in specific intervals. Accordingly, the shooters may be receptive to particular offers or advertisements tailored to the timing of their visits. Therefore, aspects of the current disclosure relate to unconventional approaches that efficiently and effectively permit location based monitoring of shooters' shooting range visits and shooting performance.

SUMMARY

Embodiments consistent with the present disclosure provide systems and methods monitoring shooting performance using conductive targets, the disclosed systems and methods may be implemented using a combination of conventional hardware and software as well as specialized hardware and software, such as a machine constructed and/or programmed specifically for performing functions associated with the disclosed method steps. Consistent with other disclosed embodiments, non-transitory computer-readable storage media may store program instructions, which are executable by at least one processing device and perform any of the steps and/or methods described herein.

Consistent with disclosed embodiments, systems, methods, and computer readable media related to selectively connecting external circuitry to a conductive target are disclosed. A conductive target for selective connection to a connector containing external circuitry for counting target hits may include a substrate and an electrical bus on the substrate, the electrical bus being configured for selective electrical connection to the external circuitry. The conductive target may further include at least one electrically conductive target region on the substrate and at least one conductive lead line on the substrate, the lead line electrically interconnecting the bus with the at least one target region. The conductive target may include at least one non-symmetrical perforation in the substrate adjacent the electrical bus, the at least one non-symmetrical perforation corresponding to at least one protrusion extending from the connector, to thereby prevent the connector from being incorrectly oriented during attachment to the target. Another exemplary embodiment may include a plurality of holes or perforations, arranged in a non-symmetric pattern.

Some aspects of this disclosure relate to systems, methods, computer readable media, and apparatus for remote monitoring of shooting performance and for enabling, for example, competition between geographically separated shooters are disclosed. Aspects of this disclosure may include pairing a wireless transmitter attached to a target with a mobile device. The mobile device may receive target hit information of a first shooter from the wireless transmitter and in turn transmit the information to a central server. Aspects of this disclosure may further include pairing another wireless transmitter attached to a second target with a second mobile device. The second mobile device may receive target hit information of a second shooter from the wireless transmitter and in turn transmit the second shooter's information to the central server. The central server may then provide the first shooter's information to the second shooter's mobile device, and the second shooter's information to the first shooter's mobile device.

In another embodiment, a method for enabling remote recording and comparison of shots fired at multiple targets is disclosed. The method may comprise establishing communication with a first mobile communications device associated with a first shooter, wherein the first mobile communications device is paired with a first wireless transmitter, temporarily attached to a first disposable target and wherein the first mobile communications device wirelessly receives from the first transmitter, in a first wireless hop, signals indicative of projectile hits on the first disposable target and maintaining a first record associated with the first shooter. The method may further comprise receiving in a second hop via a second wireless transmitter located in the first mobile communications device information indicative of the first shooter's identity and first hit information indicative of projectile hits on the first disposable target and storing the first hit information in association with the first record. The method may comprise establishing communication with a second mobile communications device associated with a second shooter, wherein the second mobile communications device is paired with a third wireless transmitter, temporarily attached to a second disposable target and wherein the first mobile communications device wirelessly receives from the third transmitter, in a third wireless hop, signals indicative of projectile hits on the second disposable target and maintaining a second record associated with the second shooter. The method may further comprise receiving in a fourth hop via a second wireless transmitter located in the second mobile communications device information indicative of the second shooter's identity and second hit information indicative of projectile hits on the second disposable target; transmitting for display to the second shooter on the second mobile communications device, information about the projectile hits on the first target by the first shooter; and transmitting for display to the first shooter on the first mobile communications device, information about the projectile hits on the second target by the second shooter.

Consistent with disclosed embodiments, systems, methods, computer readable media, and apparatus related to location based remote monitoring of shooting range visits and shooting performance. The methods may include receiving, for example, by a server, from a mobile device of a shooter, target hit data received via electronic circuitry temporarily connected to a disposable conductive target. The mobile device may also send identity information of the shooter to the server. The methods may further include receiving from the mobile device of the shooter, location data reflective of a location where shots from which the target hit data was generated were fired. A server may receive the target hit data, identity information, and location data and update a database, associating the location with the shooter and the target hit data.

Embodiments consistent with the present disclosure provide, systems, methods, apparatus, and computer readable media related to a conductive target. A conductive target may include a substrate and an electrical interface on the substrate. The electrical interface being configured for selective electrical connection to external circuitry. The conductive target may further include a least one target zone on the substrate, and the at least one target zone may be defined by a plurality of electrically-conductive circuit traces. The target zone may be configured to enable detection of a projectile hit that disconnects at least one of plurality of the electrically-conductive circuit traces. The conductive target may also include a plurality of spaced-apart conductive lead lines on the substrate. The plurality of lead lines may electrically interconnect the interface with the at least one target zone. Aspects of the disclosure may include the plurality of conductive lead lines being redundantly connected to the at least one target zone in a manner enabling detection of a target hit on a particular target zone after one of the conductive lead lines associated with the particular target zone is completely severed by a projectile.

Some embodiments of this disclosure involve systems, methods, apparatus, and computer readable media related to a conductive target. The conductive target may include a substrate, an electrical interface on the substrate, the electrical interface being configured for selective electrical connection to external circuitry, and at least one target zone on the substrate. The target zone may be defined by a plurality of electrically-conductive circuit traces and may be configured to exhibit a first change in an electrical property as the result of a target zone hit by a projectile. The conductive target may further include a plurality of spaced-apart conductive lead lines on the substrate, electrically interconnecting the interface with the at least one target zone. The plurality of conductive lead lines may be configured to exhibit a second change in the electrical property, different from the first change in the electrical property, as the result of a lead line projectile hit, to thereby enable the external circuitry to differentiate a target zone projectile hit from a lead line projectile hit.

Consistent with disclosed embodiments, systems, methods, and computer readable media related to selectively connecting external circuitry to a conductive target are disclosed. Disclosed embodiments may include circuitry for use in connection with a conductive target having an interface, at least one conductive target zone and a plurality of conductive lead lines electrically connecting the interface to the at least one conductive target zone. The circuitry may include at least one ore processor configured to detect via the interface, a first electrical signal representing severance of a portion of the at least one conductive target zone by a projectile hit within the at least one conductive target zone and detect via the interface a second electrical signal, different from the first electrical signal. The second electrical signal may represent severance of one of the plurality of lead lines by a projectile hit on the one of the plurality of lead lines. The processor may be further configured to trigger an indicator of a target hit in response to the first electrical signal and prevent triggering of the target hit indicator in response to the second electrical signal.

Embodiments consistent with the present disclosure provide systems, methods, and computer readable media for regulating use of a conductive target having at least one conductive target zone and a plurality of conductive lead lines electrically connected to the at least one conductive target zone. The methods may include receiving from circuitry connected to a conductive target, a plurality of discrete first signals, each discrete first signal being indicative of a target zone hit and receiving from the circuitry connected to the conductive target, a plurality of discrete second signals, each discrete second signal being indicative of a conductive lead line hit. The methods may further include counting the plurality of discrete first signals and discrete second signals, comparing the counted discrete first signals and discrete second signals with a prestored threshold rule, and outputting an exhaustion signal. The exhaustion signal may indicate that the conductive target is spent when the prestored threshold rule is violated by at least one of the counted first discrete signals or the counted second discrete signals.

Consistent with disclosed embodiments, systems, methods, and computer readable media for automatically ascertaining a target identity associated with a disposable conductive target having an interface connectable to detachable electronics are disclosed. The methods may include electrically probing the conductive target via the detachable electronics connected to the interface and receiving at least one return signal in response to the probing. The return single may include identity information from which an identity of the target is derivable. The method further include causing a look up of the return signal in a data structure associating return signals with target identities to ascertain an identity of the target, accessing auxiliary information associated with the identified target, and causing the auxiliary information to be presented to a shooter via a mobile communications device of the shooter.

BRIEF DESCRIPTION OF THE DRAWINGS

The accompanying drawings, which are incorporated in and constitute a part of this disclosure, illustrate various disclosed embodiments. In the drawings:

FIGS. 6A-6G illustrate example perforation patterns that may be used, consistent with the disclosed embodiments.

FIG. 7 is a depiction of an exemplary system for remote monitoring of shooting performance, consistent with disclosed embodiments.

FIGS. 9A and 9B present a flowchart illustrating an exemplary process for remote monitoring of shooting performance, consistent with disclosed embodiments.

FIG. 10B is a flowchart illustrating an exemplary process for location specific remote monitoring of shooting performance consistent with disclosed embodiments.

FIGS. 12A and 12B are schematic illustrations shooting targets, consistent with the disclosed embodiments.

DETAILED DESCRIPTION

Figure 1:
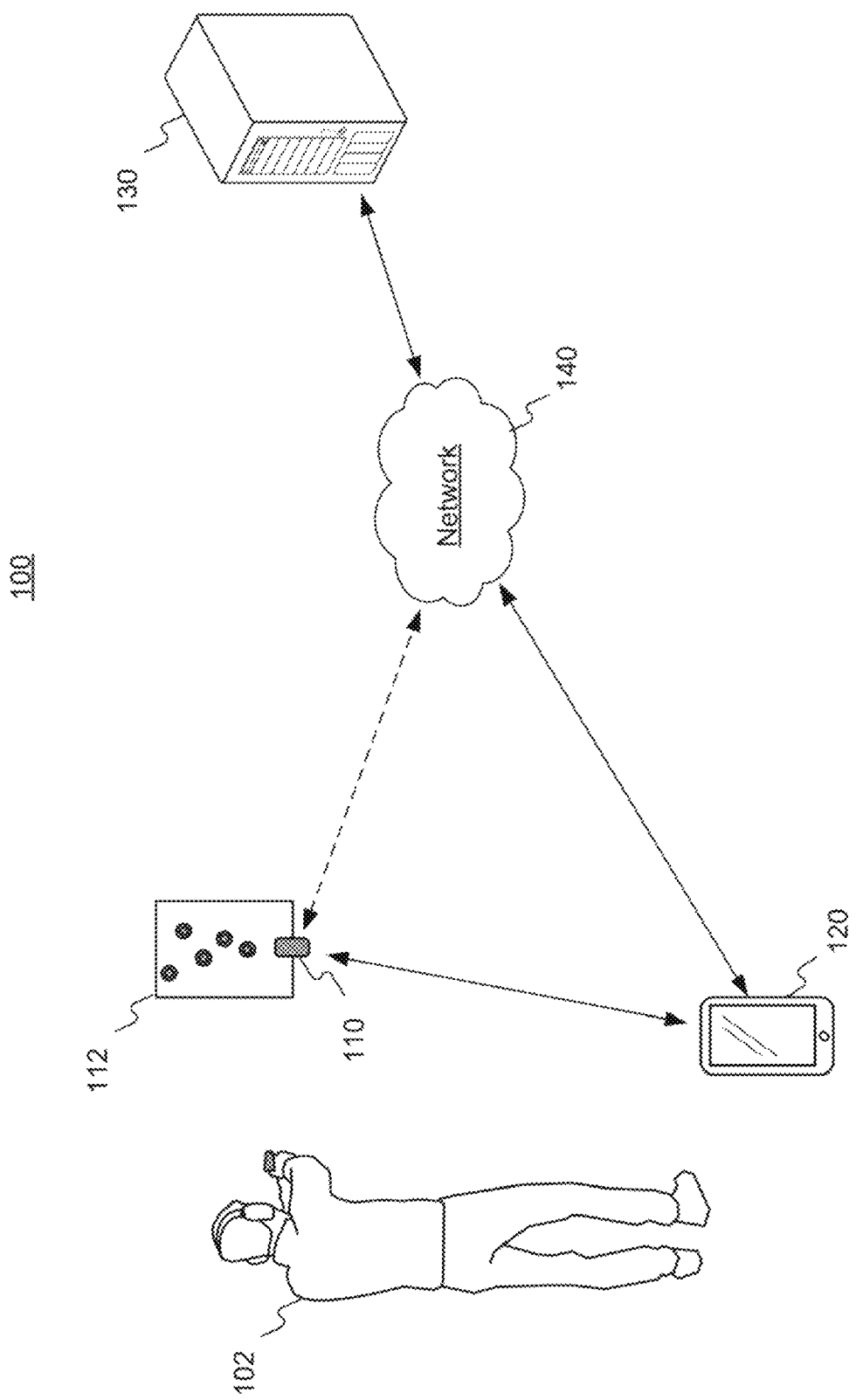
FIG. 1 illustrates an example system for use with conductive targets, consistent with the disclosed embodiments

Unless specifically stated otherwise, as apparent from the following description, throughout the specification discussions utilizing terms such as "processing", "calculating", "computing", "determining", "generating", "setting", "configuring", "selecting", "defining", "applying", "obtaining", "monitoring", "providing", "identifying", "segmenting", "classifying", "analyzing", "associating", "extracting", "storing", "receiving", "transmitting", or the like, include actions and/or processes of a computer that manipulate and/or transform data into other data, the data represented as physical quantities, for example such as electronic quantities, and/or the data representing physical objects. The terms "computer", "processor", "controller", "processing unit", "computing unit", and "processing module" should be expansively construed to cover any kind of electronic device, component or unit with data processing capabilities, including, by way of non-limiting example, a personal computer, a wearable computer, smart glasses, a tablet, a smartphone, a server, a computing system, a cloud computing platform, a communication device, a processor (for example, digital signal processor (DSP), an image signal processor (ISR), a microcontroller, a field programmable gate array (FPGA), an application specific integrated circuit (ASIC), a central processing unit (CPA), a graphics processing unit (GPU), a visual processing unit (VPU), and so on), possibly with embedded memory, a single core processor, a multi core processor, a core within a processor, any other electronic computing device, or any combination of the above.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence, or constrained to a particular system configuration. Additionally, some of the described embodiments or elements thereof can occur or be performed simultaneously, at the same point in time, or concurrently.

The present disclosure relates to conductive targets and external circuitry configured to interface with the conductive target. As used herein, a "conductive target" may refer to any target object having one or more conductive elements configured to interact with projectiles contacting the target object. In particular, projectiles or other objects may contact the conductive elements such that one or more electrical properties of the conductive elements may change. The external circuitry, which may be con figured to connect to the conductive elements, may detect the change in the one or more electrical properties. Accordingly, the external circuitry may detect, monitor, record, and/or analyze the interactions between the projectiles and the conductive target.

The conductive target may be used in a variety of ways. In some embodiments, the conductive target may be an object at a shooting range. For example, one or more users may fire projectiles at the conductive target, which may be used for target practice, competitions, training, firearm certification, or various other activities. The disclosed embodiments are not limited to any particular form of projectile. In some embodiments, the projectiles may include bullets, such as those fired by a handgun, rifle, or other firearm. In some embodiments, the conductive target may be used at an archery range, and thus the projectiles may include arrows or similar objects. The conductive target may be used with any other forms of projectiles, such as balls (e.g., golf balls, footballs, baseballs, paintballs, shotputs, etc.), discs, pellets, pucks, darts, spears, harpoons, axes, clubs, bolts, or any other objects that may be launched towards a target. In some embodiments, the conductive target may be used with non-projectile objects that may strike the conductive target. For example, the conductive target may be used to detect strikes by a human fist or foot. The conductive target may be configured to detect strikes by various other objects, such as a sword (e.g., as a fencing target), a staff, a whip, a lance, or any other object that may be used to impact a target.

The conductive target may take various shapes or forms. In some embodiments, the conductive target may be a generally flat object, such as a paper, cardboard, plastic, or wood target. For example, the conductive target may have a generally rectangular shape. According to some embodiments, the conductive target may have various other shapes, including but not limited to, a silhouette of a person, animal and/or vehicle, a circle, an octagon (or other geometric shape), a star, or any other suitable shape. In some embodiments, the conductive target may be a three-dimensional object. For example, the conductive target may be a sphere, a cylinder, a human, vehicle, or animal shape, or any other three-dimensional shape. Accordingly, the conductive elements may be placed on one or more surfaces of the three-dimensional shape for detecting impacts with projectiles or other objects. The conductive target may be a fixed or stationary object, or may be a moving object. For example, the conductive target may be configured to move up and down, from side to side, toward and away from a user, pop up and down, or the like. Various other details regarding the conductive target are described further below.

The external circuitry may include any form of electrical components configured to interface with one or more conductive elements of the conductive target. For example, the external circuitry may include one or more pins or other conductive interface components configured to connect with an electrical bus on the conductive target (described in greater detail below). In some embodiments, the external circuitry may be at least partially housed within a connector device (also referred to as a "connector"). For example, the connector device may be configured to clip onto, or otherwise attach or connect with, to the conductive target. Example connector devices and associated components are described in greater detail below.

According to some example embodiments, the connector device may be configured to communicate with one or more external devices, such as a mobile communications device. For example, the connector device may transmit information related to detected changes in electrical properties to the mobile communications device. As used herein, a mobile communications device may include any portable device configured to receive and/or transmit information wirelessly. In some embodiments, the mobile communications device may include a mobile phone of a user. For example, the user may be an individual at a shooting range carrying a mobile phone. The mobile communications device may include various other devices, such as a tablet, laptop computer, wearable device (e.g., a smartwatch, smart glasses, smart jewelry, a fitness device, etc.), a dedicated shooting tracking device, or any other form of mobile computing device. The connector device may be configured to communicate with one or more other external devices, such as a communications device associated with a shooting range. For example, one or more conductive targets may be used at the same time at a shooting range, and may each be associated with a different connector device. The connector devices may directly or indirectly transmit information to a central computing device configured to track projectile hits on the conductive targets. One example of a direct connection may include a local receiver at the shooting range connected to a central processor at the shooting range. An example of an indirect connection may include a wireless connection to a mobile communications device (e.g., cell phone) which transmits data to either a central processor at the shooting range or, via a telecommunications and/or internet connection, to a remote central server. While wireless communication is generally described throughout the present disclosure, it is to be understood that any of the various communications described herein may also be performed through wired communications.

Systems according to the disclosed embodiments may include one or more remote servers configured to communicate with the connector device or the mobile communications device. As used herein, a remote server may be any form of computing device located remotely from the conductive target. In some embodiments, the server may include a single computing device, such as a server rack. In other embodiments, the remote server may include multiple computing devices, such as a server farm or server cluster. The remote server may also include network appliances, mobile servers, cloud-based server platforms, or any other form of central computing platform. Various example remote servers are described in greater detail below.

Consistent with disclosed embodiments. FIG. 1 illustrates an example system 100 for use with conductive targets, such as target 112. In the example embodiment shown in FIG. 1, conductive target 112 may be a target used at a shooting range. System 100 may include a user 102 that may fire one or more projectiles, such as bullets, at conductive target 112. System 100 may further include a connector device 110 configured to clip on to conductive target 112, as shown. Connector device 110 may be configured to interface with conductive elements of conductive target 112 to detect changes in electrical properties due to projectiles hitting conductive target 112, as described above.

System 100 may further include a mobile communications device 120. As described above, connector device 110 may communicate with mobile communications device 120 and provide information associated with the use of conductive target 112. For example, connector device 110 may transmit information associated with detected projectile hits to mobile communications device 120. In some embodiments, connector device 110 may transmit other information, such as a battery level of the connector device, time information, connectivity information, temperature or humidity information, information about conductive target 112 (e.g., a target type, etc.), or any other information that may be relevant to conductive target 112 or user 102. In some embodiments, connector device 110 may be configured to receive information from mobile communications device 120. Communication between connector device 110 and mobile communications device may be through various formats or protocols. For example, this may include Bluetooth®, infrared light, near-field communication (NFC), ultra-wideband, ZigBee®, Z-Wave®, WiFi, or any other mechanism or protocol through which at least one-way communication may be established.

Mobile communication device 120 may be configured to communicate with a remote server 130, as shown in FIG. 1. Remote server 130 may be any form of one or more computing devices located remotely from conductive target 112. A computing device may refer to any structure that includes at least one processor. "At least one processor" may constitute any physical device or group of devices having electric circuitry that performs a logic operation on an input or inputs. For example, the at least one processor may include one or more integrated circuits (IC), including application-specific integrated circuit (ASIC), microchips, microcontrollers, microprocessors, all or part of a central processing unit (CPU), graphics processing unit (GPU), digital signal processor (DSP), field-programmable gate army (FPGA), server, virtual server, or other circuits suitable for executing instructions or performing logic operations. The instructions executed by at least one processor may, for example, be pre-loaded into a memory integrated with or embedded into the controller or may be stored in a separate memory. The memory may include a Random Access Memory (RAM), a Read-Only Memory (ROM), a hard disk, an optical disk, a magnetic medium, a flash memory, other permanent, fixed, or volatile memory, or any other mechanism capable of storing instructions. In some embodiments, the at least one processor may include more than one processor. Each processor may have a similar construction or the processors may be of differing constructions that are electrically connected or disconnected from each other. For example, the processors may be separate circuits or integrated in a single circuit. When more than one processor is used, the processors may be configured to operate independently or collaboratively, and may be co-located or located remotely from each other. The processors may be coupled electrically, magnetically, optically, acoustically, mechanically or by other means that permit them to interact.

Remote server 130 may be configured to receive and/or store information associated with user 102, conductive target 112, connector device 110, and/or mobile communications device 120. For example, this information may include projectile hit data, target type, target status, battery information, user data, location information (e.g., GPS data, etc.), performance statistics, financial data, or any other forms of information that may be relevant to user 102 or conductive target 112. Remote server 130 may also be configured to transmit data to mobile communications device 120. In some embodiments, this may include statistics, competition information, similar data associated with other users, instructions (e.g., instructions for an app running on mobile communications device, rules for a game, etc.), or other information as described in greater detail below. In some embodiments, mobile communications device 120 may include an application (or "app") associated with remote server 130. For example, mobile communications device 120 may include a dedicated app for displaying shooting results and/or statistics. Mobile communications device 120 may include one or more user interfaces for receiving an input from user 102.

Consistent with the disclosed embodiments, the various components may communicate over a network 140. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth®, infrared, etc.), or any other type of network for facilitating communications. In some embodiments, the communications may take place across two or more of these forms of networks and protocols. While system 100 is shown as a network-based environment, it is understood that the disclosed systems and methods may also be used in a localized system, with one or more of the components communicating directly with each other.

In some embodiments, connector device 110 may be configured to communicate directly with remote server 130 (e.g., without an intermediate device, such as mobile communications device 120). For example, connector device 110 may be configured to transmit detected projectile hit information, or any other information described above directly to remote server 130. Accordingly, connector device 110 may be equipped with a communications device configured to communicate through network 140. For example, connector device 110 may include a cellular communication chip (e.g., an LTE chip, etc.), a WiFi® chip, or other forms of wireless communication devices. Similarly, in some embodiments, connector device 110 may communicate with mobile communications device 110 through network 140.

Figure 2:
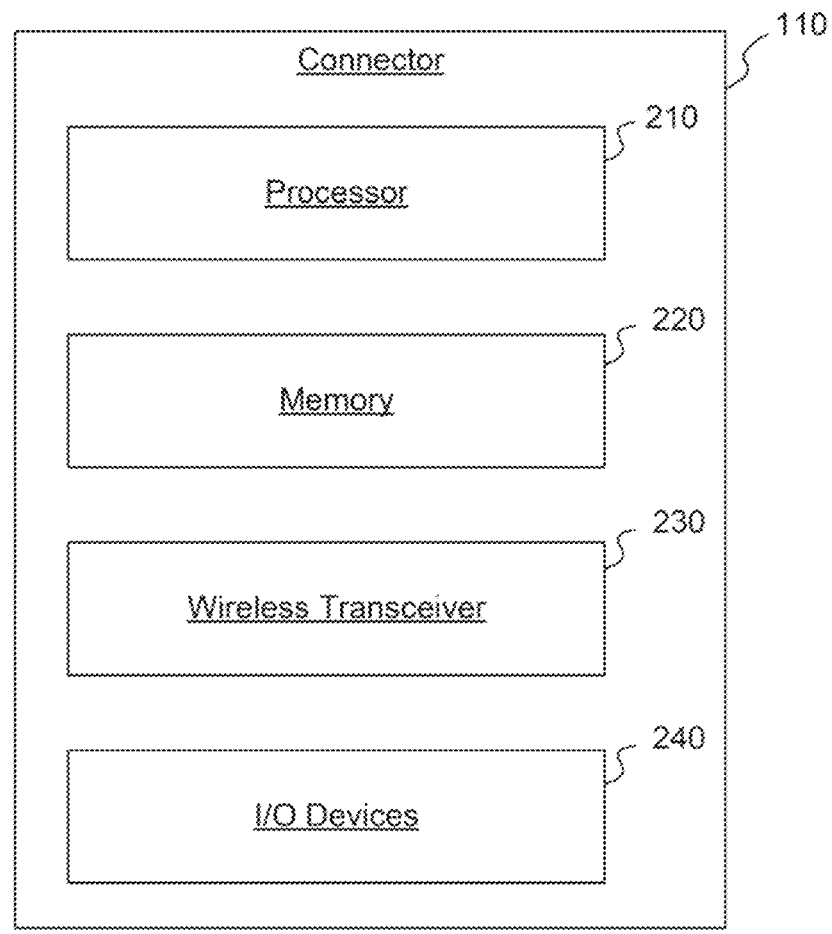
FIG. 2 is a block diagram illustrating an example connector device, consistent with the disclosed embodiments.

FIG. 2 is a block diagram illustrating an example connector device 110, consistent with the disclosed embodiments. As described above, connector device 110 may be a computing device and may include one or more dedicated processors and/or memories. For example, connecter device 110 may include at least one processor, more generally referred to as 210, a memory (or multiple memories) 220, a wireless transceiver (or multiple transceivers) 230, and/or one or more input/output (I/O) devices 240, as shown in FIG. 2.

Processor 210 may take the form of, but is not limited to, a microprocessor, embedded processor, or the like, may be integrated in a system on a chip (SoC), or more take the form of any processor described earlier. Furthermore, according to some embodiments, the processor 210 may be from the family of processors manufactured by Intel®, AMD®, Qualcomm®, Apple®, NVIDIA®, or the like. Processor 210 may also be based on an ARM architecture, a mobile processor, or a graphics processing unit, etc. The disclosed embodiments are not limited to any type of processor included in connector device 110. In some embodiments, processor 210 may refer to multiple processors.

Memory 220 may include one or more storage devices configured to store instructions used by the processor 210 to perform functions related to the disclosed embodiments. Memory 220 may be configured to store software instructions, such as programs, that perform one or more operations when executed by the processor 210 to perform the various functions or methods described herein. The disclosed embodiments are not limited to particular software programs or devices configured to perform dedicated tasks. For example, memory 220 may store a single program, such as a user-level application, that performs the functions of the disclosed embodiments, or may include multiple software programs. Additionally, the processor 210 may in some embodiments execute one or more programs (or portions thereof) remotely located from connector device 110. Furthermore, the memory 220 may include one or more storage devices configured to store data for use by the programs.

Wireless transceiver 230 may include one or more network adaptors or communication devices and/or interfaces (e.g., WiFi®, Bluetooth®, RFID. NFC. RF, infrared. Ethernet, etc.) to communicate with other machines and devices, such as with other components of system 100 through network 140. For example, connector device 110 may use a network adaptor to receive and transmit communications pertaining to projectile hits within system 100. I/O devices 240 may include one or more interface devices for interfacing with a user of connector device 110. For example, I/O devices 230 may comprise a display, lights or other indicators, touchscreen, keypad, mouse, trackball, touch pad, stylus, buttons, switches, dials, or any other user interface, configured to allow a user to interact with connector device 110.

Various details of the conductive target will now be described. For example, in some embodiments, the conductive target may be perforated in the area of the electrical bus to enable a clip, such as connector device 110 to be connected to the electrical bus. In particular, protrusions from the clip connector may be configured to pass through the perforations. In some embodiments, the perforations may have a non-symmetrical pattern to ensure that the connector device is property connected to the conductive target. For example, the perforations may be positioned such that the electrical circuitry of the connector device is aligned with the electrical bus. This may ensure that a user does not inadvertently misalign the connector device, which may interfere with detecting projectile hits on the conductive target. In some embodiments, one or more non-symmetrical perforations may prevent the front side of the clip from being incorrectly connected on the rear side of the target. This may ensure that contacts in the clip form an electrical connection with corresponding contacts on the target.

Figure 3:
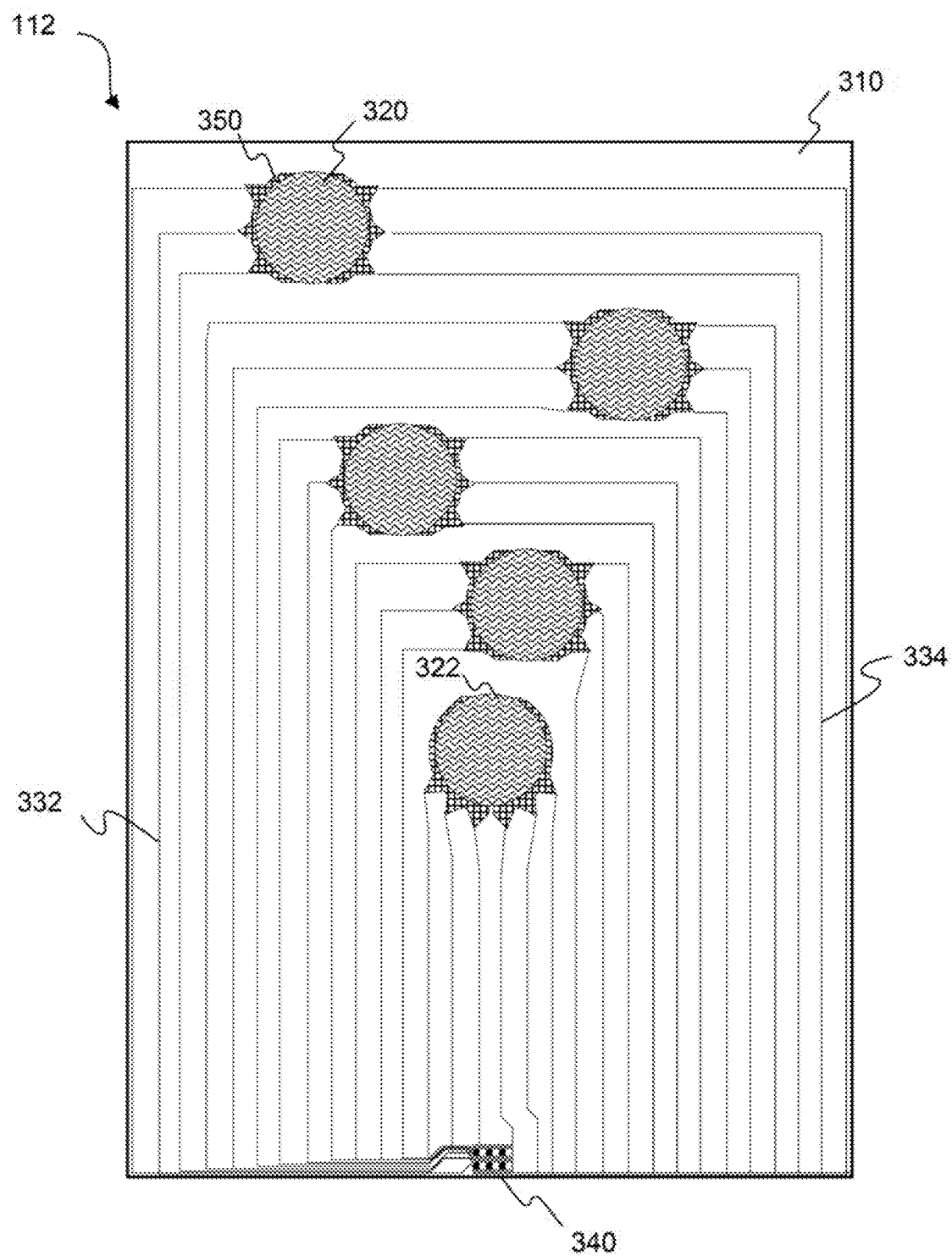
FIG. 3 illustrates an example conductive target with multiple target regions, consistent with the disclosed embodiments.

Consistent with the present disclosure, the conductive target may include a substrate. As used herein, a substrate may refer to any form of base layer or material upon which conductive elements may be disposed. For example, if the conductive target is a paper target, the substrate may refer to a layer of paper forming a base layer of the conductive target. The substrate may be constructed of any material (or materials) suitable for forming a target. For example, the substrate may include one or more layers of paper, plastic, textile (e.g., cotton, wool, or other fabrics), wood, glass, metal, fibers, rubber, foam, plaster, ceramic, stone, concrete, leather, synthetic materials (e.g., nylon, acrylic, polyester, spandex, carbon fiber, etc.), composite materials, or any other material on which a circuit may be disposed. In some embodiments, the substrate may be formed from more than one type of material and thus may have multiple layers. In some embodiments, substrate may include one or more adhesive layers configured to join multiple layers of the same or different materials. As described above, the conductive target may have a variety of shapes or appearances. Accordingly, the substrate may have shapes or structures corresponding to the overall shape of the conductive target. For example, the substrate may have the shape of a circle, a rectangle, a triangle, an octagon (or other geometric shape), a silhouette of a person animal or vehicle, or various other shapes, depending on design choice. In some embodiments, the conductive target may be three-dimensional, as described above, and thus the substrate may also have a three-dimensional shape. Accordingly, the substrate may be a layer at or near a surface of one or more sides of the conductive target. An example substrate 310 is shown in FIG. 3 and described in further detail below.

Consistent with some embodiments of the present disclosure, the conductive target may include an electrical bus on the substrate. The electrical bus may be configured for selective electrical connection to the external circuitry of the connector device. The electrical bus may be any structure configured to provide an interface between one or more conductive elements (e.g., target regions and/or lead lines, as described below) of the conductive target, and the external circuitry. For example, the electrical bus may include a plurality of electrical contacts configured to connect with corresponding contacts on the external circuitry. In some embodiments, the electrical bus may be printed on a surface of the substrate using a conductive ink. For example, the conductive ink may include one or more of platinum, silver, gold, copper, graphene, graphite (or various other allotropes of carbon), an alloy (e.g., an including one or more of silver, carbon, chlorine, nickel, etc.), conductive polymers, nanoparticles, or any other form of conductive material that may be printed or otherwise applied on a surface. Alternatively, the electrical bus may be formed as a separate component (e.g., as a thin conductive element) and may be adhered or otherwise affixed to the substrate, or located within the substrate.

According to some embodiments of the present disclosure, the conductive target may include at least one electrically conductive target region on the substrate. As used herein, a target region may refer to a zone or area of the conductive target intended to be struck by a projectile or object. For example, if the conductive target is used at a shooting range, the target region may be a circle or other shape that a user may aim at when shooting at the conductive target. Accordingly, projectile hits on the target region may be considered a target hit, whereas projectile hits on other portions of the conductive target may be considered a miss.

The conductive target region may be constructed of one or more electrically conductive "traces." These traces may be configured such that when a projectile strikes the substrate within the target region at least one electrical property associated with the target region changes. For example, a bullet may sever one or more of the traces, which may change a resistance, conductivity, or other electrical parameters. Accordingly, the electrical bus may be configured such that the selective electrical connection with the external circuitry enables the external circuitry to detect the severance of electrically conductive circuit traces in the at least one target zone, or to receive at least one signal from which severance may be detected by another element of the system. In some embodiments, the target region may be constructed of a geometry of multiple overlapping conductive traces. For example, the traces may be configured as a grid, a series of parallel lines, a series of wavy lines, or various other configurations. The traces may be spaced such that a projectile hitting the target region severs one or more of the traces. For example, each of the traces may have a width between 100 μm and 500 μm, tor any other suitable width), and a spacing between two adjacent traces may be between 500 μm and 4 mm or any other suitable spacing. Accordingly, when a .45 caliber bullet (having a width of 11.43 mm) strikes the target region, multiple traces will be severed. Various other spacings or trace configurations may be used, which may depend on a type of projectile with which the conductive target is designed to be used. In some embodiments, targets may be caliber-specific in that certain targets are designed for preferred use with a particular caliber or calibers of projectiles.

The traces forming the target region may be formed of any type of conductive material such that an electrical property associated with the target region changes when struck by a projectile. As with the electrical bus, the traces may be printed on a surface of the substrate using a conductive ink. For example, the conductive ink may include one or more of platinum, silver, gold, copper, graphene, graphite, an alloy, conductive polymers, nanoparticles, or any other form of conductive material that may be printed or otherwise applied on a surface. Alternatively, the traces may be formed as separate components and may be adhered or otherwise affixed to the substrate.

Figure 4:
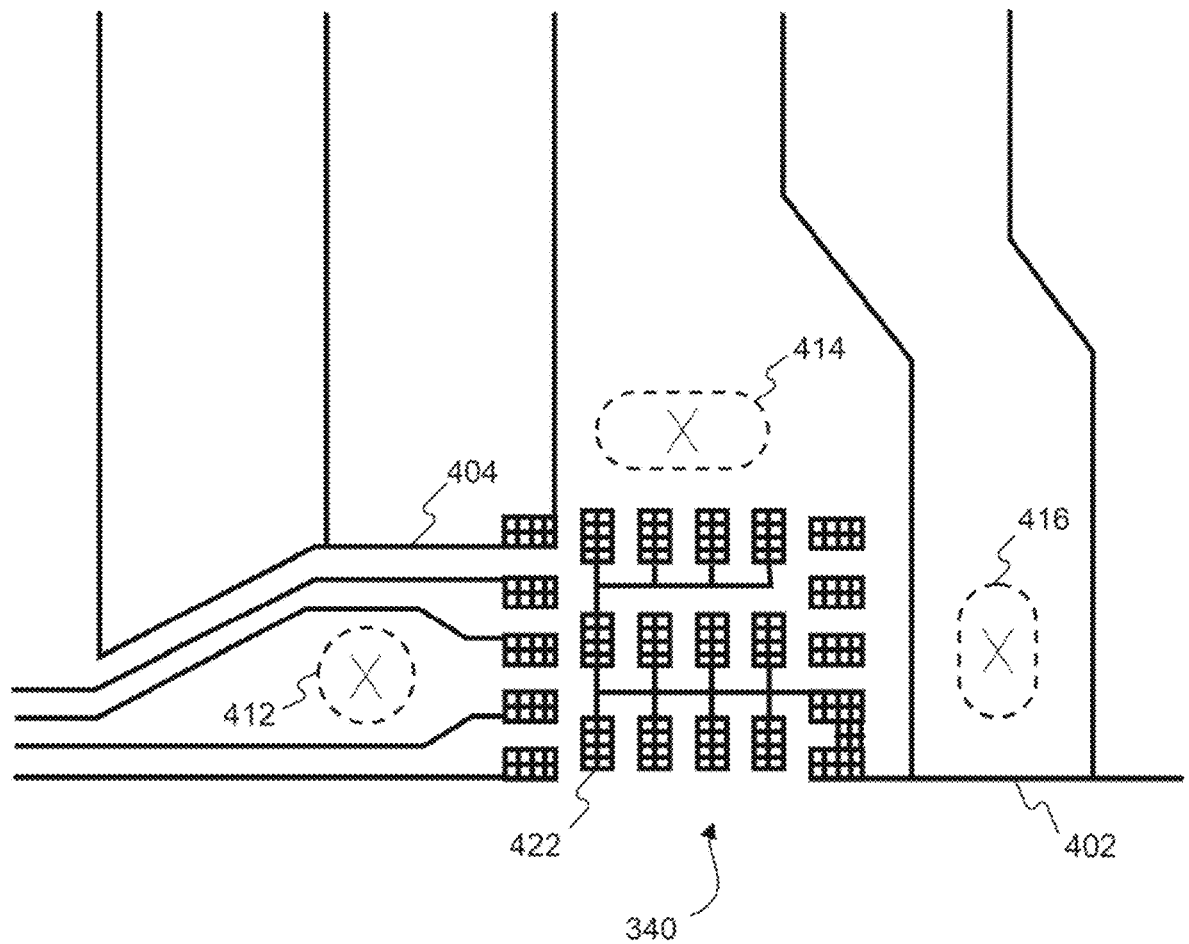
FIG. 4 illustrates an example electrical bus with adjacent perforations, consistent with the disclosed embodiments.

FIG. 3 illustrates an example conductive target 112 including a plurality of target regions, consistent with the disclosed embodiments. In the example shown in FIG. 3, conductive target 112 may include a substrate 310 having a generally rectangular shape. Substrate 310 may be constructed of one or more layers of paper, plastic, synthetic material, or other materials as described above. Substrate 310 may include an electrical bus 340 configured to interface with external circuitry of a connector device. An enlarged illustration of an example electrical bus 340 is shown in FIG. 4. Conductive target 112 may include one or more target regions, including target region 320, as shown in FIG. 3. Target region 320 may be formed of a plurality of wavy line traces, as shown. Conductive target 112 may include other target regions distributed on substrate 310, such as target region 322.

In some embodiments, the conductive target may further include at least one conductive lead line on the substrate. The lead lines may be any form of conductive pathway configured to electrically interconnect the electrical bus with a target region. As an illustrative example, conductive target 112 may include lead lines 332 and 334 interconnecting electrical bus 340 with target region 320, as shown in FIG. 3. As illustrated in FIG. 3, lead line 332 is just one of three lead lines providing electrical supply to target zone 350, and lead line 334 is just one of three lead lines providing electrical return flow from target zone 350. Multiple supply and return lead lines may make target zone 320 more robust in the event one or more supply or return lead lines are severed by a projectile. While six lead lines are illustrated in connection with each target zone, greater or fewer lead lines may be used, depending on design criteria. In some embodiments, the lead lines may not be located on opposite sides of a target zone. For example, as illustrated in connection with target zone 322 in FIG. 3, both the supply and return lead lines may generally connect to a common side of the target zone 322. As with the target regions, the lead lines may be printed on a surface of the substrate using a conductive ink. For example, the conductive ink may include one or more of platinum, silver, gold, copper, graphene, graphite, an alloy, conductive polymers, nanoparticles, or any other form of conductive material that may be printed or otherwise applied on a surface. Alternatively, the lead lines may be formed as separate components and may be adhered or otherwise affixed to the substrate. As used herein, the term "lead lines" does not necessarily imply that the pathways are linear. The lead lines may have any configuration so long as they are part of a circuit that interconnects the target interface with a target zone.

In some embodiments, target zone 320 may include an interface pattern 350 made from a grid having a crisscross or any other suitable layout of traces, each of which having any suitable width and spacing between two adjacent traces. The interface pattern may function to interconnect a series of lead lines with a target zone, and to define a gap between an end of each lead line and the target zone. The interface pattern may include a series of spaced-apart spikes, as illustrated by way of example in FIG. 3, where lead lines electrically connected to the target zone through the tip of each spike of interface pattern 350. The interface pattern may minimize the risk that a target hit on the edge of a target zone adjacent the lead line does not sever the electrical connection between the target zone and the lead line. That is, even if a portion of the interface pattern 350 is destroyed by a projectile, other portions may still maintain electrical connection of the lead line with the target.

The lead lines may have a non-overlapping geometry, as illustrated by way of example in FIG. 3. In some embodiments the lead lines may be spaced by a distance greater than a width of projectile intended for use with the target. For example, when a target is intended for use with ammunition of between .22 caliber through .45 caliber, the distance between adjacent lead lines may be somewhat greater than 11.43 mm. Since this is the dimension of a .45 caliber bullet, a hit that misses a target zone and instead strikes a region containing lead lines should sever no more than a single lead line. If a target is intended for use with up to .50 caliber bullets, the spacing between lead lines may be somewhat greater than 12.7 mm. The extent to which lead line spacing is greater than an intended caliber to be used with the target may be a function of the material used for the target substrate and may be a function of the projectile. Thus, the amount by which the spacing of lead lines is greater than intended bullet caliber to be used with target may be a matter of design choice. For example, for targets intended for use with bullets of between 0.10 and .50 caliber, the spacing between adjacent lead lines may be between 10 mm and 13 mm.

Consistent with the disclosed embodiments, a connector device (such as connector device 110 in FIG. 5) may be configured to attach to electrical bus 340 to complete one or more circuits associated with the target regions of conductive target 112. For example, the connector device may complete a circuit through lead line 332, target region 320, and lead line 334. The connector may similarly complete circuits associated with other target regions, such as target region 322. In other words, each of the plurality of target regions may be associated with a first set of conductive supply lead lines and a second set of conductive return lead lines. In some embodiments, each target region may be associated with multiple circuits. For example, target region 320 may include three "supply" lead lines and three corresponding "return" lead lines and thus may be associated with three circuits. In some embodiments these multiple sets of lead lines may be redundant lead lines for the same circuit (e.g., connected in parallel). For example, if lead line 332 is severed due to a projectile hit, the remaining lead lines may still be intact such that target region 320 may still be operable. Accordingly, each target region may be associated with a single circuit having parallel lead lines.

The connector device may be configured to detect changes in electrical properties within each of the target region circuits. In other words, the target region may be configured such that when connected to control circuitry, an electrical signal emanating from the target region will change in response to severance of a portion of the conductive target pathways, regardless of a material composition of a projectile causing the severance. For example, the connector device may detect changes to resistivity, electrical conductivity, thermoelectricity, or any other electrical property. Accordingly, the connector device may be configured to impose a current through each target region and receive, detect, and/or measure various electrical properties associated with the target regions. As described above, the target zone may be constructed of a geometry of a series of overlapping conductive traces, such as illustrated by way of example in target zones 320 and 322 of FIG. 3. These differences n geometry may result in different electrical properties from the lead lines. Accordingly, the connector device may be configured to distinguish changes in electrical properties due to hits within a target region from changes in electrical properties due to hits on a lead line. For example, a change in resistance due to a conductive lead line hit may be at least double a change in resistance due to a target zone hit. The connector device may transmit information indicative of lead line and target zone hits to an external device, such as mobile communications device 210, as described throughout the present disclosure.

In some embodiments, the conductive target may further include at least one non-symmetrical perforation in the substrate adjacent the electrical bus. As used herein, a perforation may refer to any form of hole, opening or series of holes or openings passing through the substrate. The non-symmetrical perforation may correspond to at least one protrusion extending from the connector. When connecting the connector to the conductive target, the protrusions may align with the at least one non-symmetrical perforation to thereby prevent the connector from being incorrectly oriented during attachment to the target.

Figure 6E:
Figure 6F:
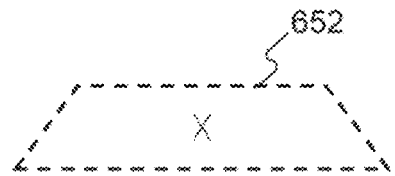

The non-symmetrical perforations may take a variety of forms. For example, a perforation may be a hole punched out of the substrate. In some embodiments, the perforation may be a series of small holes outlining an area to be punched out such that a portion of the substrate may be removed easily. Accordingly, the perforation may define a hole—not yet formed—to be punched out of the substrate. In some embodiments, the at least one perforation may include a plurality of holes. FIG. 4 illustrates an example electrical bus 340 with a plurality of adjacent perforations 412, 414, and 416. The dashed lines in FIGS. 4 and 6 are meant to convey two embodiments, where the dashed lines 1) are perforations for facilitating removal of the "X'd" sections when, for example, a connector is installed and its protrusions punch out the bounded areas; and 2) define openings that are pre-punched (i.e., the "X'd" sections are completely removed before reaching the user.) In the latter case, each opening may be considered a perforation.

Figure 5:
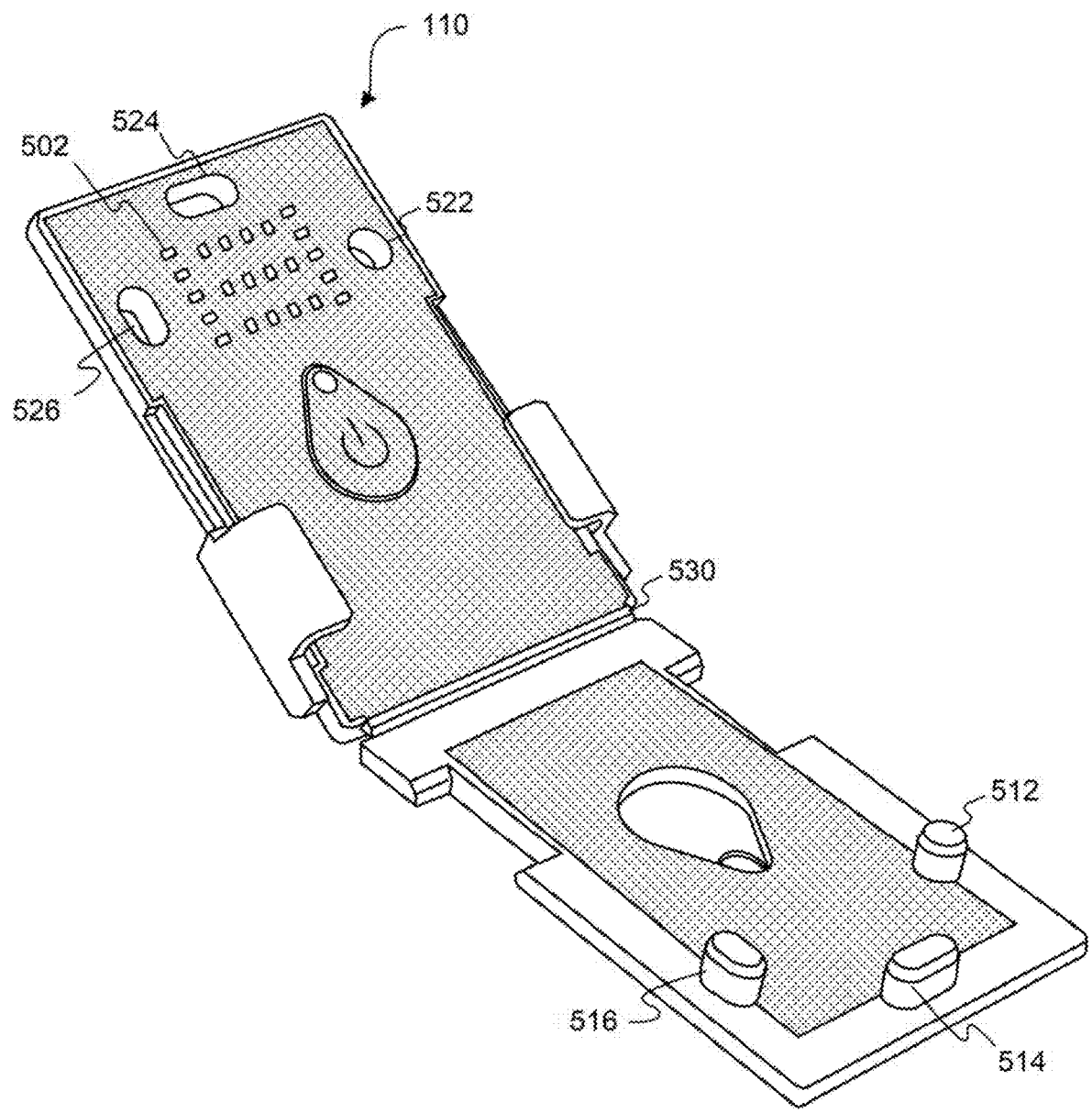
FIG. 5 shows an example connector device that may be clipped onto conductive target 112, consistent with the disclosed embodiments

Electrical bus 340 may include a plurality of electrical contacts 422 that may interface with corresponding contacts of the connector device. For example, the connector device may include a plurality of corresponding contacts 502 as shown in FIG. 5 (and discussed further below). Electrical contacts 422 may be electrically connected with one or more lead lines of conductive target 112, as described above. In some embodiments, two or more of the lead lines may be connected by a common lead line header, such as lead line headers 402 and 404, as shown in FIG. 4. For example, lead line header 404 may connect a plurality of supply lead lines connecting to target region 322. Similarly, lead line header 402 may connect a plurality of return lead lines coming from target region 322. In some embodiments, lead line header 402 may connect return lead lines from all the target regions on the conductive target. In order to properly measure electrical properties associated with the target regions of conductive target 112, connector device 110 may need to connect to conductive target 112 with a particular alignment. Accordingly, conductive target 112 may include perforations 412, 414, and 416 to ensure a proper alignment.

FIG. 4 illustrates an example electrical bus 340 with adjacent perforations, consistent with the disclosed embodiments. As shown in FIG. 4, the at least one perforation may include a non-symmetrical pattern of perforations. In some embodiments, the non-symmetry of the perforation pattern may include at least one of the perforations having a shape that differs from at least one other of the plurality of perforations. For example, as shown in FIG. 4, the non-symmetry may be due to perforation 412 having a round shape whereas perforation 416 has an elongated shape. In some embodiments, the non-symmetry of the perforation pattern may include at least one of the perforations having an orientation that differs from at least one other of the plurality of perforations. For example, in the pattern shown in FIG. 4, the perforations may also be non-symmetrical about a horizontal axis due to the orientation of perforations 414 and 416. Additionally, or alternatively, perforations my be non-symmetrical about a vertical axis.

Perforations 412, 414, and 416 may ensure that a connector device may only be connected in one orientation. To illustrate this alignment, FIG. 5 shows an example connector device 110 that may be clipped onto conductive target 112, consistent with the disclosed embodiments. As noted above, connector device 110 may include a plurality of protrusions 512, 514, and 516, which may correspond to perforations 412, 414, and 416, respectively. In particular, when connecting connector device 110 to conductive target 112, a user may align connector device 110 such that protrusion 512 passes through perforation 412, protrusion 514 passes through perforation 414, and protrusion 516 passes through perforation 416. The user may then close connector device 110 around conductive target 112. For example, connector device 110 may include two portions connected by a hinge 530 such that connector device 110 may clip onto conductive target 112. Connector device 110 may further include holes 522, 524, and 526 configured to at least partially receive protrusions 512, 514, and 516, respectively, when connector device 110 is in a closed, clipped position. The protrusions 512, 514, and 516 may snap fit into holes 522, 524, and 526. Alternatively, another snap or latch mechanism may secure the connector device 110 to the target. For example, connector device 110 may include one or more components configured to maintain the clipped position. For example, this may include one or more latches, magnets, clips, hook-and-loop type fasteners, buttons, snaps, hooks, springs and/or any other mechanism the like to temporarily hold connector device 110 in the closed position. Based on the non-symmetrical pattern of perforations 412, 414, and 416, it can be seen that connector 110 would only be connectable to conductive target 112 in the proper configuration, where the contacts 502 engage corresponding contacts on the bus of the target. If a user attempted to install the connector device with contacts 502 facing the back side of the target, the asymmetrical nature of the protrusions would prevent that incorrect connections.

While three protrusions are illustrated in FIG. 5 to correspond to the three perforations illustrated on the target of FIG. 4, it should be understood that even a single asymmetric protrusion could be employed to ensure a proper orientation. For example, an asymmetrical trapezoidal protrusion could be employed to correspond to a similarly shaped trapezoidal perforation. Indeed, any number of protrusions of any number of shapes could be employed consistent with embodiments of this disclosure, so long as they result in asymmetry that guides proper connection of the connector device to the target.

Moreover, while the connector device 110 in FIG. 5 is illustrated at two hinged rectangles, the connector device need not be hinged and need not be rectangular. Any shape may be employed, and the connector device may alternatively be formed of two separable pieces, two pieces that connect through a clamp or a screw press, or any other mechanism of sandwiching the target between two surfaces. In addition, while the bus is illustrated in the figures as being on the front side of the target, in some embodiments it may be on the back side. Similarly, in some embodiments the target regions and lead lines may be printed on the back side, with aesthetic target illustrations presented on the frontside. In yet other embodiments, target regions and lead lines may be presented on both sides of the substrate or may be sandwiched between layers of the substrate.

Thus, returning to FIG. 4, it is to be appreciated that perforations 412, 414, and 416 are provided by way of example, and various other non-symmetrical perforation patterns may be used. The non-symmetrical pattern may include any position, orientation, size, shape, spacing, or ether characteristics of perforations that would ensure a connector is oriented properly with respect to an electrical bus. FIGS. 6A-6F illustrate additional example perforation patterns that may be used, consistent with the disclosed embodiments. These configurations are provided by way of example and the present disclosure is not limited to any particular configuration.

In some embodiments, the non-symmetrical pattern may be based on the positioning of one or more of the perforations. For example, the perforation pattern may include upper perforations and lower perforations, and the non-symmetry of the perforation pattern includes differing numbers of upper and lower perforations. As shown in FIG. 6A, the perforation pattern may include a set of upper perforations 602 having a different number of perforations than a set of lower perforations 604. Similarly, the perforation pattern may include first side perforations and second side perforations, and the non-symmetry of the perforation pattern may include differing numbers of first side perforations and second side perforations. For example, as shown in FIG. 6B, the perforation pattern may include a set of first side perforations 612 having a different number of perforations than a set of second side perforations 614.

According to some embodiments of the present disclosure, the non-symmetry of the perforation pattern may include at least one of the perforations having a size that differs from at least one other of the plurality of perforations. For example, one or more perforations may be smaller or larger than one or more other perforations to create a non-symmetrical pattern. In the example configuration shown in FIG. 6C, perforation 622 may be larger than perforation 624, thereby creating a non-symmetrical pattern. In some embodiments, the non-symmetry of the perforation pattern may include non-symmetry of spacing between adjacent perforations. For example, as shown in FIG. 6D, the perforation pattern may include a spacing 632 between two perforations that is different from a spacing 634 between to perforations to create a non-symmetrical pattern. The foregoing are simply generalized examples and it is to be understood that the options for achieving the desired asymmetry are endless when considering the permutations of size, shape, orientation, and spacing of perforations. All are considered within the scope of this disclosure, as long as they result in asymmetry.

While the various example perforation patterns described above include multiple perforations, in some embodiments, a single perforation having a non-symmetrical shape may be used. For example, the perforation may have a particular orientation, shape, or other property that defines a particular alignment for attaching a connector device. For example, the perforation may have a shape as shown by perforation 642 in FIG. 6E that would allow a projection on the connector device having the same shape to connect in only one way with the target. As another example, the perforation may have a trapezoidal shape, as shown by perforation 652 in FIG. 6F.

Figure 6G:
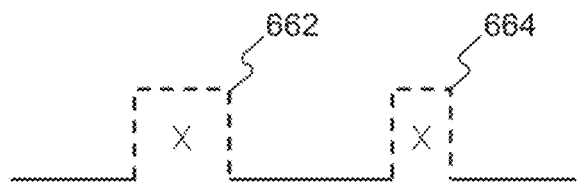

In some embodiments, the perforations may not be entirely surrounded by substrate but extend all the way to an edge of the substrate. For example, the perforations may be cutouts or notches along a bottom, top, or side edge of the substrate. FIG. 6G illustrates example perforations 662 and 664 formed as cutouts along the bottom of a substrate. Various other sizes or shapes of cutouts may be formed. In some embodiments, additional perforations may be included to allow the connector device to stay attached to the target.

In some embodiments, the shape of a perforation may be non-descript and in others it may be the shape of a known object, such as a handgun, a rifle, a bullet, or any other objects. Alternatively, or additionally, the perforation may be a proprietary shape, such as the shape of a logo associated with connector device 110 and/or remote server 130. Such shapes may also apply to conductive targets with multiple perforations.

According to some embodiments, the substrate of conductive target 112 may further include a printed graphic indicating an orientation of the connector. The printed graphic may include any combination of text, images, lines, shapes, or other visual elements that may further indicate an orientation of the connector. For example, this may include an outline having a shape corresponding to a shape of the connector. Accordingly, a user may align an outside edge of the connector with the outline on the substrate when attaching the connector. The outline may also be represented as a region having a different color, a printed pattern, an image, or the like. In some embodiments, the printed graphic may include printed text. For example, the printed text may say "place connector device here" (although the term "connector device" may be replaced with another description of the device, such as a brand name, etc.). "top." align here," or various other text messages that may indicate an alignment of the connector device. In some embodiments, the printed graphic may include a logo or brand name that may signal that the connector device (which may also be associated with the logo or brand name) is to be connected within that region. In some embodiment, the printed graphic may be printed using a non-conductive ink so as to not interfere with the electrical bus or the associated lead lines. Alternatively, the printed graphic may be printed using the same conductive ink but may be positioned such that it is spaced apart from portions of the lead lines and/or electrical bus. In some embodiments, the printed graphic may be integrated with the lead lines or other conductive elements of the conductive target. For example, lead line headers 404 and 402 and/or or other lead lines may be shaped to at least partially form an outline of a connector device while still functioning to complete a circuit with associated target regions and the electrical bus.

Some aspects of this disclosure may include systems, methods, and computer readable media for remote monitoring of shooting performance and enabling competition between geographically separated shooters. For example, disclosed embodiments may include a non-transitory computer readable media for enabling remote recording and comparison of shots fired at multiple disposable targets, (Which may alternatively be referred to synonymously as "a non-transitory computer readable medium.") As used herein, non-transitory computer readable media may be located in a single location or may be split across multiple locations/devices. For example, portions of the non-transitory computer readable media described herein may be located on differing mobile communications devices to enable wholistic functionality of a system. In such an example, a purveyor of software or code may make available for download computer readable media for download to multiple wireless communications devices. When differing individuals download such computer readable media (such as in the form of an app download) each user who downloaded the app may retain some or all of the computer readable media referred to herein. This may enable two users to communicate with a common server and through that server, permit user-related information to be shared with other users who also downloaded the app. Thus, in the context of a system accessed by multiple mobile communications devices, computer readable as used herein may include non-co-located copies of the computer readable media, acting together within a system of multiple users.

In operation, wireless transmitters may be attached to disposable targets for providing data to mobile devices associated with shooters. While targets are referred to herein as "disposable," it is understood that other types of non-disposable targets are possible. Accordingly, in some embodiments, the systems and methods described herein may equally be implemented using non-disposable targets. The mobile devices may then provide the data to central server, which may distribute the data to other competitors, compare scores between competitors, and carry out other similar actions. Disclosed embodiments may enable, for example, the creation of leader boards comparing and ranking the scores of multiple competitors. The nature of the disclosed embodiments permits shooters from various geographic locations to compete with each other and compare their scores, despite being potentially thousands of miles apart. Exemplary aspects of disposable targets, wireless transmitters, mobile devices, and servers are described throughout the disclosure.

For ease of discussion, a method is described below, with the understanding that aspects of the method apply equally to systems, devices, and computer-readable media. For example, some aspects of such a method may occur electronically over a network that is wired, wireless, or both. Other aspects of such a method may occur using non-electronic means. In a broadest sense, the method is not limited to particular physical and/or electronic instrumentalities, but rather may be accomplished using many differing instrumentalities.

Consistent with disclosed embodiments, a method may include pairing a first wireless transmitter, temporarily attached to a first disposable target, with a first mobile communications device associated with a first shooter. As used herein, pairing may include any mechanism for establishing a communication channel between devices. In this instance, a first pairing may establish a communication channel between a transmitter on a target and a first mobile communications device, which may include any device equipped with at least a wireless receiver. Pairing may occur for example, through one of a variety of wireless connection types, such as Bluetooth™, Bluetooth Low Energy™, infrared light, near-field communication (NFC), ultra-wideband, ZigBee®, Z-Wave®, Wi-Fi, or other suitable wireless communication methods or protocols. In some embodiments, pairing may be completed by a server in communication with the mobile communications device. For example, the server may provide credentials to the mobile communications device in order to connect with the transmitter connected to the target. In other embodiments, devices may be paired by undergoing a process of recognition. For example, a cell phone may recognize a wireless signal in the vicinity and prompt the user to express a desire to pair. Upon acceptance, the transmitter may be said to have credentials recognized by the cell phone, thereby permitting signals from the transmitter to be received and processed by the cell phone. Requiring credentials to complete the pairing between the transmitter and mobile device may prevent unauthorized devices from retrieving the information transmitted by the transmitted the transmitter. Requiring credentials for pairing may also prevent a shooter from accidentally pairing his mobile device with a target and transmitter that another shooter is actually shooting. In other embodiments, the mobile device may pair with the transmitter by connecting with the transmitter without server approval.

Non-transitory computer readable media may be said to contain instructions for pairing if the computer readable media directly causes a mobile communications device (either wholly or partially) to establish a communications channel with a transmitter. Alternatively, non-transitory computer readable media may be said to contain instructions for pairing in an indirect manner. For example, if the computer readable media includes instructions that enable the computer readable media to be downloaded to a mobile communications device that has pre-established pairing capabilities, as used herein, the computer readable media contains instructions to perform a method that includes pairing of the mobile communications device with a transmitter.

The mobile communications device may include any portable device configured to receive and/or transmit information wirelessly, as described above. According to disclosed embodiments, the mobile communications device may be a cell phone. In some embodiments, the mobile communications device may be smart glasses or any other wearable communications device. The mobile communications devices may also take other forms, such as a smart watch, laptop computer, tablet, or other suitable device capable of wireless communication.

By way of example. FIG. 7 illustrates an exemplary system 700 for remote monitoring of shooting performance. As shown in FIG. 7, system 700 may include disposable target 701 connected to transmitter 703. As described herein, transmitter 703 may collect data related to projectile hits on the target. Transmitter 703 may be paired with mobile device 705. While transmitters 703 and 713 are schematically depicted in a detached manner from targets 701 and 711, it is to be understood that in many embodiments, these transmitters may be physically connected to respective targets. Thus, for example, disposable targets 701/711 and transmitters 703/713 may correspond to target 112 and connector device 110, as described above.

In some embodiments, multiple transmitters each connected to a different disposable target may be paired with a single mobile communications device. In such an example, the mobile communications device may be a central device, for example a central computer, muter, tablet, or other suitable device. For example, a public shooting range may have multiple targets positioned near each other to enable a different shooter to shoot at each target. The wireless transmitter for each target may send data indicating the hits on its corresponding target to a central device, which may then transmit each shooter's data to the server. Thus, the central device may associate each target or transmitter with a specific shooter. Such a method may only require a shooter to sign in with the central device when entering the range to become associated with a specific target. As an example, a shooter entering the range could sign in on the central device (e.g., a tablet or laptop located near the entrance) to associate with a particular transmitter, such as a transmitter assigned to a particular lane (or any other means for identifying a particular transmitter). The central device could then associate the shooter and any other information corresponding to the shooter with the assigned transmitter. In some implementations, transmitters may be associated with particular shooting lanes. In such situations, a shooter who uses a mobile device to register for a particular lane may not need to pair the mobile device with the transmitter to transfer his shooting data to the central platform, as the phone may pair automatically following the registration. In yet other uses cases, a transmitter assigned to each lane may be wirelessly or physically paired with a central device, eliminating the need for the user's mobile device to serve as an intermediary. Regardless, additional benefit may be achieved by including the user's mobile device within the system, as the interconnection may permit statistics and other gameplay information to appear on the shooter's mobile device before, during, and/or after a shooting session. In some cases, the user may use his personal device access the platform to, for example, view scores of other shooters, start or enter a competition, or take other similar actions.

Disclosed embodiments may further include wirelessly receiving from the first transmitter, in a first wireless hop, signals indicative of projectile hits on the first disposable target. Wirelessly receiving may include picking up a wireless signal communicating data from one device to another device, as described herein. Such wireless reception may typically occur via a receiving antenna. For example, Bluetooth™ or Wi-Fi signals may be received by the first mobile communications device from the transmitter. As used herein, a wireless hop may refer to a communication of data from one device to another. Each transmission between two devices may be referred to as a hop. For example, a first device having only Bluetooth™ connectivity may wish to transmit data to a server. The first device may send data in a first hop to an intermediary device also having Bluetooth™ connectivity. The intermediary device may also be capable of communicating with the server through other protocols, such as Wi-Fi or a broadband cellular network (e.g., 4G LTE, etc.). A first wireless hop may refer to a communication from a transmitter associated with target to a receiver of a mobile communications device such as a cell phone. In some embodiments, the first wireless hop may occur directly from an originating transmitter to an intended receiver. In other embodiments, the first wireless hop (or any hop disclosed herein) may include one or more bounces through one or more intermediate nodes. Thus, a hop as used throughout this disclosure refers to a transmission from an originating transmitter to an intended receiver, regardless of whether intermediate bounces through intermediate receiver/transmitters occur. For example, some of the hops described herein are between a mobile communications device and a computer, server, or processor that may be remote from the mobile communications device. It should be understood, that in a communications network, the path between the mobile communications device and a server may include a series of wireless and wired bounces. For the purposes of this disclosure, all of those bounces in a path between an originating device and a destination device are considered part of a single hop.

As described herein, signals indicative of projectile hits may include any signal that results from or relates in any way to a projectile hit on a target. Such signals may take a variety of forms and convey a variety of information. Signals may be in any suitable form for wireless communications, as described herein. The signals indicative of projectile hits may indicate, for example, whether a projectile hit any target zone of a target, whether a particular target zone was hit, the number of hits in target zones of target, a score associated with a target zone that was hit by a projectile, a timing associated with the target hits, a number of non-target hits, a ratio of target hits to non-target hits, a type of conductive target being used, and/or any other information related to hits on a target. By way of example, a rifle shooter shooting at a disposable paper target on a shooting range may fire several bullets at the target. As described herein, the transmitter connected to the target may determine if and where the bullets hit the target. The target may contain a single target zone or multiple target zones, as described above with respect to target 112. In some embodiments, different portions of a target zone may correspond to different scores. The transmitter may recognize a score associated with each bullet hit on the target. Any of the forgoing information may be reflected in a signal transmitted to a receiver (such as in a cell phone) from a transmitter connected to the target.

Disclosed embodiments may further include accessing information indicative of an identity of the first shooter. Accessing information may include reading, loading, opening, downloading, retrieving, extracting, or otherwise obtaining stored data having information. The information may be stored locally to the device accessing the information, for example, in one or more memory devices of a mobile communications device. In some embodiments, the information may be stored remotely from the device accessing the information. As an example, the information may be stored by a remote server, database, or cloud storage service. In such cases, accessing the information may include requesting the information from a server or cloud service. Accessing the information may also include querying a database in which the information is stored. Information indicative of an identity of a shooter may take a variety forms. For example, the information may indicate a name, age, address, an identification number or ID, username, email address, or other information from which a shooter may be identified.

Disclosed embodiments may further include accessing an address of a remote server where a record associated with the first shooter is maintained. Accessing an address of a remote server may include accessing a network location or link stored locally on the device executing the accessing step (e.g., a mobile communication device). The remote server may be associated with a central platform that manages various competitions between shooters, shooter information and statistics, locations, and other relevant information. The remote server may locally store records associated with shooters. In some embodiments, the remote server may be associated with a database or cloud storage platform that stores shooter records. Records associated with shooters may include a variety information specific to the shooter. For example, a shooter's record may include shooter identity information, information or statistics regarding past shooter activity or performance (e.g., previous scores, competitions completed, and other shooters competed against), other shooters associated with the shooter associated with the record, equipment information, associated shooting ranges or locations, an experience level of the shooter, information or rankings indicative comparisons between the shooter and other shooters, and other information relevant to the shooter.

By way of example, FIG. 7 illustrates an exemplary system including mobile communications device 705. In some embodiments, mobile communications device 705 may be associated with and store information related to first shooter 707. As described herein, mobile communications device 705 may store a variety of information about first shooter 707, including identifying information such as a given name, username, email address, and/or other information, as described herein. In some embodiments, mobile communications device 705 and first shooter 707 may correspond to mobile communications device 120 and user 102, as described above. Accordingly, any of the embodiments or features described above with respect to user 102 and mobile communications device 120 may also apply to mobile communications device 705 and first shooter 707. As illustrated, mobile communications device 705 may be in communication with server 721 through network 709. Network 709 may take a variety of forms as described herein, such as one or more of the Internet, a wireless WAN, wireless LAN, a mesh network, wireless broadband connection (e.g., 4G/5G), or other suitable types of network communications. Network 709 and server 721 may correspond to network 140 and server 130 described above.

Disclosed embodiments may further include causing a second wireless transmitter located in the first mobile communications device to transmit in a second hop to the remote server for storage in the first shooter's associated record. The second wireless transmitter may be located in the mobile communication device, and may be configured to, for example, send signals via Wi-Fi, cellular broadband communications, or other suitable forms of wireless communications. As described herein, the record associated with the first shooter may be stored locally on the server. In some embodiments, the record may be stored on a database in communication with the server. The information may be indicative of the first shooter's identity and information indicative of projectile hits on the first disposable target, as described above.

According to disclosed embodiments, the method may further include determining, prior to the second hop whether the mobile communications device has wireless connectivity to a network, and delaying transmission of the second hop until wireless connectivity is established. For example, the shooter may be in a remote location in which Wi-Fi or cellular broadband connectivity are not available. Thus, the mobile communications device may determine that it does not have wireless connectivity and may store the received information until the mobile device is in a location in which connectivity is available.

In some embodiments, the method may further include receiving, in response to the second hop, information relating to the hits on target, and causing the mobile communications device to display the information. As described herein, information relating to the hits on target may include number of hits on the target, the number of hits in specific target zones, a score associated with a group of the hits, scores associated with individual hits on target, locations of the hits on the target, a number of hits outside of a target region, a ratio between target hits and target misses, a timing associated with hits of the target (e.g., a timestamp associated with the hits, a duration during which the hits occurred, etc.), or any other information associated with hits on a target. In some embodiments, the mobile device may display a representation of the target, along with indications on the target of where the hits are located. Other information may be displayed by the mobile communications device in alternative to or in addition to the information relating to the hits, for example, information related to the shooter, shooter statistics, equipment information, competition or distance information. Information may include shooter statistics, such as historical average scores, an experience level, previous scores or numbers of hits, previous high scores, or other statistical information about the shooter. In some cases, information may include game instructions. For example, the mobile communications device may display information conveying the type of target at which to shoot, the distance at which to shoot, the number of shots in a round, the maximum score, which target regions to shoot at, or other rules or guidelines on how to properly play a particular shooting game. In some embodiments, displaying the information may include displaying graphics, animations, cutscenes, timers, or other graphical elements. Displaying the information may include presenting audio, vibrating the mobile communication device, illuminating an indicator light, or other forms of presenting information.

In some embodiments, an image of the target may appear on the shooter's mobile communication device, and the shooter may be graphically directed to shoot at certain regions of the target during certain time periods. For example, bonus points might be awarded if the shooter hits a region designated for bonus. In addition or alternatively, audio may be caused to be presented via the mobile communications device in order to maximize point scoring. For example, the audio may include phrases like, "Hit the torso for extra points now!" The audio may play through earbuds or headphones wireless paired to the mobile communications device.

In some embodiments, the information may include comparative data with other shooters who are participating in a common competition. For example, the information may include information related to relative scores, highest score of a particular round, highest score of a single projectile, average score per projectile fired at the target, or other relevant information suitable for comparing competing shooters. Consistent with further embodiments, the information may include comparative data about how current hits on target impact a status of the shooter in multiple competitions. For example, a shooter may be competing in multiple close competitions. Given the performance of other shooters, the shooters most recent shots may have raised or lowered the shooter's rank in each competition. Accordingly, the mobile communications device may display information indicating the shooter's relative position change in each competition.

In some disclosed embodiments, the information may include an experience level of the shooter. An experience level of a shooter may indicate an amount of time the user has competed, a number of competitions the shooter has participated in, a number of times the shooter has won a competition, a percentage of times a shooter wins, a number of target hits, a number of total shots fired, a total time the user has been associated with the system, or other information suitable for indicating a relative proficiency level of the shooter. In some embodiments, information may include an indication of a winner of a competition. The winner of the competition may be determined based on the projectile hits on the target and may be determined according to particular rules of a game. In some embodiments, the winner may be a shooter having the most target hits. Alternatively or additionally, the winner may be determined based on a ratio of hits to misses, a timing of target hits, a number of target misses, an indication of which target or targets the user hit, or any other information that may differentiate performance of one shooter as compared to one or more other shooters. As described herein, when the first shooter is in a competition with a second shooter, the winner may be determined based on the projectile hits on the first target and the projectile hits on the second target of the second shooter.

According to disclosed embodiments, displaying the information comprising competitive data may include displaying a leaderboard ranking a plurality of shooters competing in the common competition based on performance. A leaderboard may indicate a score for a particular game for each listed shooter. The scores may be listed from, for example, highest to lowest, to indicate which shooter is leading the listed shooters. The leaderboard may be generated for specific game types, listing each of the shooters participating in that particular game type and their associated score. In some embodiments, the leaderboard may include shooters firing at the same type of target. For example, transmitter 703 may determine a target type associated with target 701 and may provide this information to server 721 (e.g., via mobile communications device 705). Server 721 may then match shooter 707 with other users shooting on a same target type as target 701 (which may be shooter 717, for example). Accordingly, the leaderboard may include a group of shooters shooting on the same target. The leaderboard may group users based on other criteria, such as a particular game being played, based on user rankings, geographic locations, a random grouping, a predetermined association between two or more players (e.g., a "friends" list, or other grouping), or various other criteria. In some embodiments, the leaderboard may be a global leaderboard, including all users associated with server 721. Alternatively or additionally, the leaderboard may include a subset of users. For example, the system may group users into one or more "rooms" having a predetermined number or range of users.

In some embodiments, the leaderboard may be based on a league of specific participants. A group of shooters may wish to compete against each other over a specific period of time. By way of example, a group of eight friends may wish to compete with each other over a period often weeks. The friends may each shoot one game per week for each of the ten weeks. Each week, a leaderboard may be generated with each shooter's score from that week. Additionally or alternatively, each shooter's performance may be cumulatively tracked over a number of different games. Thus, a leaderboard may be generated ranking the shooters based on their overall aggregate scores totaling the scores over the number of completed weeks.

Other types of leaderboards are also possible. By way of example, a leaderboard may be created ranking total all-time aggregate scores. As another example, a hall of fame leaderboard may be generated, also ranking shooters over a longer period of time. In some embodiments, leaderboards may be generated based on the on a ranking score generated for each shooter. The ranking score may, for example, take into account a variety of factors of the shooter's performance over multiple games or multiple game types, such as the number of hits, average number of hits, hit percentage, average distance shot, difficulty of games played, shot consistency, or various other suitable factors. Shooters may then be ranked in leaderboards according to the ranking score.

Figure 8A:
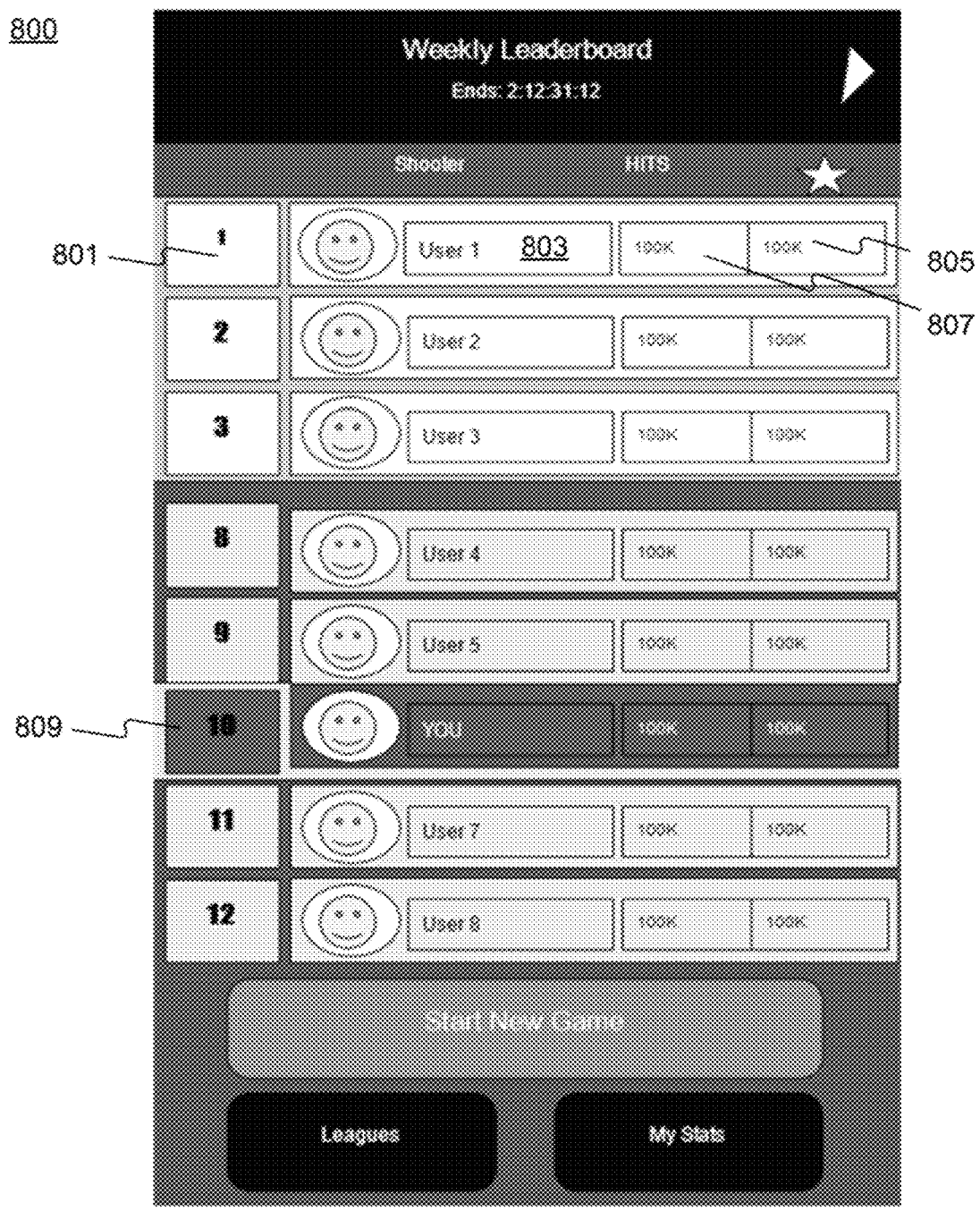
FIG. 8A is a depiction of an exemplary interface showing a leaderboard of shooters.

FIG. 8A is a depiction of an exemplary interface 800 showing a leaderboard of shooters. The leaderboard may indicate relative position rankings 801. Each ranking may be assigned to particular user/shooter 803. The interface may also indicate the shooter's number of hits 807 and a score 805. The user viewing the leaderboard may also view a highlighted entry 809 that highlights the user's relative position on the leaderboard.

Figure 8B:
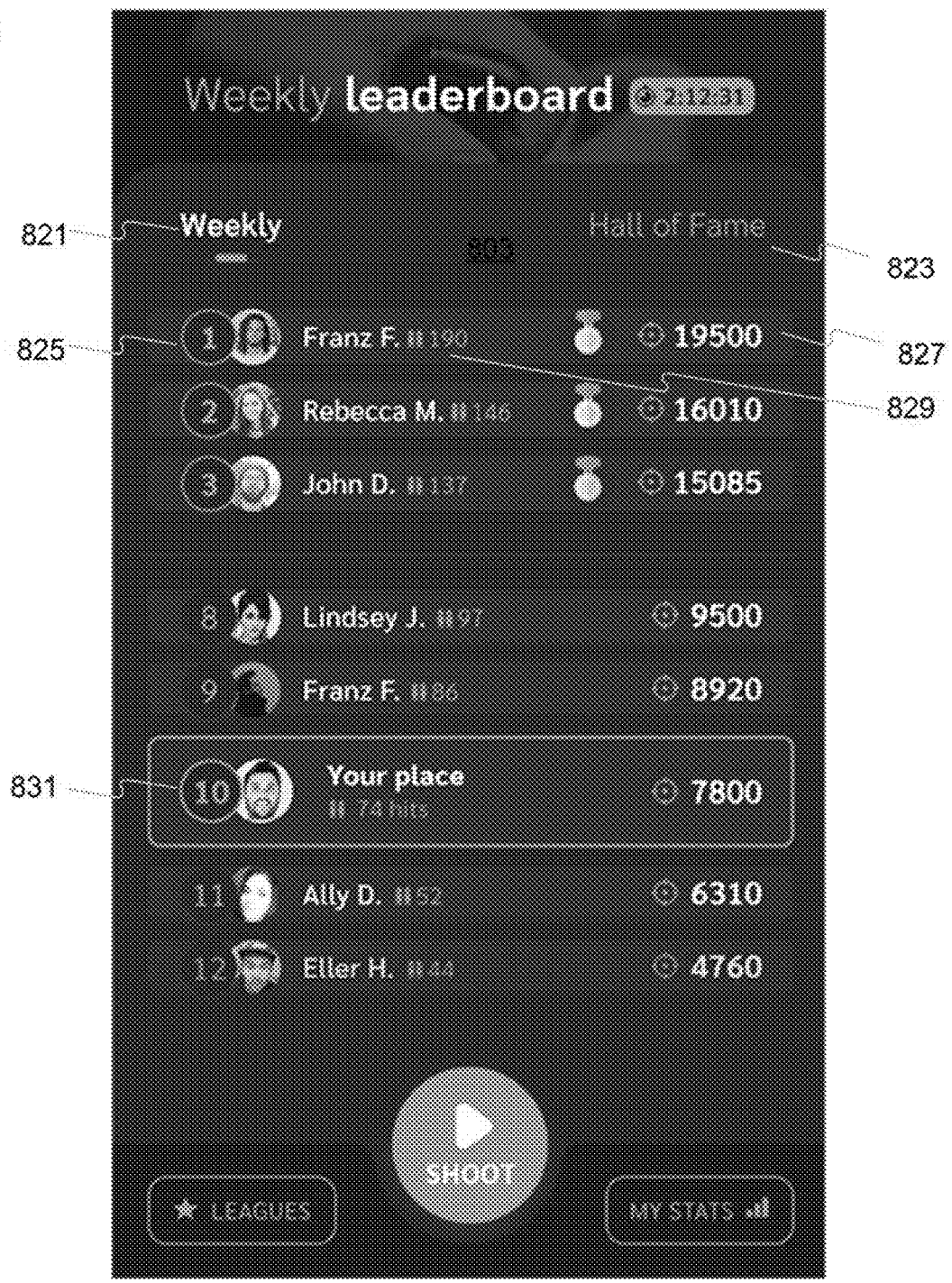
FIG. 8B is a depiction of an exemplary interface showing a leaderboard of shooters, consistent with disclosed embodiments.

FIG. 8B is a depiction of an exemplary interface 820 showing a leaderboard of shooters. The interface may provide options to choose between viewing a weekly leaderboard 821 or a hall of fame leader board 823. The leaderboard may indicate relative position rankings 825. Each ranking may be assigned to particular user/shooter. The interface may also indicate the shooter's number of hits 829 and a score 827. The user viewing the leaderboard may also view a highlighted entry 831 that highlights the user's relative position on the leaderboard. The leaderboard may include other information such as a user image, a username, a ranking, badges or other icons associated with the user, or any other information associated with the user in the system.

Figure 8C:
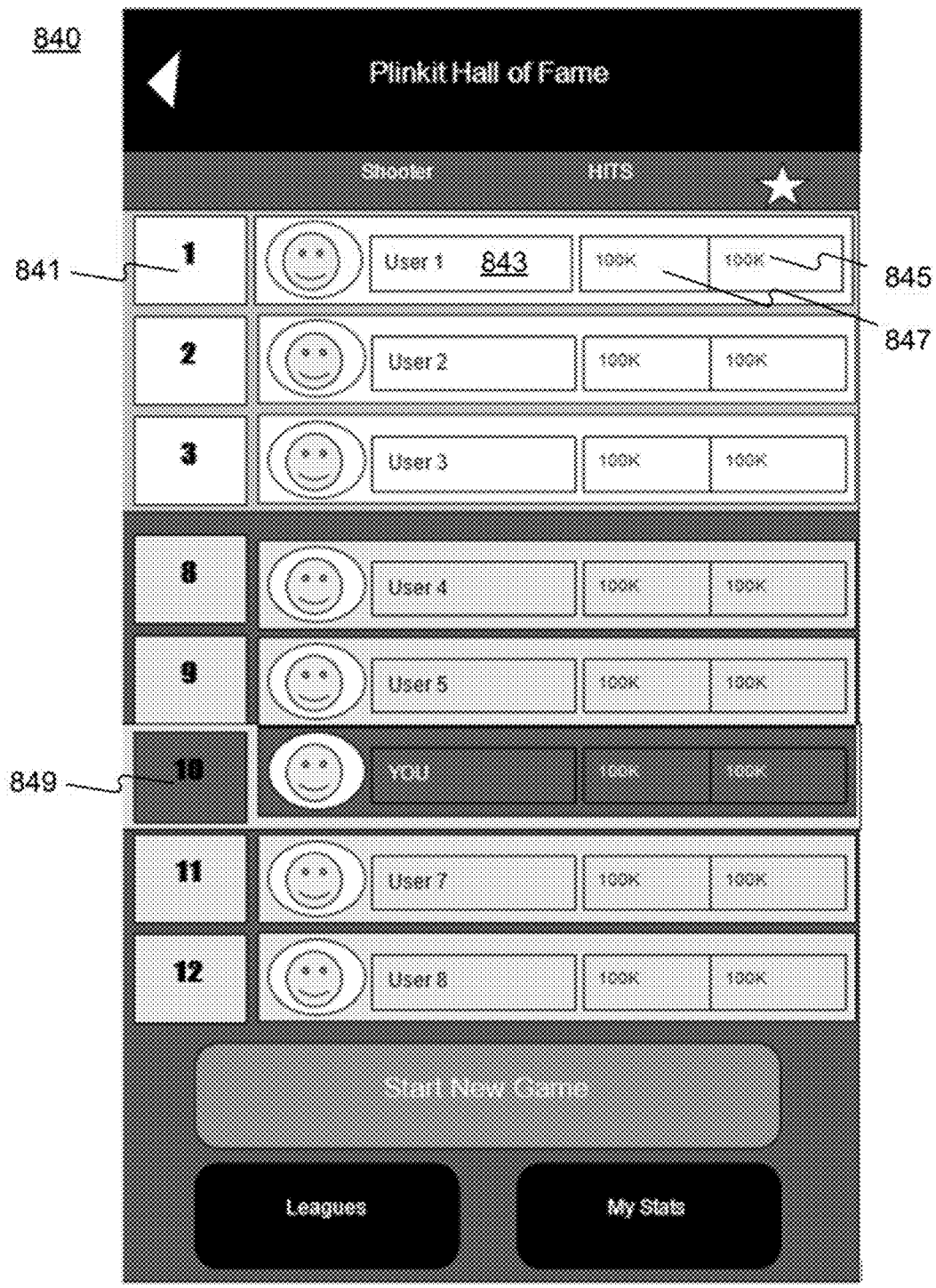
FIG. 8C is an exemplary interface showing a shooters leaderboard, consistent with disclosed embodiments.

FIG. 8C is an exemplary interface 840 showing a leaderboard of shooters. The leaderboard may be a hall of fame leaderboard indicating the rankings of shooters over long period of time. The leaderboard may indicate relative position rankings 841. Each ranking may be assigned to particular user/shooter 843. The interface may also indicate the shooter's number of hits 847 and a score 845. The user viewing the leaderboard may also view a highlighted entry 849 that highlights the user's relative position on the leaderboard. The leaderboard shown in FIG. 8C may be a "Hall of Fame" leaderboard, indicating a cumulative performance for a group of users over multiple competitions or games.

Disclosed embodiments may further include pairing a third wireless transmitter, temporarily attached to a second disposable target, with a second mobile communications device associated with a second shooter. Pairing the third wireless transmitter with the second mobile communications device may occur substantially as described herein with respect to pairing first wireless transmitter and the first mobile communications device. Since embodiments of this disclosure permit persons to participate in competitions or to socially shoot with others who are not co-located, the second shooter, the second mobile communications device and the second target may be located far away from or near the first shooter.

Disclosed embodiments may further include wirelessly receiving from the third wireless transmitter, in a third wireless hop, signals indicative of projectile hits on the second disposable target. Wirelessly receiving signals indicated of projectile hits on the second target from the third wireless transmitter may occur substantially as described above with respect to the first wireless transmitter. And the third wireless hop may occur in a manner similar to described in connection with the first wireless hop.

As shown in FIG. 7, system 700 may include a second disposable target 711 connected to second transmitter 713. As described herein, second transmitter 713 may collect data related to projectile hits on second target 711. Second transmitter 713 may be paired with second mobile communications device 715, as described earlier in connection with the pairing of the first transmitter 703 to wireless communications device 705. In some embodiments, second mobile communications device 715 may be associated with and store information related to second shooter 717. As described herein, second mobile communications device 715 may store a variety of information about second shooter 717, including identifying information such as a name, username, email address, and others. As illustrated, second mobile communications device 715 may be in communication with server 721 through network 709.

Disclosed embodiments may further include accessing information indicative of an identity of the second shooter. Accessing information indicative of the identity of a second shooter may occur substantially as described herein with respect to accessing information indicative of the identity of the first shooter. For example, accessing information indicative of the identity of the second shooter may include reading, loading, opening, downloading, retrieving, extracting, or otherwise obtaining stored data having the information. The information may be accessed locally (e.g., from a memory of mobile communications device 715) or from a remote device.

Disclosed embodiments may further include accessing the address of the remote server where a record associated with the second shooter is maintained. Accessing the address of the remote server may occur substantially as described above with respect to accessing the address of the remote server where a record associated with the first shooter is maintained. The server storing the record of the first shooter and the server storing the record of the second shooter may be same server. In some embodiments, different servers may store different records associated with different shooters.

Disclosed embodiments may further include causing a fourth wireless transmitter located in the second mobile communications device to transmit in a fourth hop to the remote server for storage in the first shooter's associated record, the information indicative of the second shooter's identity and information indicative of projectile hits on the second disposable target. Causing a fourth wireless transmitter to transmit information to the remote server may occur substantially as described above with 2R respect to the second wireless transmitter. For example, mobile communications device 715 may include a wireless transceiver configured to communicate through network 709 with server 721.

Disclosed embodiments may further include transmitting for display to the second shooter on the second mobile communications device, information about the projectile hits on the first target by the first shooter. Transmitting may occur in a variety of ways, as described herein. For example, the remote server may transmit over a series of connected networks (e.g., local network. Internet, cloud, wired telecom infrastructure, wireless telecom infrastructure, wireless connections (e.g., wireless broadband. Wi-Fi, or other suitable wireless connection type) information to the second mobile communications device. As with all the transmission in this disclosure, precise mechanism of transmission is not critical so long as the information is caused to travel from an originating location to an intended receipt location. Information about projectile hits on a target may be provided or displayed on a device in a variety of ways, as described by way of a few examples herein. As an example, the second mobile communications device might display the number of hits of the first shooter or the score associated with the hits of the first shooter. As another example, the second mobile communications device may display an image representing the First disposable target with an indication of target hits on at least one target region of the first disposable target. In some embodiments, the second mobile communications device may display one or more leaderboards, as described above.

Disclosed embodiments may further include transmitting for display to the first shooter on the first mobile communications device, information about the projectile hits on the second target by the second shooter. Transmitting for display to the first shooter on the first mobile communications device, information about the projectile hits on the second target by the second shooter may occur substantially as described above with respect to the transmitting information for display to second mobile communications device. As an example, the first mobile communications device may display art image representing the second disposable target with an indication of target hits on at least one target region of the second disposable target. The image may update in real time (or near real time) to display target hits by the second shooter as they occur. For example, the mobile communications device may overlay bullet holes, an image associated with the user (e.g., a profile picture, a predetermined icon, etc.) or other graphics indicating the locations of the second shooter's hits on the target. In some embodiments, the first shooter's hit locations may also be displayed on the same target, allowing the first shooter to compare the first shooter's target hit locations with the second shooter's target hit locations. This may also include displaying information associated with a particular game. For example, a game may require a user to draw a shape with target hit locations and thus the display may include one or more lines connecting target hit locations. As another example, a game may require a shooter to hit a particular target zone identified on the displayed target. Accordingly, a hit on the specified target area may award a shooter with more points than a hit on an incorrect target area. The display may also present various graphics, icons, animations, timers, sounds, visual effects, cutscenes, rules, notifications, or other information, which may depend on a particular game or competition the users are engaged in. The games described above are intended as examples and it is to be understood that the options for gameplay rules are not limited to any particular format. Further, while the example above is described with respect to two players, it is to be understood that any number of players may compete using the disclosed systems and methods. Accordingly, the disclosed embodiments may further include receiving target hit information from other shooter, which may also be displayed on the mobile communications devices of the first shooter. In some embodiments, the competition may be displayed in the form of a leaderboard including the first shooter's target hit information, the second shooter's target hit information, and any number of additional shooters.

In some embodiments, the first shooter may be located in a first location and the second shooter may be located in a second location, remote from the first location, and the remote server may be configured to establish a competition between the first shooter and the second shooter. As an example, the first shooter and the second shooter may be located in locations geographically separate from each other, such as at different shooting ranges, in different cities, states, countries, or even on different continents. However, the remote server may permit the two shooters to compete against each other, despite the different geographic locations. As described herein, the competition may be established between the two shooters, for example, such that shooter that achieves more hits on the target or achieves the higher score wins. This may include additional shooters from other geographic regions, as described above.

Disclosed embodiments may further include receiving from the first shooter or the second shooter an image associated with a shooting session, and wirelessly uploading the image to the remote server. An image may be received by, for example, the shooter taking a picture with a camera integrated into the shooter's corresponding mobile communications device. The image may then be wirelessly uploaded to the server by the mobile communications device according to a suitable wireless communications method as described herein. As an example, a shooter may upload a picture of his target before shooting any projectiles at the target. As another example, a shooter may upload an image of a target after it has been shot by a certain number of projectiles. In some embodiments, the image may be uploaded in a manner permitting others to view the image. For example, an image may be uploaded by the first shooter such that the second shooter can view the image. As another example, an image may be uploaded by a shooter that is a member of league group. The shooter's image may be uploaded such that all members of the league group can view the image. The image may include other objects, such as a face of the user, a firearm of the user, the shooting range at which the user is located, or any other image that may be of interest to other users.

Disclosed embodiments may further include prompting the first shooter to provide the identity of the second shooter. For example, the remote server may send a communication to the first communications device prompting the first shooter to identify a second shooter. An identification of the second shooter may be provided by supplying or approving the second shooter's name, picture, username, email address, or other information identifying the second shooter. In some embodiments, the first shooter may select the second shooter from a list of shooters. For example, the first shooter may select the second shooter from a "friends" list of the first shooter, a list of currently active shooters, a list of shooters in the same geographical region, a list of shooters with similar statistics or experience, a list of shooters in the same league or other grouping, or a group of shooters defined by any other criteria. The identification of the second shooter may be used to verify that the first shooter wishes to enter a competition with the second shooter or to commence a competition between the two shooters. Similarly, the remote server may prompt the second shooter to provide or verify the identity of the first shooter.

FIG. 9A is a flowchart illustrating an exemplary process 900 for remote monitoring of shooting performance, consistent with disclosed embodiments. Process 900 may be performed by a system of devices, for example, including transmitter, mobile communications devices, and a server. Various steps of process 900 may be executed by a processing device, such as any of the processors described throughout the present disclosure. It is to be understood that throughout the present disclosure, the term "processor" is used as a shorthand for "at least one processor." In other words, a processor may include one or more structures that perform logic operations whether such structures are collocated, connected, or disbursed. In some embodiments, a non-transitory computer readable media may contain instructions that when executed by a processor cause the processor to perform process 900. Process 900 is not necessarily limited to the steps shown in FIG. 9A and any steps or processes of the various embodiments described throughout the present disclosure may also be included in process 900.

At step 901, process 900 may include pairing a first wireless transmitter, temporarily attached to a first disposable target, with a first mobile communications device associated with a first shooter. The first wireless transmitter and the first mobile communications device may be paired in a variety of ways, as described herein.

At step 903, process 900 may include wirelessly receiving from the first transmitter, in a first wireless hop, signals indicative of projectile hits on the first disposable target. Wirelessly receiving may include receiving a wireless signal communicating data from one device to another device, as described herein. Signals indicative of projectile hits may take a variety of forms and convey a variety of information.

At step 905, process 900 may include accessing information indicative of an identity of the first shooter. Accessing information may include reading, loading, opening, downloading, retrieving, extracting, or otherwise obtaining stored data having information. Information indicative of an identity of a shooter may take a variety forms, for example, name, age, address, an identification number or ID, username, email address, or other information suitable for identifying a shooter.

At step 907, process 900 may include accessing an address of a remote server where a record associated with the first shooter is maintained. Accessing an address of a remote server may include accessing a network location or link stored locally on the device executing the accessing step (e.g., first mobile communication device). The remote server may be associated with a central platform that manages various competitions between shooters, shooter information and statistics, locations, and other relevant information. The remote server may locally store records associated with shooters. In some embodiments, the remote server may be associated with a database or cloud storage platform that stores shooter records. Records associated with shooters may include a variety information specific to the shooter, for example, shooter identity information, information or statistics regarding past shooter activity or performance (e.g., previous scores, competitions completed, and other shooters competed against), other shooters associated with the shooter associated with the record, equipment information, associated shooting ranges or locations, an experience level of the shooter, information or rankings indicative comparisons between the shooter and other shooters, and other information relevant to the shooter.

At step 909, process 900 may include causing a second wireless transmitter located in the first mobile communications device to transmit the information indicative of the first shooter's identity and information indicative of projectile hits. The second wireless transmitter may be located in the first mobile communication device, and be configured to, for example, send signals via Wi-Fi, cellular broadband communications, or other suitable forms of wireless communications. According to disclosed embodiments, step 909 may further include determining, prior to the second hop whether the mobile communications device has wireless connectivity to a network, and delaying transmission of the second hop until wireless connectivity is established. For example, the shooter may be in a remote location without access to wireless connectivity. Thus, the first mobile communications device may determine that it does not have wireless connectivity and may store the received information until the mobile device is in a location in which connectivity is available.

In some embodiments, step 909 may further include receiving, in response to the second hop, information relating to the hits on target, and causing the mobile communications device to display the information. The information may take a variety forms, for example, shooter statistics, game instructions, comparative data with other shooters who are participating in a common competition, comparative data about how current hits on target impact a status of the shooter in multiple competitions, an experience level of the shooter, an indication of a winner of a competition, or other relevant information. In some cases, a leaderboard may be displayed ranking a plurality of shooters based on performance.

At step 911, process 900 may include pairing a third wireless transmitter, temporarily attached to a second disposable target, with a second mobile communications device associated with a second shooter. Step 911 may occur substantially as described with respect to step 901. After step 911, process 900 may proceed to step 913 of process 950, as illustrated in by FIG. 9B, which is a continuation of the process described in FIG. 9A.

At step 913, process 950 may include wirelessly receiving from the third wireless transmitter, in a third wireless hop, signals indicative of projectile hits on the second disposable target. Step 913 may occur substantially as described with respect to step 903.

At step 915, process 950 may include accessing information indicative of an identity of the second shooter. Step 915 may occur substantially as described with respect to step 905.

At step 917, process 950 may include accessing the address of the remote server where a record associated with the second shooter is maintained. Step 917 may occur substantially as described with respect to step 907.

At step 919, process 950 may include causing a fourth wireless transmitter located in the second mobile communications device to transmit in a fourth hop to the remote server for storage in the second shooter's associated record, the information indicative of the second shooter's identity and information indicative of projectile hits on the second disposable target. Step 919 may occur substantially as described with respect to step 909.

At step 921, process 950 may include transmitting for display to the second shooter on the second mobile communications device, information about the projectile hits on the first target by the first shooter. Transmitting may occur in a variety of ways, as described herein. Information about projectile hits on a target may be provided or displayed on a device in a variety of ways, as described herein. As an example, the second mobile communications device might display the number of hits of the first shooter or the score associated with the hits of the first shooter. As another example, the second mobile communications device may display an image representing the first disposable target with an indication of target hits on at least one target region of the first disposable target.

At step 923, process 950 may include transmitting for display to the first shooter on the first mobile communications device, information about the projectile hits on the second target by the second shooter. Step 923 may occur substantially as described with respect to step 921.

Aspects of this disclosure may include systems, methods, and computer readable media for remote monitoring of shooting performance and enabling competition between geographically separated shooters. For example, disclosed embodiments may include a non-transitory computer readable medium containing instructions that when executed by at least one processor, cause the at least one processor to perform a method. The method may enable location-specific remote monitoring of shots fired at disposable conductive targets. A disposable target may be attached to a wireless transmitter for providing data to a mobile device associated with a shooter, as described above. The mobile device may determine location information of the mobile device and send the location information and the data to a central server. The central server may store the location information and data in association with information about the shooter. The central server may process the location information to, for example, determine a specific shooting range associated with the location. The central server may also provide the stored location information, shot data, and shooter information to a third party, such as a shooting range or merchant. Exemplary aspects of disposable targets, wireless transmitters, mobile devices, and servers are described throughout the disclosure.

For ease of discussion, a method is described below, with the understanding that aspects of the method apply equally to systems, devices, and computer-readable media. For example, some aspects of such a method may occur electronically over a network that is wired, wireless, or both. Other aspects of such a method may occur using non-electronic means. In a broadest sense, the method is not limited to particular physical and/or electronic instrumentalities, but rather may be accomplished using many differing instrumentalities. The method may be executed for example, by a central server that sends and receives data from other communication devices.

Some disclosed embodiments may involve receiving from a mobile communications device of a shooter, target hit data received via electronic circuitry temporarily connected to a disposable conductive target. Receiving from a mobile communications device may occur through any form of electronic communication. Such electronic communication may occur, at least in part, over a telecommunications network having a plurality of nodes connected by links. The network may include wired and wireless communications links. Disclosed embodiments are not limited to any particular network configuration. Rather, any manner in which target hit information (and other relevant information discussed herein) is received is intended to fall within the scope of this disclosure. For example, the target hit data, as described below, may be received through one or more of a variety of wireless connection types, such as Wi-Fi, cellular broadband communications (e.g., 4G, 5G. GSM, or others, satellite, combinations of two or more of the foregoing, or other suitable communications protocols. In some embodiments, receiving the target hit data may occur over a wired connection.

As described herein, the mobile communications device may receive target hit data from circuitry connected to a disposable conductive target. The circuitry may be in a variety of forms, as described throughout. For example, the circuitry may be associated with connector device 110, as described above. The mobile communications device may receive the target hit data through one of a variety of connection types, such as Bluetooth™, Bluetooth Low Energy™, infrared light, near-field communication (NFC), ultra-wideband, ZigBee®, Z-Wave®, or other suitable wireless communication methods or protocols.

As described herein, information relating to the hits on target may include any information indicating or associated with hits on a conductive target. For example, the target hit data may include number of hits on the target, the number of hits in specific target zones, a score associated with a group of the hits, scores associated with individual hits on target, locations of the hits on the target, a number of hits outside of a target region, a ratio between target hits and target misses, a timing associated with hits of the target (e.g., a timestamp associated with the hits, a duration during which the hits occurred, etc.), or any other information associated with hits on a target.

The mobile communications device may include any portable device configured to receive and/or transmit information wirelessly, as described above. For example, the mobile communications device may correspond to mobile communications device 120, as described above. In some embodiments, the mobile communications device may be a cell phone, smart glasses, smart watch, other wearable communications device, laptop computer, tablet, or any other apparatus capable of receiving wireless communications. The mobile communications device may be associated with a shooter. For example, the mobile communications device may be the shooter's personal smart phone. As another example, the mobile communications device may be a tablet provided to a shooter by a shooting range (e.g., checked out to a shooter, installed within a lane of a shooting range, or otherwise provided by the shooting range). The tablet may be associated with the shooter, by for example, the shooter logging into an account on the tablet.

Disclosed embodiments may further include receiving from the mobile communications device of the shooter, identity information of the shooter. Identity information of a shooter may refer to any information linked to the shooter, information from which the identity or a characteristic of the shooter may be ascertained, or information that reflects or distinguishes one shooter from another shooter. For example, identity information may include a name, age, address, an identification number or other ID, username or nickname, email address, user credentials (e.g., a password), an electronic taken, or other information suitable for distinguishing a shooter. In other embodiments, the identity information may indirectly identify the shooter, such as by identifying the shooter's mobile communications device or an ID associated with the mobile communications device. In yet other embodiments, the identity information may simply be an IP address associated with the mobile communications device being used by the shooter.

Receiving identity information from a mobile communications device may occur through a variety of connection types, such as over a telecommunications network or one or more wired or wireless networks as described earlier. Identity information may be stored locally on the mobile communications, for example, in one or more memory devices of the mobile communications device. In some embodiments, the identity information may be stored remotely from the mobile communications device and accessed by the mobile communications device before sending the information. As an example, the information may be stored by a remote server, database, or cloud storage service. In such cases, accessing the information may include requesting the information from a server or cloud service or querying a database in which the information is stored.

Some disclosed embodiments may involve receiving from the mobile communications device of the shooter, location data, such as GPS data, reflective of a location where fired shots occurred, from which the target hit data was generated. The location data may be received from the mobile communications device in much the same way as other information is received as described earlier, such as over a telecommunications network or through a number or combination of wired and wireless connections. As used herein, location date may refer to any type of data indicating a relative location of the mobile communications device. For example, the location data may include Global Positioning System (GPS) data, such as GPS coordinates. Location data may include data related to other satellite-based navigation systems, such Galileo. GLONASS, BeiDou, or other satellite-based systems or standards. In some embodiments, location information may be determined by, for example, by multilateration or similar suitable techniques based on cell towers, antennas, or other signal receivers. As an example, a mobile communications device may emit a signal and determine its position based on the time it takes to receive a response from 3 nearby cell towers. In some cases, a cellular provider associated with the mobile communications device may similarly determine the location and relay the location to the mobile communications device or to a central server. Other types of location data are possible, such as latitude and longitude pairs, a geolocation based on an IP address, or other data indicative of a geographic position. Location information may also be determined based on an IP address. For example, if the shooter is communicating through a local area network such as may be employed at a shooting range, the IP address of a local device might serve as data to identify the location. Similarly, a local shooting range might, via its own local hub, mediate communications with a central server. In the context of this disclosure, both of these prior examples constitute receiving, from the mobile communications device of the shooter, location data reflective of a location where shots from which the target hit data was generated were fired, (i.e., the communications received from the mobile communications device used by the shooter travels via a local network or via a local hub, and thus through the association the shooter's location is effectively provided by transmissions from the mobile communications device through the local network or local hub.) In some embodiments, the location data may be entered manually, for example, by a user identifying a shooting range through a graphical user interface displayed on the mobile communications device. If the mobile communications device is provided by the shooting range, as described above, the location may be prestored within the mobile communications device. In some embodiments, the location data may be received by the mobile communications device from a connector device attached to the target. For example, the connector device may include a GPS chip or similar chip for determining location data, which may be transmitted to the mobile communications device.

The location data may relate to the location of the mobile communications device when the device received the target hit data. Thus, the location information may reflect a location where the shots associated with the target hit data were fired. By way of example, the mobile communications device may receive the target hit data from a wireless transmitter attached to the target, using a short-range communication method, as described above. Thus, the location of the mobile communications device at the time of receipt of the target hit data, or a predetermined time before the time of receipt, can correspond to the location from which the shots were fired.

Disclosed embodiments may further include updating a database, associating the location with the identity information of the shooter and the target hit data. A database may include any collection of data values and relationships among them, regardless of structure. As used herein, any data structure may constitute a database. The data contained therein may be stored linearly, horizontally, hierarchically, relationally, non-relationally, uni-dimensionally, multidimensionally, operationally, in an ordered manner, in an unordered manner, in an object-oriented manner, in a centralized manner, in a decentralized manner, in a distributed manner, in a custom manner, or in any manner enabling data access. By way of non-limiting examples, data structures may include an army, an associative array, a linked list, a binary tree, a balanced tree, a heap, a stack, a queue, a set, a hash table, a record, a tagged union, ER model, and a graph. For example, a data structure may include an XML database, an RDBMS database, an SQL database or NoSQL alternatives for data storage/search such as, for example. MongoDB. Redis. Couchbase. Datastax Enterprise Graph. Elastic Search. Splunk, Solr. Cassandra, Amazon DynamoDB, Scylla. HBase, and Neo4J. A data structure may be a component of the disclosed system or a remote computing component (e.g., a cloud-based data structure). Data in the data structure may be stored in contiguous or non-contiguous memory. Moreover, a data structure, as used herein, does not require information to be co-located. It may be distributed across multiple servers, for example, that may be owned or operated by the same or different entities. Thus, the term "data structure" as used herein in the singular is inclusive of plural data structures.

The database may be said to be "updated" when new information is added to the database. This may occur, for example with a new shooter opening a new account, or establishing a new record, which results in the database being updated. Similarly, an existing shooter with an established account and a corresponding record in the database, may be said to cause an update in the record when the shooter initiates a new shooting session, in such an instance, the database might be updated with the shooting location associated with the new shooting session.

In some embodiments, the database may be stored locally on the device performing the updates. For example, the database may be local storage of a central server that receives the target hit data, identity information, and location information from the mobile communications device. The database may take other forms, such as a remote or network-attached database, a cloud-based storage service, or other suitable form of data storage. Association of the location, identity information, and target hit data may be achieved by creating a data record in the database storing, linking, or otherwise relating the three types of information together. As an example, a record or profile for the shooter may be created that contains one or more aspects of the shooter's identity information. The received identity information may be used by the server to identify the shooter and the shooter's associated data record. The server may retrieve the data record, then save the location (and/or the location data) and target hit data in the database. The location and target hit data may be saved in the shooter's record. In some embodiments, the location and target hit data may be saved in a new record that is linked to or references the shooter's data record. The information may be stored in any manner such that querying the database for the shooter's information could return the location and target hit data. It is understood that multiple different locations and sets of target hit data may be associated with a single shooter. Similarly, multiple sets of target hit data may be associated with a single location and/or a single shooter.

Some disclosed embodiments may involve performing a lookup using the location data to ascertain a shooting range corresponding to the location where the shots were fired. As an example, performing the lookup may include comparing the location to stored shooting range locations. For example, once the location of the mobile communications device is known through GPS data or other location mechanisms described earlier, the location information can be compared against known locations of shooting ranges. When this lookup results in a match, the location where the shots were fired may be ascertained. The database of shooting range locations may be local to a device, such as the central server. If a corresponding shooting range is not found, the system may perform a lookup, such as via the internet, to discover a new shooting range corresponding to the identified location. Or, if no known shooting range corresponds to the location data, the system may create a new record for that location, and assume it is a private or new public range. In such instances, a message may be sent back to the shooter's mobile communication device, prompting the shooter to input identifying information for the shooting location.

In some disclosed embodiments, the database of shooting range locations may be a network-attached database, a cloud-based storage service, or other suitable form of data storage. In some embodiments, the database of shooting range locations may be part of a larger database that stores other information such as shooter identity information and target hit data. In some embodiments, ascertaining the shooting range may include determining that the shooter's current location is within a predetermined distance of a known shooting range. For example, if the location data places the shooter within a certain threshold proximity (e.g., 5 m, 20 m, 1 km, or any other suitable range) to a known shooting range location, the corresponding shooting range location may be selected. In some embodiments, the disclosed systems may be configured to differentiate between two or more shooting range candidates. For example, if two shooting ranges are within the threshold distance of the determined location, the system may select one of the two shooting ranges. This may include selecting whichever shooting range is closest to the location determined for the shooter, a shooting range associated with the user (e.g., a range where the user is a member, etc.), a shooting range the user visits more frequently, a shooting range associated with an event associated with a user (e.g., a shooting range competition event in a calendar of the user's phone), or any other data that may indicate one shooting range is a more likely candidate than others. In some embodiments, the system may prompt the user to confirm a selection or to select from multiple shooting ranges.

An ascertained shooting range may be associated in the database with the received location, the identity information of the shooter, and the target hit data. For example, the ascertained shooting range may be added or linked to the record of the shooter stored in the database, along with the target hit data. Some embodiments may involve determining whether the shooter has not previously been associated with the shooting range in the database. If the shooter has not previously been associated with the shooting range in the database, an association may be established in the database and the shooter may be awarded a badge associated with the shooting range. A badge may, for example, be a reward or other form of indicator linked with the shooter to be presented on the shooter's profile or otherwise associated with the shooter's data record indicating that the shooter visited the shooting range. The badge may be awarded based on the shooter information being linked with a particular shooting range or other location. Awarding the badge may include transmitting, to the mobile communications device, and indication to display an icon or other graphic associated with a shooting range. This feature may allow a shooter to collect badges indicating all the ranges that the shooter has used. Badges may be displayed to the user on an interface of an app running on the user's mobile communications device. In some embodiments, the user's badges may be made visible to other shooters through apps running on their phones.

Similarly, when a shooter wins a competition or achieves a milestone, the shooter may receive a badge or some other type of virtual trophy that may be collected and displayed in a similar manner.

In some embodiments, badges may be unique to particular shooting ranges. For example, a shooter may "collect" badges by visiting multiple ranges. The badges may also be associated with geographic regions, such as different counties, states, countries, climate types, or other geographic regions. In some embodiments, shooters may be awarded additional points towards, for example, a leaderboard or hall of fame ranking, based on receipt of various badges.

While a shooting range location is described by way of example above, various other third-party locations may be linked with the location data received from the mobile communication device. For example, disclosed embodiments may further include performing a lookup using the location data to ascertain a merchant corresponding to the location where the shots were fired. A merchant may be any person, company, organization, or other entity providing merchandise or services that may be associated with shooting or shooting ranges. In some embodiments, the merchant may be related to or associated with a shooting range. As an example, a merchant may have a brick and mortar location within or near a shooting range. According to disclosed embodiments, performing the lookup may include comparing the location to a database of merchant locations. A merchant having a location matching the location data may be determined to be the shooting range at which the shots were fired. The database of merchant locations may be local to a device, such as the central server. In other cases, the database of shooting range locations may be a network-attached database, a cloud-based storage service, or other suitable form of data storage. In some embodiments, the database of merchant locations may be the same database, or a second database associated with, the database described above that may associate the received location with the identity information of the shooter and the target hit data. As with the shooting range, ascertaining the merchant may include determining that the location is within a predetermined distance of the merchant. For example, if the location data is within a certain threshold proximity to the merchant location, the corresponding merchant location may be selected. As described above with respect to selecting shooting ranges, the disclosed systems may be configured to distinguish from multiple candidate merchant locations, or may select more than one merchant. The same or similar processes may be applied to other third parties, such as gun or shooting clubs (either local clubs or national clubs), regulatory authorities, or any other entities that may be interested in shooter locations, demographics, statistics, or the like.

According to some embodiments, an ascertained merchant may be associated in the database with the received location, the identity information of the shooter, and the target hit data. For example, the ascertained merchant may be added or linked to the record of the shooter stored in the database, as well as associated with the target hit data. In some embodiments, the method may include determining whether the shooter has not previously been associated with the merchant in the database. If the shooter has not previously been associated with the merchant in the database, the shooter and the merchant may be associated in the database, as described herein.

Disclosed embodiments may further include identifying at least one pattern within at least one of the target hit data and location data collected over time for a particular shooter, and storing a notation of the identified pattern. A pattern, for example, may be identified by analyzing the shooter's data to determine whether the shooter repeatedly or routinely visits a particular shooting range or merchant, routinely visits a particular shooting range or merchant on a certain day or at certain date or time, routinely spends a certain amount of elapsed time at a particular shooting range or merchant, has visited a particular shooting range or merchant on multiple occasions, frequents shooting ranges or merchants within a certain geographic area, or conducts other relevant repeated or routine actions. In some embodiments, a pattern may relate to the shooter's progress. For example, a remote processor analyzing hit data over time may ascertain a pattern of improvement. The processor may ascertain that there are certain times of day, days of the week, seasons of the year, or the like when the shooter's performance peaks.

When a pattern is ascertained, a notation may be made. A notation, as used herein, refers to any information stored in the database, reflected the pattern. In one example, a notation might indicate a pattern of visits to a particular shooting range on Tuesday evenings, or routinely visits shooting ranges in a particular metropolitan area. The notation might be stored by the database in association with the shooter's information, location information, and target hit data. In some embodiments, the notation may be associated with the shooter's stored data record or profile.

As previously discussed, the pattern may be associated with performance of the shooter. For example, the pattern may note how well the shooter performs during a shooting session based on the target hit data (e.g., a number of target hits, a ratio of target hits to target misses, etc.). The pattern may indicate that the user performs better at particular times of day, particular days of the week, particular shooting ranges, using particular equipment (e.g., firearms, ammunition types, bows, etc.) or any other performance-based metric or pattern. Information indicating trends based on the pattern may be provided to the shooter, for example, through the mobile communications device. Accordingly, a user may gain valuable insights into his or her shooting performance.

Disclosed embodiments may further involve transmitting the identified pattern to a shooting range associated with the location where the shots were fired. A shooting range may be associated with the location, as described above. As an example, the central server may transmit the identified pattern to a computing device associated with the shooting range. The transmitting may occur in any suitable way for allowing the shooting range or other entities to access the information. For example, this may include sending the pattern data via electronic communication, posting the data to server or cloud storage platform accessible to the shooting range, or any other means of communicating data. The shooting range may receive the pattern and use the data to implement changes to the shooting range, generate targeted advertising, generate targeted promotions, or otherwise use the data. Alternatively or additionally, the pattern may be shared with other third-party entities, such as merchants. In some embodiments, the shooting range or other entity may use the received pattern data, or other data, such as received shooter location data to generate a offers or promotions, identify shooter demographics, track attendance and/or performance of particular shooters or groups of users over time, identify peak shooter traffic at a shooting range, track overall shooter performance at particular times, or any other uses that may be beneficial to a shooting range or other third party entity. Such information may be presented to the shooter via an account of the shooter. For example, the shooter may be able to log into an account via a PC, laptop, or any computing device, to gain insights gleaned from the pattern data. Similarly, such pattern data insights may be provided to the shooter via an app running on the shooter's mobile communications device.

The pattern data may also be used by the processor to make recommendations to the shooter. For example, if the processor determines that performance tended to peak on a certain weekday, the processor might send a notification to the user suggesting that the shooter make a schedule adjustment. Recommendations may also include suggestions of where to shoot and might include promotional offers, such as discounts for shooting at certain ranges during certain hours on certain days. Shooting ranges and merchants may also use such a mechanism to communicate with shooters. For example, if a range has excess capacity, it might offer shooters who were previous patrons an incentive to absorb that excess capacity. Through a query of the database, prior patrons can be looked-up and targeted with offers or other messages.

In some disclosed embodiments, the database may be configured to associate the identity information with target hit data from a plurality of differing shooting sessions on a plurality of differing days, and to output to the mobile communications device during a shooting session on a particular day, data reflecting prior shooting performance of the shooter. For example, a shooter account may be established by the processor, creating a record in the database associated with the shooter. Then, every time the shooter uses the app during a shooting session, target hit data may be uploaded to the database and stored in association with the shooter's identity. This may occur, for example, using a time stamp or session stamp, enabling session target hit data to be associated with a session on the day the shots were fired. On a subsequent particular day during a subsequent shooting session, one or more prior days' target hit data may be presented to the shooter via the shooter's mobile communications device. This information may include at least one of target hit data, time of day when shots were fired, the identity of a particular game or target associated with the prior target hit data, the location at which the target hit data was captured, and any other information that might be of interest to the shooter. The information may also include aggregated information from multiple prior sessions. For example, aggregated historical target hit data might be presented to the shooter to enable the shooter to view past performance over an extended period for comparison with current performance.

Some embodiments may involve sending an offer to a wireless mobile communications device of the shooter based on the identified pattern. Such an offer may be sent by, for example, a location of the central server where the pattern was identified. Additionally, or alternatively, in cases where the pattern is sent to a shooting range, an offer may be sent by a computing device associated with the shooting range. An offer may include any form of promotion, advertisement, recommendation, or other information that may be provided to a user. In some embodiments, the offer may be associated with a shooting range associated with the location where the shots were fired. For example, an offer may include a promotion for discounted or additional range time, discounted ammunition, discounted targets, or other promotional offers. Such offers may be transmitted in real time. For example, if the system identifies a pattern that a shooter typically only shoots for 45 minutes, an offer may be sent to the shooter's cell phone during an active shooting session offering an incentive to stay longer. In some embodiments, the offer may include a promotion for a merchant within a predetermined distance from the location where the shots were fired. As an example, the offer may be an offer for a merchant that sells firearms and is located relatively close to the shooting range (e.g., within two blocks, several km., in the same city, etc.) from the shooting range.

The offers may be presented in any suitable format, such as via an electronic communication (e.g., an email. SMS message, etc.), a notification, displayed within a mobile application (e.g., a mobile application associated with the conductive target system), via mail (e.g., a brochure or coupon), or by any other mechanism of communication. As described above, the offer may be presented by the disclosed systems directly, or may be provided by a third party based on data provided by the disclosed systems. In some embodiments, the advertisement may be timed based on the pattern data. For example, if a shooter typically visits a shooting range at a particular time of day, day of the week, time of the year, or other times, the advertisements may be presented during or prior to this time period. The advertisements may also be based on performance or statistics of the user. In some embodiments, the advertisements may target users based on their experience level. For example, beginners may receive offers targeted towards training classes, or beginner equipment, whereas more experienced users may receive offers directed to more advanced classes or equipment. Advertisements may be targeted based on other data, such as demographic data (e.g., gender, ethnicity, age, height, weight, etc.), geographic location, equipment type, or any other information associated with a shooter that may be collected and stored.

Disclosed embodiments may further include providing to the mobile communications device of the shooter, data indicative of the location. As an example, the data indicative of the location may include a map. The map may include one or more visualizations of the location from which shots at a target were fired, the location of the shooting range, a current location of the mobile communications device (i.e., the shooter), a merchant, or other locations. Providing the data indicative of the location may include causing such data to be transmitted over a telecommunications network to the mobile communications device associated with the shooter. Accordingly, the shooter may be able to view shooting ranges he or she has visited, nearby merchants, other suggested shooting ranges, or any other location-based information. Selecting these locations may cause the mobile communications device to display other information, such as tracked activities or statistics associated with shooting ranges, offers associated with shooting ranges, performance of other shooters at a location (e.g., as a leaderboard, etc.), or other data. For example, a shooter who selects a particular shooting range via an app, may be able to view the dates of the shooter's visits to that range as well as performance data associated with each visit. Thus, the data indicative of the location may include a list of shooting ranges previously visited by the shooter. In some embodiments, the mobile communications device may receive or generate the location data indicative of the location and display the information. In other embodiments, the mobile communications device may receive the data indicative of the location from the central server.

Some embodiments may further involve storing data on a plurality of shooters and enabling output of the shooter data organized by associated ranges. For example, the database associating the shooter information with target hit data and location information may include records on multiple shooters. Each of the shooters may be associated with one or more shooting ranges. Some shooters may be associated with a single shooting range, while others may be associated with multiple shooting ranges, or even zero shooting ranges. Accordingly, the shooter profiles may be sorted such that, for example, a list of shooters associated with each range may be generated. The list may indicate each of the shooters associated with a first range, all of the shooters associated with a second range, and so forth. The list may also include other data such as shooter demographic data, performance data, or any other data that may be associated with a shooter. Such a list, or other data formats, may be transmitted to other devices, such as that associated with a shooting range or merchant. Additionally, or alternatively, the data may be transmitted to a shooter's mobile communications device. Providing such data to a shooter may permit to the shooter, for example, to contact other shooters that frequent a particular shooting range and initiate new competitions, practice together, share information, or generally communicate through the app or portal.

Figure 10A:
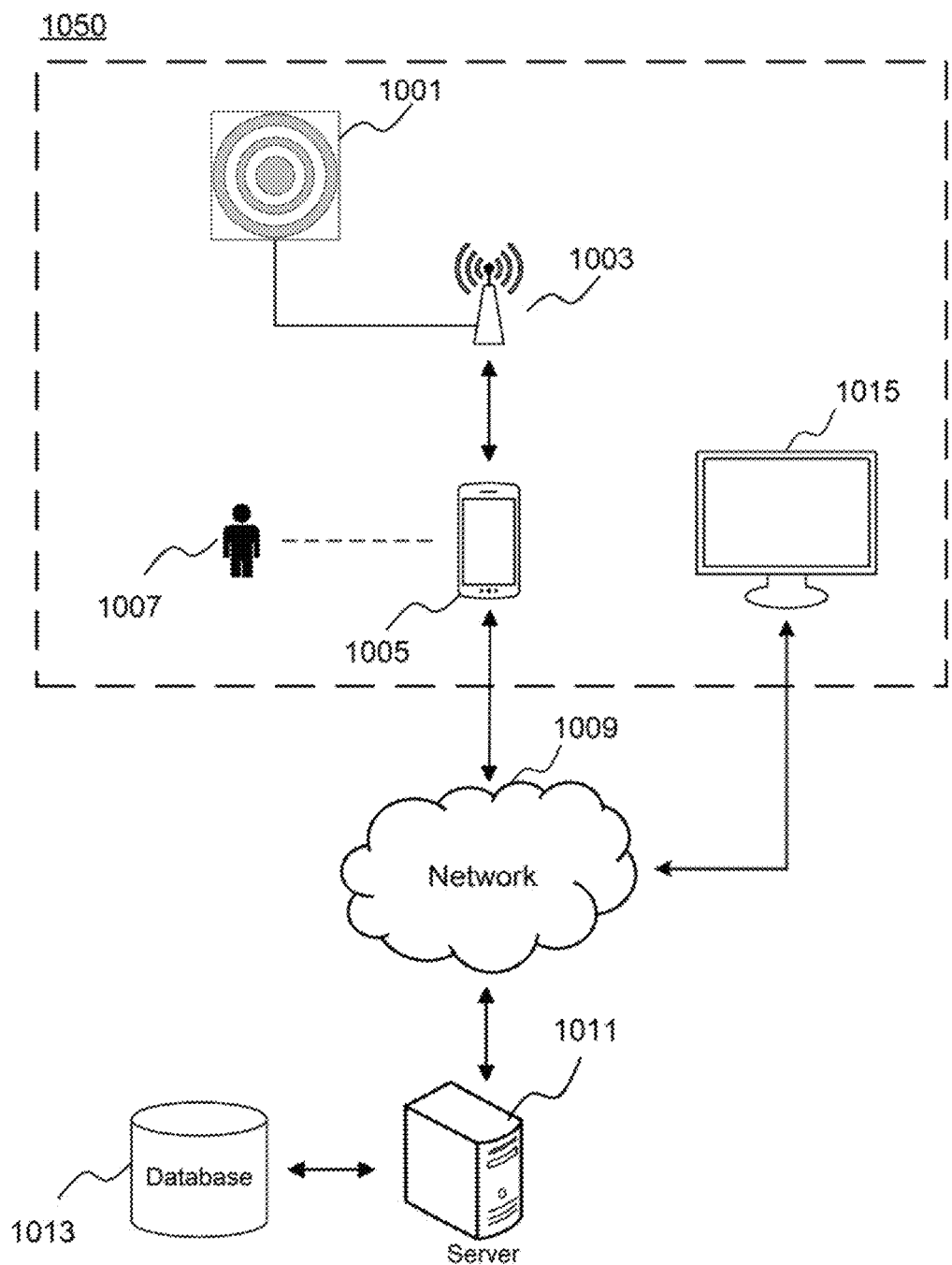
FIG. 10A is a depiction of an exemplary system for location-specific remote monitoring of shooting performance consistent with disclosed embodiments.

FIG. 10A illustrates an exemplary system 1000 for remote monitoring of shooting performance. As shown in FIG. 10A, system 1000 may include disposable target 1001 connected to electronic circuitry 1003. Although illustrated schematically in spaced apart fashion, the electronic circuitry 1003 may be located within a housing temporarily attached to target 1001. As described herein, circuitry 1003 may collect data related to projectile hits on the target. Circuitry 1003 may be paired with mobile device 1005. Disposable target 1001 and circuitry 1003 may correspond to target 112 and connector device 110 described above. In some embodiments, mobile communications device 1005 may be associated with and store information related to shooter 1007. Mobile communications device 1005 may store a variety of information about first shooter 1007, including identifying information such as a name, username, email address, demographic information, and other information, as described herein. In some embodiments, mobile communications device 1005 and first shooter 1007 may correspond to mobile communications device 120 and user 102, as described in connection with FIG. 1. Accordingly, any of the embodiments or features described above with respect to user 102 and mobile communications device 120 may apply equally to mobile communications device 1005 and first shooter 1007.

As illustrated by FIG. 10A, mobile communications device 1005 may be in communication with server 1011 through network 1009. Network 1009 may take a variety of forms as described herein, and may include one or more of the Internet, a wireless WAN, wireless LAN, a mesh network, wireless broadband connection (e.g., 4G/5G), satellite connection, or other suitable types of network communications or telecommunication channels. Network 1009 and server 1011 may correspond to network 140 and server 130 described in connection with FIG. 1. Server 1011 may be in communication with database 1013. As described herein, database 1013 may be a database local to server 1011. In some embodiments, database 1013 may be a separate database from server 1011, such as a network-attached database, a cloud storage service, or other type of storage device. Server 1011 may execute, for example, one or more steps of the method described above, and as further described below with respect to FIG. 10B.

Disposable target 1001, circuitry 1003, mobile device 1005, and shooter 1007 may all be located at a location 1050. The location may correspond to, for example, a shooting range at which the shooter fired at disposable target 1001. System 1000 may also include output device 1015.

Output device 1015 may be associated with a shooting range or merchant. Output device 1015 may take a variety of forms, such as a computer, a server, a screen for displaying dynamic advertisements, or other computing device capable of communicating with the other devices of system 1000 through network 1009. Output device 1015 may, for example, receive location data about a shooter or shooter pattern data from server 1011. In some embodiments, output device 1015 may be associated with management or operation of location 1050. For example, a manager or other administrator may view various patterns, statistics, or other data via output device 1015. In some embodiments, output device 1015 may be a user-facing device, such as a display device at a shooting range, and even in the shooter's lane. In this way, information targeted to the shooter may be displayed to the shooter, while the shooter is actively engaged in target practice. Since the shooter's location is known, the server may transmit targeted information to the shooting range through a communication channel other than a channel used by mobile communications device 1005. This may enable the range to route the message to a display uniquely associated with the shooter's lane, or with a general display viewable by all shooters. Accordingly, output device 1015 may then generate and/or display targeted advertisements or promotions directed at the shooter, as described herein. While output device 1015 is depicted as being associated with location 1050 in FIG. 10A, it is understood that output device 1015 may not be associated with location 1050 in some embodiments.

FIG. 10B is a flowchart illustrating an exemplary process 1100 for remote location-specific monitoring of shooting performance, consistent with disclosed embodiments. Process 1100 may be performed by a system of devices, for example, including target circuitry, mobile communications device, and a server. Various steps of process 1100 may be executed by a processing device, such as any of the processors described throughout the present disclosure. In some embodiments, a non-transitory computer readable medium may contain instructions that when executed by a processor cause the processor to perform process 1100. Process 1100 is not necessarily limited to the steps shown in FIG. 10B and any steps or processes of the various embodiments described throughout the present disclosure may also be included in process 1100. Moreover, this disclosure contemplates that one or more steps of process 1100 may be omitted or may be replaced by one or more other steps, as described herein.

At step 1101, process 1100 may include receiving from a mobile communications device of a shooter, target hit data obtained via electronic circuitry temporarily connected to a disposable conductive target. The data may be received in a variety of ways, as described herein. Target hit data may take a variety of forms as described herein, such as the number of hits on the target, the number of hits in specific target zones, a score associated with a group of the hits, scores associated with individual hits on target, locations of the hits on the target, a number of hits outside of a target region, a ratio between target hits and target misses, a timing associated with hits of the target (e.g., a timestamp associated with the hits, a duration during which the hits occurred, etc.), or any other information associated with hits on a target.

At step 1103, process 1100 may include receiving from the mobile communications device of the shooter, identity information of the shooter. Receiving information from a mobile communications device may occur, for example, through one of a variety of connection types as described above. Information indicative of an identity of a shooter may take a variety forms. For example, the information may indicate a name, age, address, an identification number or ID, username, email address. IP address other identifier of the user's mobile communication device or other information suitable for identifying a shooter.

At step 1105, process 1100 may include receiving from the mobile communications device of the shooter, location data reflective of a location where shots from which the target hit data was generated were fired. As described above, receiving information from a mobile communications device may occur, for example, through one of a variety of connection types. Location data may refer a variety of types of data indicating a relative location of the mobile communications device. Location data may be data including Global Positioning System (GPS) data, or similar location data as described above. The location data may include data related to other satellite-based navigation systems, triangulation techniques, latitude/longitude pairs, a geolocation based on an IP address, or other data indicative of a geographic position. The location data may relate to the location of the mobile communications device when the device received the target hit data, as described herein.

At step 1107, process 1100 may include updating a database, associating the location with the identity information of the shooter and the target hit data. The database may take a variety of forms, as described herein. The received information may be associated using a data record saved in the database, or other suitable techniques. In some embodiments, process 1100 may include performing a lookup using the location data to ascertain a shooting range corresponding to the location where the shots were fired. As an example, performing the lookup may include comparing the location to a database of shooting range locations. As described above, ascertaining the shooting range may include determining that the location is within a predetermined distance of a shooting range. For example, if the location data is within a certain threshold proximity to the shooting range location, the corresponding shooting range location may be selected.

In some embodiments, the process 1100 may include determining whether the shooter has not previously been associated with the shooting range in the database. If the shooter has not previously been associated with the shooting range in the database, the shooter and the shooting range may be associated in the database, as described herein. Additionally or alternatively, if the shooting has not previously been associated with the shooting range in the database, the process 1100 may include awarding a badge associated with the shooting range to the shooter.

Process 1100 may further include performing a lookup using the GPS data or other type of location data to ascertain a merchant corresponding to the location where the shots were fired. As described above, performing the lookup may include comparing the location to a database of merchant locations. As described above, ascertaining the merchant may include determining that the location is within a predetermined distance of the merchant. For example, if the location data is within a certain threshold proximity to the merchant location, the corresponding merchant location may be selected.

In some embodiments, process 1100 may include identifying at least one pattern within data collected over time for a particular shooter, and storing a notation of the identified pattern. Process 1100 may also include transmitting the identified pattern to a shooting range associated with the location where the shots were fired. According to disclosed embodiments, process 1100 may include sending an offer to a wireless mobile communications device of the shooter based on the identified pattern. In some embodiments, the offer may be sent by, for example, the central server identifying the pattern. Additionally, or alternatively, in cases where the pattern is sent to a shooting range, an offer may be sent by a computing device associated with the shooting range. As described herein, an offer may include a promotion for a shooting range associated with the location where the shots were fired or a promotion for a merchant within a predetermined distance from the location where the shots were fired.

According to disclosed embodiments, process 1100 may include presenting, on a mobile communications device of the shooter, data indicative of the location. As an example, the data indicative of the location may include a map or list of shooting ranges. Process 1100 may further include storing data on a plurality of shooters and enabling output of shooters organized by associated ranges. For example, a list of shooters associated with each range may be generated and output for consumption by a shooter, shooting range, or merchant.

The description below provides various additional details regarding conductive targets and associated systems. It is to be understood that any of the details below may equally apply to the various embodiments described above, and vice versa.

Figure 11:
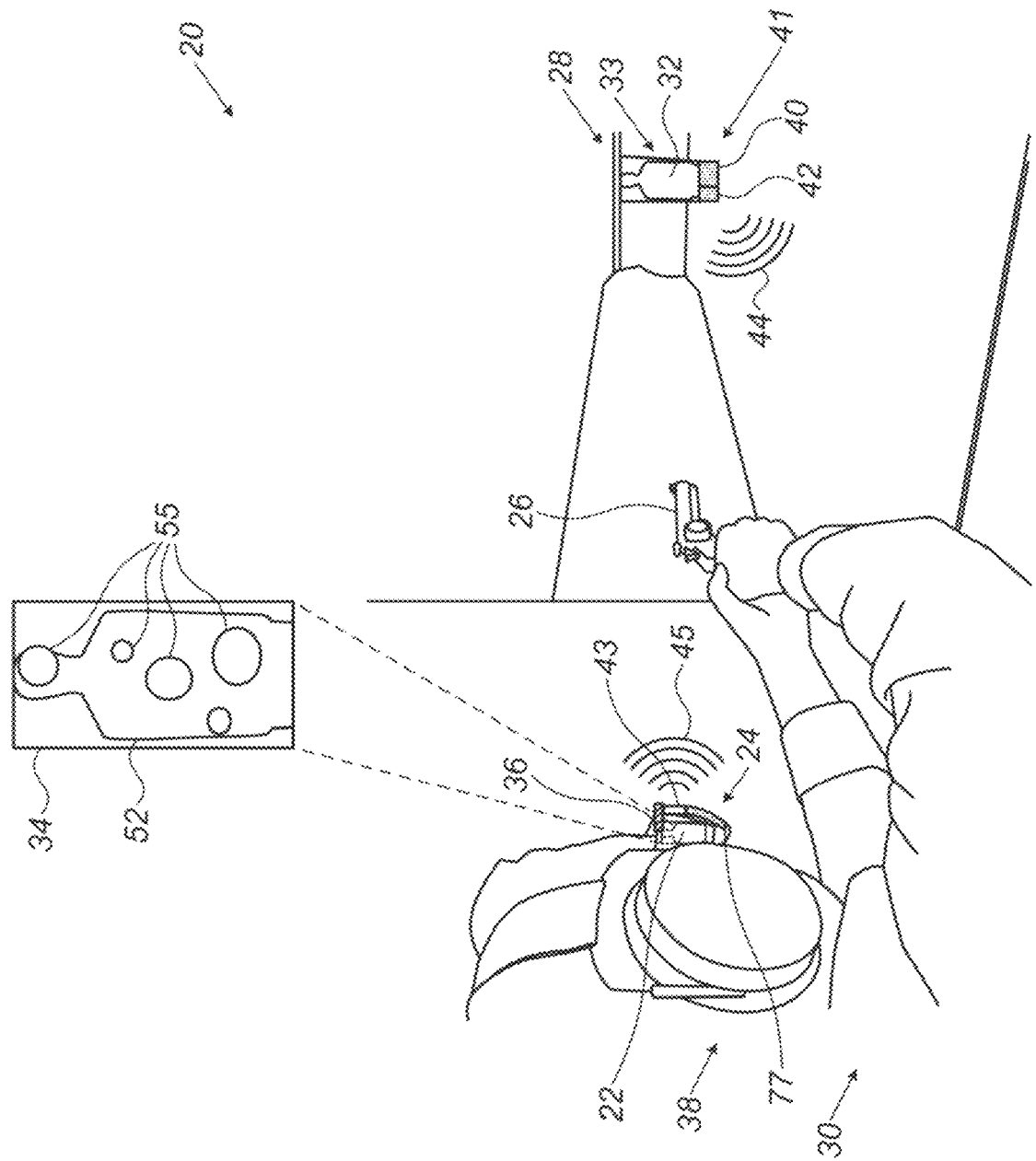
FIG. 11 is a schematic, pictorial illustration of a system for enriched visualization of target shooting, consistent with the disclosed embodiments.

FIG. 11 is a schematic, pictorial illustration of a system 20 for enriched visualization of target shooting, in accordance with an embodiment of the present invention. In some embodiments, a user of system 20 aims a weapon, such as a pistol 26, at a target assembly 28 located at a predefined distance from user 30.

Weapon 26 typically comprises a genuine weapon that shoots genuine physical projectiles. e.g., bullets. In an application that trains law-enforcement personnel, for example, the user may use system 20 with his or her own personal weapon. Typically, no adaptation of weapon 26 is required for operating in system 20.

In some embodiments, target assembly 28 comprises a shooting target 33 made from a paper sheet or from any other suitable type of substrate (e.g., at least one layer of the substrate may include synthetic material such as plastic). A pattern 32 is printed on the substrate using one or more layers of traces made from conductive ink or any other suitable product, such as flexible printed circuit board (PCB). Example patterns are shown in FIGS. 12A and 12B below.

In some embodiments, target assembly 28 comprises an electronic assembly 41, which is configured to detect a hit event, e.g., by detecting a significant change of electrical resistance in the printed pattern at the hit location, caused by the projectile penetrating a hole in the substrate. In other embodiments, assembly 41 detects the hit event and location based on other techniques, such as detecting electrical shorts, optical detection, ultrasonic detection or any other suitable technique. In some embodiments, pattern 32 may have one or more sections having different respective sizes and shapes, as will be described, for example, in FIGS. 12A and 12B below.

In some embodiments, electronic assembly 41 is electrically coupled to target 33 and is configured to receive/detect signals from target 33, to analyze the received signals for detecting hit events, and to send hit detection indications to other devices of system 20, such as augmented reality (AR) goggles 24 won by user 30.

In some embodiments, assembly 41 is powered by a battery or other power source (not shown). User 30 may attach assembly 41 to an interface of target 33, and activate assembly 41 only when he/she wants to start the shooting practice, also referred to herein as "game." Typically, although not necessarily, assembly 41 is attachable to and detachable from target 33. e.g., using one or more suitable connectors or clips.

In some embodiments, electronic assembly 41 comprises a controller 40, which is electrically connected to target 33 and is configured to convert analog signals received from target 33 to sampled digital signals. In some embodiments, controller 40 is further configured to output, based on analyzing the received signals, detected hitting events, including the hit location of each projectile in target 33 as will be described in detail below.

In some embodiments, electronic assembly 41 further comprises a wireless communication device 42, which is configured to exchange information between controller 40 and other devices of system 20, such as AR goggles 24. e.g., using Bluetooth™, Wi-Fi, infrared or any other suitable wireless technology or standard.

In some embodiments, goggles 24 comprise a camera 36, which is con figured to acquire a sequence of images of target 33 and its vicinity and a processor 77. In some embodiments, when user 30 shoots a projectile at target 33, processor 77 is configured to receive from camera 36 images of target 33 captured at the time of shooting. Processor 77 additionally receives from controller 40 of target assembly 28 a signal, also referred to herein as a location signal, indicative of the location of a physical hit of target 33 by the projectile.

In some embodiments, in response to receiving the location signal from the target assembly, processor 77 is configured to overlay on the video images of target 33, a visual indication of the hit registered with the target. In some embodiments, device 42 is configured to wirelessly send radio-frequency (RF) signals 44 conveying the location signal, to a wireless communication device 43 coupled to goggles 24.

In some embodiments, device 43 is configured to wirelessly receive RF signals 44 from device 42 and to optionally send RF signals 45 thereto. In some embodiments, before using system 20, user 30 may carry out a pairing process so as to synchronize the wireless communication between devices 42 and 43.

In some embodiments, processor 77 in goggles 24 is configured to estimate the distance between user 30 and target assembly 28, using camera 38 or any other suitable distance measurement technique. In some embodiments, the distance measurement may be carried out by an external device and wirelessly sent to device 42 and stored in processor 77.

In some embodiments, the measured distance may be used to conduct a multi-player shooting game between user 30 and one or more other players located at remote sites. In these embodiments, each player shoots at a similar type of target from a similar distance according to a similar game plan, and the scoring results may be compared during the game or after the game is over, and displayed to all players.

In other embodiments, after attaching assembly 41 to the interface of target 33, user 30 sets the distance between pistol 26 and target 33 using a target transportation system of a shooting range.

In some embodiments, user 30 wears AR goggles 24 for both eye protection and for visualizing the shooting target. In some embodiments, googles 24 comprise a display 22, which is configured to display to user 30 a real-time score of points achieved, and the visual indication of the projectile hit, overlaid on the images of target 33 that is acquired by camera 36 while user 30 shoots each projectile.

Using Augmented Reality Goggles for Enriching the Visualization of Target Shooting Reference is now made to an inset 34 at the top of FIG. 1, which is a magnification of the image displayed by processor 77 to user 30 on display 22 of AR goggles 24. In some embodiments, visual indicators 55 may be overlaid on selected sections in target 33. For example, visual indicators 55 may appear as virtual bottles of glass, each bottle having a different color indicative, for example, of shooting priority or shooting score.

Note that in this example, indicators 55 are displayed regardless of whether there is a hit of the respective target.

In another example, bottles of higher priority and/or higher score may appear flickering on display 22, the flickering may be permanent (e.g., until the bottle is hit by a projectile) or for a predefined period of time, such as for ten seconds. Note that in this example, indicators 55 are displayed as long as the respective target is not hit. In an embodiment, when the respective target is hit by the projectile, the respective indicator 55 disappears, and another type of indicator (not shown) is displayed so as to indicate that the respective target was hit.

For example, indicator 55 may appear as a virtual flickering bottle at a location of a given target, and in response to detecting that the given target is hit, the virtual flickering bottle disappears and another indicator, such as an exploded bottle, is displayed at the location of the given target.

In other embodiments, processor 77 may display only visual indicators indicative of a target hit, without displaying visual indicator 55.

In alternative embodiments, system 20 may apply any suitable display configuration of the shooting target and the hit indication, including but not limited to, a combination of the aforementioned configurations. Furthermore, visual indicators 55 may be stationary or dynamic, e.g., moving across the area of image 52, images, icons, animations or may have any other suitable appearance.

In some embodiments, processor 77 is configured to produce any other suitable types of virtual display, such as but not limited to, fire and/or smoke indicative of target hit by one or more projectiles, a virtual trail indicative of the projectile path, an icon indicative of target hit/terminated or missed, or any other suitable types of virtual display overlaid on image 52 of target 33.

In some embodiments, target assembly 28 may have a limited number of allowed projectile hits. The limitation may be associated with specific sections of target 33, as will be depicted in FIGS. 12A, 12B and 15 below, or with the entire area of pattern 32. In these embodiments, visual indicators 55 may indicate, for example, disabling of one or more sections of target 33.

In other embodiments, in response to accomplishing the required number of projectile hits, processor 77 is configured to output a game-winning indication, for example by displaying on display 22 a suitable animation overlaid on image 52.

Similarly, in response to projectile hits that exceed the allowed number for a specific section of target 33, processor 77 may be configured to output a game-over indication displayed on display 22. The indication may be overlaid on image 52 so as to indicate the location of the disabled section.

In other embodiments, processor 77 may display a text message, such as "game over", "you win," "game lost" or any other type of message.

In some embodiments, user 30 may initiate the shooting game using any suitable interface, for example, by touching a specific button (not shown) of goggles 24. In these embodiments, the shooting game may be time-limited. In some embodiments, processor 77 is configured to display an indication of the remaining time, to output time-dependent visual indicators overlaid on image 52, to display a timestamp showing the remaining time of the game, and to terminate the game when the predefined time of the game is completed.

In some embodiments, system 20 may comprise, in addition to, or instead of goggles 24, a mobile phone, a transparent display positioned in front of the head of user 30, contact lenses attached to the eyes of user 30, or any other suitable device configured to display virtual or real objects overlaid on target 33, or on an image thereof (e.g., image 52) using any suitable technique of augmented reality. Any such device is considered a type of output device in the present context.

In some embodiments, system 20 further comprises a headset 38, which is configured to protect the ears of user 30 from the noise associated with the shooting. In some embodiments, headset 38 is further configured to play sounds to user 30 in response to hitting and/or missing a specific section of target 33. In some embodiments, headset 38 may comprise a wireless communication device, similar to the aforementioned device 43, which is paired with devices 42 and 43, and configured to exchange wireless signals therewith.

For example, based on a visual output from processor 77, display 22 displays to user 30 one or more glass bottles in selected sections of target 33. In some embodiments, in response to receiving from target assembly 28 a location signal indicative of a physical hit of the selected section (on which the bottle is displayed) by the projectile, processor 77 is configured to produce a bottle-explosion sound output wirelessly sent by device 43 and played to user 30 by headset 38.

In some embodiments, at least some of the aforementioned features of display 22 may be applicable to headset 38. For example, on-off sounds may be used instead of flickering displays, different volume and frequency, as well as voice commands may be used for other purposes described above.

In alternative embodiments, user 30 may wear any other suitable headgear. e.g., devices having stereoscopic, three-dimensional visual displays and sound equipment, and configured to exchange wireless signals with device 42.

In some embodiments, after user 30 attaches electronic assembly 41 to target 33 and pairing is carried out between devices 42 and 43, controller 40 identifies the type of target, and sends the target type to processor 77. For example, the system may probe target 33 to determine identity information for the target, as described in greater detail below.

In some embodiments, processor 77 is configured to display on display 22 optional games, based on the type of target, the type of game (e.g., time-based, or target-hitting-based) and the experience-level of user 30 (e.g., beginner, advanced, or expert.) After user 30 selects the game, using any suitable interface, processor 77 outputs a display and/or voice instructions of the game. The instructions may comprise a countdown of a predefined number of seconds for starting the game.

In some embodiments, processor 77 outputs to user 30 shooting instructions after a predefined period of time, e.g., ten second after starting the game. For example, target 33 may comprise a physical drawing of a green balloon, whereas processor 77 is configured to display a virtual red shooting object, overlaid on and registered with the green balloon. The object may be shaped as a target, as a crosshair, or in any other suitable way. The appearance of the red shooting object serves as a shooting instruction for user 30.

In some embodiments, after a projectile shot by user 30 hits the red shooting object, processor 77 displays the object flickering and plays a sound of applause in headset 38. Processor 77 further displays, on display 22, the number of points gained in this hit, and may optionally play the verbal status of the gained points in headset 38.

In some embodiments, after hitting the target a predefined number of times (e.g., five times), processor 77, which receives from controller 40 signals indicative of the hits, replaces the red object with a red icon having an "X" shape, so as to instruct user 30 that this target is disabled.

In other embodiments, the pattern of target 33 may comprise multiple balloons, and processor 77 may display the currently-valid shooting object a few seconds on one balloon and then shift the currently-valid shooting object to another balloon for another few seconds.

In alternative embodiments, the shooting instructions may vary based on the type of target, the game level or any other parameter, and may comprise static and/or dynamic appearance of the virtual objects overlaid on image 52 of target 33.

The different elements of system 20 and its components. e.g., assembly 41 and goggles 24, may be implemented using suitable hardware, such as using discrete components, one or more Application-Specific Integrated Circuits (ASICs) and/or one or more Field-Programmable Gate Arrays (FPGAs), using software, or using a combination of hardware and software elements. Typically, processor 77 and controller 40 each comprises a general-purpose processor, which is programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

The particular configuration of system 20 of FIG. 11 is shown by way of example, in order to illustrate certain problems that are addressed by embodiments of the present invention and to demonstrate the application of these embodiments in enhancing the performance of such a system. Embodiments of the present invention, however, are by no means limited to this specific sort of example system, and the principles described herein may similarly be applied in any other suitable system configuration.

Shooting Targets that Output Signals Indicative of the Hit Location of a Physical Projectile FIG. 12A is a schematic, pictorial illustration of a shooting target 60, in accordance with an embodiment of the present invention. Shooting target 60 may serve, for example, as shooting target 33 of FIG. 11 above. In some embodiments, target 60 comprises multiple sections, such as depicted in the figure as six sections 66A, 66B. 66C. 66D, 66E and 66F.

In some embodiments, each section comprises one or more target zones 62 comprising a dense grid of electrically-conductive circuit traces, (The term "electrically-conductive circuit traces" is referred to below simply as "traces" for brevity.) The shape of a given zone 62 may be round as shown in the example of FIG. 12A, or may have any other suitable shape. Each zone 62 is electrically connected to traces 64 disposed in the periphery area of the respective section.

In the example of FIG. 12A traces 64 are laid out horizontally, but may alternatively be arranged in any other suitable configuration, such as but not limited to a grid of horizontal and vertical traces, vertical traces only, or a diagonal grid.

In some embodiments, target 60 comprises electrical connectors 68, configured to connect between target 60 and electronic assembly 41 shown in FIG. 11 above. As illustrated, the connectors 68 collectively constitute an interface or bus for electrical connection to assembly 41. In some embodiments, target 60 comprises traces 67 located at the edge of target 60 and configured to electrically connect between traces 64 and electrical connectors 68.

In the example of FIG. 12A, connectors 68 comprises six pairs of connectors 68A-68F associated with sections 66A-66F, respectively. In an embodiment, one connector of each pair is connected to a ground potential and the other connector is coupled to a respective current source that drives a predefined current level to the traces. Electronic assembly 41 measures the resulting voltage, or any other suitable electrical parameter described below, between the pair of connectors, as will be described in detail in FIG. 13 below.

Note that the voltage measured in a given section depends on whether or not a hit occurred in this section. In case of a hit, the measured voltage depends on the hit location within the given section. Since the density of traces differs between the target zone and the periphery, different voltage levels are typically measured when the hit occurred at target zone 62 and at the respective periphery area of the given section.

For example, a projectile hit occurring at target zone 62 of section 66B may impact a certain percentage of the traces of target zone 62, whereas a projectile that hits the periphery area of section 668, may impact a significantly larger number of traces. e.g., larger by an order of magnitude. Therefore, the change in voltage (relative to a baseline "no hit" voltage) will be much smaller for a hit in zone 62 than for a hit in the periphery.

Typically, the density of traces in the target zone and in the periphery (specified, for example, in units of traces per inch) is derived from the caliber of the projectiles used for shooting. In this manner, the percentage of traces hit by a projectile (and the resulting voltage change) can be controlled.

In some embodiments, controller 40 in target assembly 28 is configured to detect a hit in a given section based on the voltage level measured on connector pair 68 of this section, and to distinguish whether the hit occurred at the target zone or periphery area of the respective section. In these embodiments, controller 40 is configured to determine the location in which the projectile physically hits target 60.

The layout of target 60 is shown by way of example, in order to illustrate certain features, such as detecting a hit location of a projectile in a multi-sectional non-uniform target, of embodiments of the present invention. Embodiments of the present invention, however, are by no means limited to this specific layout, and the principles described herein may similarly be applied to other suitable types of shooting targets.

FIG. 12B is a schematic, pictorial illustration of a shooting target 70, in accordance with another embodiment of the present invention. Shooting target 70 may serve, for example, as shooting target 33 of FIG. 11 above. In some embodiments, target 70 comprises three sections 72A, 72B and 72C. Each of these sections is shaped as an arc, whereas section 72A is the outer arc and section 72C is the inner arc. Each section 72A-72C comprises horizontal and vertical traces 74 arranged, for example, in a grid of conductive traces, and is electrically coupled to electronic assembly 41 via respective electrical connectors 78A-78C.

As described in FIG. 12A above, the electrical connectors. e.g., connectors 78A-78C, are arranged in pairs, one connector of each pair connects to a ground potential, and the other connector of the pair is coupled to the current source and used for measuring voltage by electronic assembly 41. Additionally or alternatively, electronic assembly 41 is configured to measure one or more other electrical parameters, such as but not limited to a change in resistance or current flow.

Note that in this example embodiment, sections 72A-72C in their entirety serve as target zones. Unlike target 60 of FIG. 12A, in target 70 of FIG. 12B the target zones are connected directly to connectors 78 without any periphery area. In some embodiments, controller 40 detects a change in the voltage measured on a connector 78, which change is indicative of a physical hit of the respective zone (section in the example of FIG. 12B) by a projectile at the respective target zone.

The configuration of target 70 is depicted purely by way of example, in other embodiments, target 70 may have any other suitable shape, such as round or triangular, and may have a continuous shape like sections 72A-72C or multiple separated segments coupled to one another by traces, similar to traces 64 of FIG. 12A above. In yet other embodiments, target 70 may comprise any suitable combination of sections of any type on the same target substrate, such as section 72A of FIG. 12B, with one or more target zones, such as zones 62 shown in FIG. 12A above.

Figure 13:
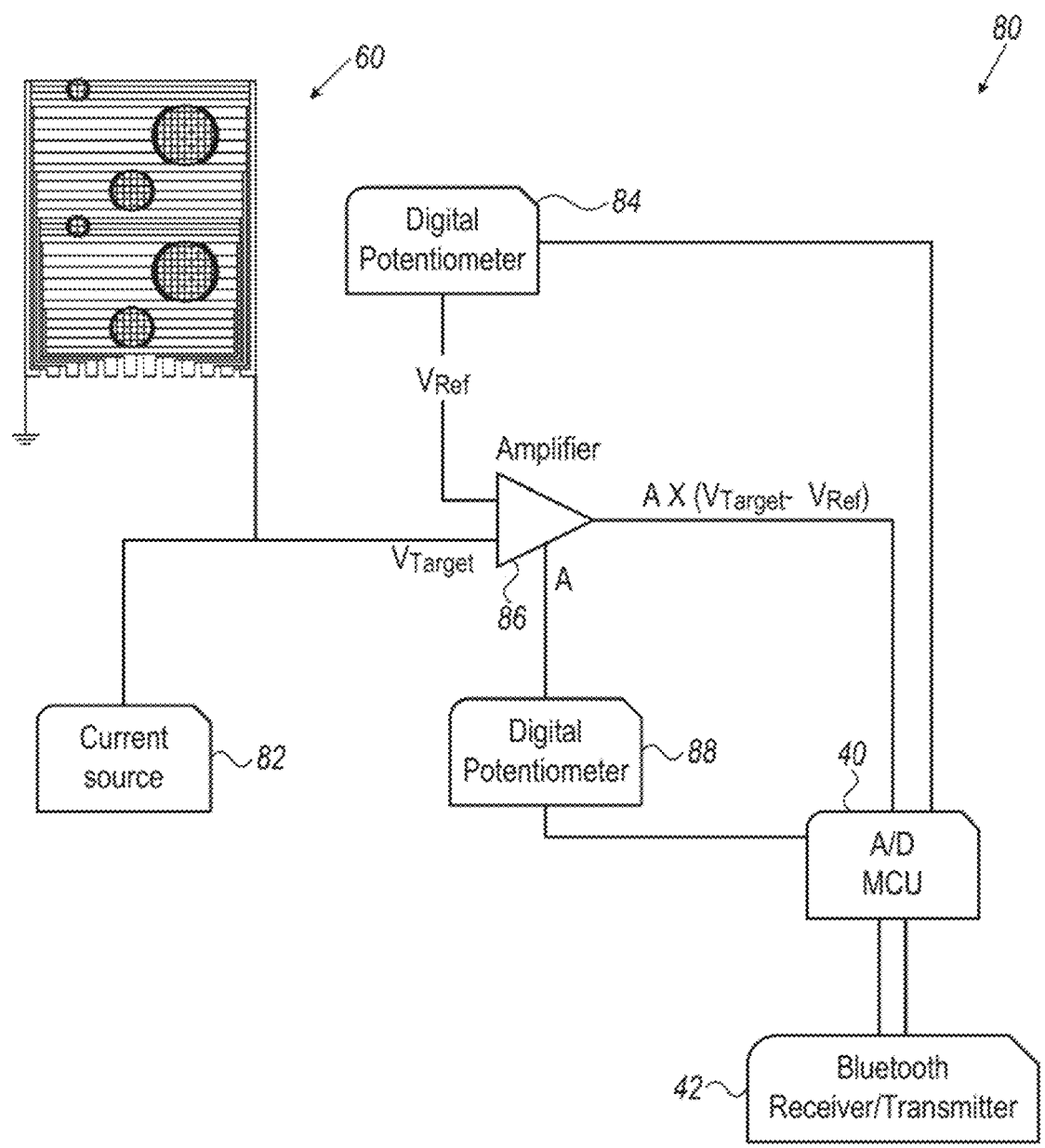
FIG. 13 is a block diagram that schematically illustrates a hit detection circuit of a shooting target assembly, consistent with the disclosed embodiments.

FIG. 13 is a block diagram that schematically illustrates a hit detection circuit (HDC) 80 of shooting target 60, in accordance with an embodiment of the present invention. In some embodiments, each of the sections of target 60 connects to a dedicated respective HDC, such as HDC 80. HDC 80 is typically implemented as part of electronic assembly 41 coupled to target 60. HDC 80 monitors the voltage level across the target section to which it connects. In some embodiments. HDC 80 comprises a current source 82 that flows a constant current via a certain target section 66 of target 60.

In some embodiments. HDC 80 comprises a differential amplifier 86, which is configured to receive a reference voltage VRef. In some embodiments, HDC 80 further comprises a digital potentiometer 84 configured to control the level and stability of the reference voltage supplied to differential amplifier 86.

In some embodiments, differential amplifier 86 receives from connectors 68 of target 60, voltages referred to herein as VTarget. The differential amplifier outputs a voltage level that is proportional to the voltage difference between its inputs.

In some embodiments, HDC 80 comprises another digital potentiometer 88, which is configured to control the amplification gain "A" of differential amplifier 86. The voltage level output by differential amplifier 86 is denoted ("delta") and is given by A-(VTarget-VRef). In alternative embodiments. HDC 80 is configured to operate at a constant amplification gain of differential amplifier 86. In this configuration potentiometer 88 is omitted.

In some embodiments, each section 66, also referred to herein as a "channel," receives a specific (e.g., substantially similar) current from current source 82 and outputs a respective VTarget to differential amplifier 86. In these embodiments, each channel comprises a separate set of current source 82, differential amplifier 86, and optionally digital potentiometer 88.

The different elements of HOC 80 are controlled by controller 40 (denoted A/D MCU in this figure). In alternative embodiments. HDC 80 may comprise any other suitable configuration, such as having the current source common to multiple channels, whereas each channel having a separate differential amplifier. Controller 40 and wireless device 42 is also typically common to all channels, i.e., all HDCs 80 in assembly 41.

In some embodiments, controller 40 is configured to determine the type of target being used (e.g., target 60 or target 70). In an example embodiment, the type of target is encoded physically on the target (e.g., a certain index value on target 60, and a different index value on target 70). Controller 40 reads the type of target from the target it is connected to, and the controller code adapts to the corresponding type of target. In alternative embodiments, controller 40 may identify the type of target being used in any other suitable way.

In some embodiments, the system may electrically probe the conductive target via detachable electronics connected to the interface. In response, at least one return signal may be received, wherein the return signal includes identity information from which an identity of the target is derivable. Probing the target may involve sending an electrical signal through at least some of the conductive pathways on the target and receiving a return signal. From the return signal, either the detachable electronics, a wirelessly connected mobile communications device or a processor to which the target is indirectly connected through intermediary electronics and a network, may ascertain an identity of the target. This may occur because the return signal from differing targets may have known differences, due, for example to one or more of the unique layout of the conductive circuitry on the target or to an identification circuit, incorporated into the target, and configured to return an identifying signal when probed. If such a dedicated identifying circuit is employed, it may be incorporated into one or more conductive pathways to target zones, or it might be part of a separate dedicated circuit incorporated for purposes of target identification.

By way of one non-limiting example, processor 77 may electronically probe target 60 via the interface and may receive a return signal including identity information for the target. Identity information refers to any information from which an identity of the target may be derived. The identity of a target may be any characteristic or property of the target that may be used to distinguish it from other targets or groups of targets. As described above, the target identity may be a target type. This may include a target layout, target size, intended caliber, a game associated with the target, a model number of the target, a manufacturer of the target, graphics printed on the target, other aesthetic characteristics of the target, or any other distinguishing characteristic. In addition to the electrically probable identity, the target's identity may also be represented by an alphanumerical code or name indicating a model number or other form of alphanumerical identifier. A machine readable code such as a QR code or a barcode might be included on the target to enable the identity of the target to be ascertained through image capture.

In some embodiments, processor 77 receives from controller 40 a signal indicative of the type of target being used, and is configured to display the type of target on display 22, and optionally request an acknowledgement from user 30. Processor 77 may perform one or more additional steps to ascertain an identity of the target. In some embodiments, processor 77 may cause a look up of the signal to determine the target identity. For example, processor 77 may directly or indirectly (such as over a network) access a data structure associating return signals with target identities. The data structure may be stored locally in the device including processor 77, in a remote storage location (e.g., a remote server), on a cloud-based platform, or other suitable storage locations.

According to some embodiments, the identity of the target may be determined based on electrical properties of the target. For example, the configuration of the target zones and/or lead lines (e.g., the number, size, layout, etc.) may be generate a particular signal from which a target type may be determined. Accordingly, the return signal may correspond to electrical responses (e.g., resistance, conductivity, etc.) of target zones on the target. The electrical response may indicate a particular target type without encoding a separate identification sequence.

In some embodiments, the identity of the target may allow the system to access and present auxiliary information to a user (i.e., a shooter). Auxiliary information refers to any additional information pertaining to the identified target type. In some embodiments, the auxiliary information may include a graphical representation of the target, which may be presented on the mobile communications device of the shooter. The graphical representation may be augmented with one or more graphics or animations. For example, the auxiliary information may include instructions to animate the target on the display as target regions are hit, lead lines are hit, points are scored, objectives are completed, a game is ended, or any other events occur related to the target. The auxiliary information may include audio data to be presented to the user (e.g., through a speaker of a mobile communications device), or other forms of data. Further, various other forms of display may be used for presenting the auxiliary data, such as smart glasses (i.e. goggles), a smart watch, or other display devices.

As noted above, a game engaged in by the user may depend on a type of the target. Accordingly, the auxiliary information may include rules of a shooting game presented on the mobile communications device of the shooter. In some embodiments, a target type may be associated with more than one game. Accordingly, the auxiliary information may include a plurality of shooting game options. The system may prompt a user to select one of the shooting game options.

The auxiliary information may be accessed from a variety of different sources. For example, the auxiliary information may be accessed based on a look up function in a data structure. This may be the same data structure from which the target identity is determined, or may be a separate data structure. In some embodiments, the auxiliary information may be pulled from the Internet or via other communication means. For example, a manufacturer of the target may provide auxiliary information that may be accessed by the system. The auxiliary information may be accessed from other locations such as a shooting range, gun club or similar club, or other third parties. Once the auxiliary information is obtained, the system may prompt a shooter to confirm the auxiliary information.

In some embodiments, in response to detecting a hit, device 42 sends the hit location to processor 77 of goggles 24 as described in FIG. 11 above. While goggles 24 are used by way of example throughout the present disclosure, it is to be understood that processor 77 may be included in various other devices, such as a mobile communications device (e.g., cell phone, tablet, etc.) of user 30, or any other suitable device.

Figure 14:
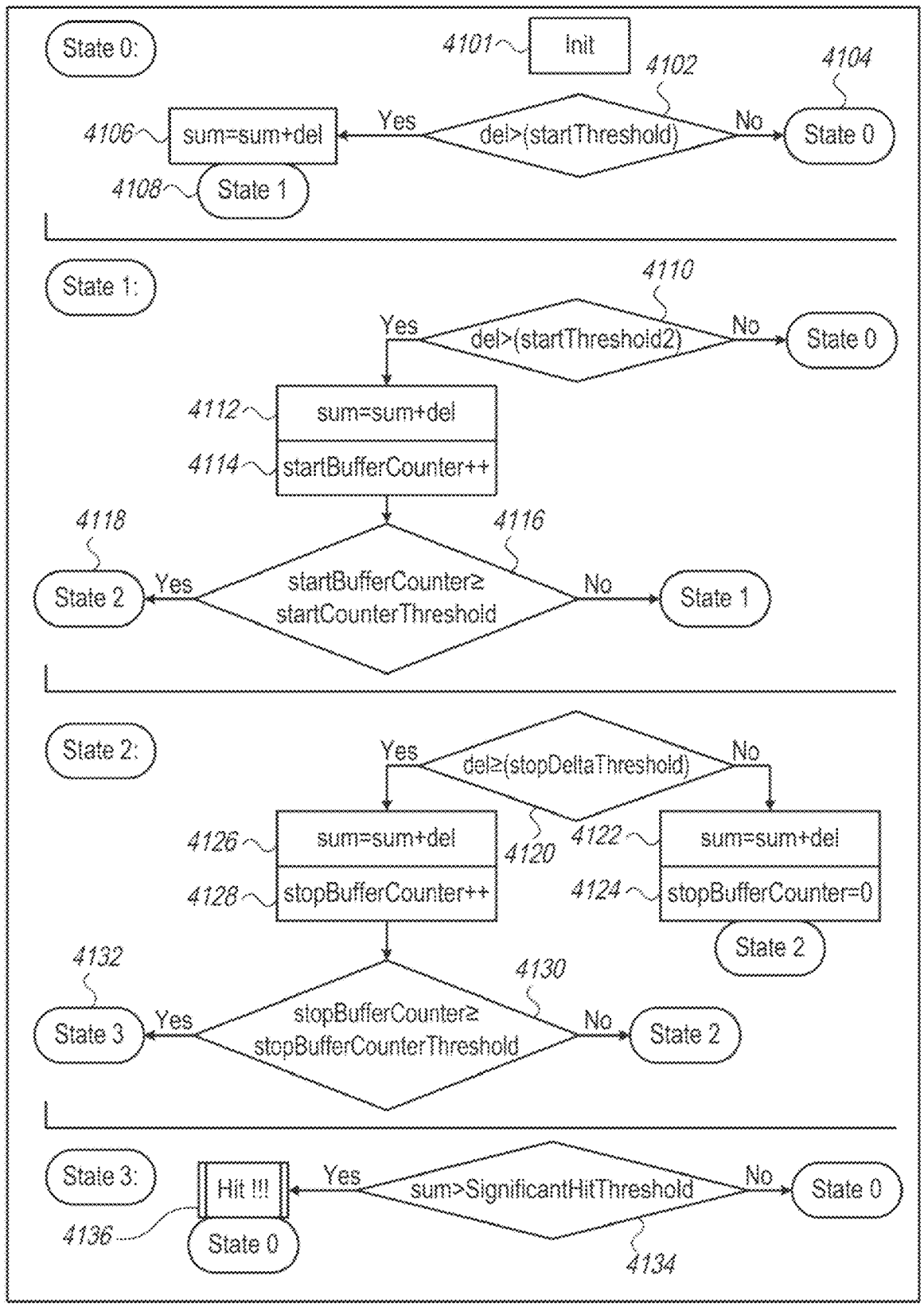
FIG. 14 is a state diagram that schematically illustrates a method for detecting a projectile hit in a shooting target, consistent with the disclosed embodiments.

FIG. 14 is a state diagram 4100 that schematically illustrates a method for detecting a projectile hit in shooting target 60, in accordance with an embodiment of the present invention. State machine 4100 is carried out by controller 40 in HDC 80. In some embodiments, the state machine has four states described herein, denoted "State 0"-"State 3". Alternatively, any other suitable number of states and any other suitable logic can be used for the state machine.

The method begins with controller 40 initializing a state variable to state 0, at an initialization ("init") step 4101. Other variables are initialized as sum=0, startBuffercounter=0, and stopButffercounter=0. The variable "sum" is used for accumulating the overall voltage change during a hit event. The counter variables are used to recognize the start and end of a hit event, respectively.

As described in FIG. 13 above, controller 40 receives from differential amplifier 86 the delta voltage at the differential amplifier output. Controller 40 digitizes (samples) this voltage over time. A variable holding the most recently digitized delta voltage sample is referred to herein as "del".

At a comparison step 4102, controller 40 compares between delta and a first threshold, referred to herein as a StartThreshold. If the delta is lower than the StartThreshold, the state machine remains in state 0, which means no changes detected in the respective channel, as shown at a state 0 step 4104. In some embodiments, when the state machine is looped back to state 0, the method loops back to init step 4101.

If the delta is higher than the StartThreshold, the method proceeds to an integration step 4106, at which processor 77 increases the variable sum by the value of del.

At a state transfer step 4108, the state machine moves to state 1. In some embodiments, state 1 begins at a comparison step 4110 controller 40 compares between del and a second threshold, referred to herein as a StartThreshold2, higher than StartThreshold. If the value of del is lower than StartThreshold2, the method loops back to state 0 of the state machine, which means the detected delta level is not sufficiently high and therefore the channel is considered "quiet," e.g., a shooting event has not started yet.

If at comparison step 4110, the level of delta is higher than StartThreshold2, controller 40 increases del into the sum variable, at an integration step 4112, and at a counting step 4114, controller 40 increases the startBuffercounter variable.

At a comparison step 4116, controller 40 checks whether startBuffercounter variable exceeds a predefined threshold, referred to herein as a StartCounterThreshold. If startBuffercounter variable is still smaller than StartCounterThreshold, the state machine remains in state 1 and the method loops back to comparison step 4110.

If startBuffercounter variable is larger than StartCounterThreshold, the state machine moves to state 2, at a state 2 step 4118. Note that moving from state 1 to state 2 indicates starting an event of a potential hit. The event continues as long as del remains higher than StartThreshold2 and consistently repeats with every "delta" received from differential amplifier 86.

At some point in time, the delta between the voltage received from the target (VTarget) and the reference voltage (VRef) decreases, which is indicative of ending the event. At this stage the method moves from state 2 to state 3 of the state machine as will be described below.

At a comparison step 4120, controller 40 compares between del and a third threshold, referred to herein as a StopDeltaThreshold, lower than StartThreshold2. If del is smaller than StopDeltaThreshold, controller 40 increases del into the sum variable, at an integration step 4122. In some embodiments, controller 40 further initializes the stopBuffercounter variable to zero, at a buffer reset step 4124, and loops back to comparison step 4120 of state 2. In other words, the state machine remains in state 2.

If at comparison step 4120, del is higher than StopDeltaThreshold, controller 40 increases del into the variable sum, at an integration step 4126. At a counting step 4128, controller 40 updates the stopBuffercounter variable by one.

At a comparison step 4130, controller 40 checks whether the stopBuffercounter variable is above a predefined threshold, referred to herein as a StopBufferCounterThreshold. If the value of the stopBuffercounter variable is smaller than the StopBufferCounterThreshold, the method loops back to comparison step 4120 and the state machine remains in state 2. Otherwise, the state machine moves to state 3, at a state 3 step 4132. Moving from state 2 to state 3 indicates that the current event has ended.

At a comparison step 4134, controller 40 compares between the sum variable that accumulated the dcl values and a predefined threshold, referred to herein as a significantHitThreshold.

If the sum variable is smaller than significantHitThreshold, the method loops back to state 0 of the state machine, which means, no projectile hit detected in target 60. If the sum variable is larger than significantHitThreshold, controller 40 outputs a target hit indication, at a hit reporting step 4136. In some embodiments, the target hit indication comprises the value of the variable sum and the hit location in target 60 and is sent, via device 42, to goggles 24, and displayed on display 22.

Subsequently, the method loops back to state 0 of the state machine so as to initialize the state machine for detecting a subsequent projectile hitting target 60.

Figure 15:
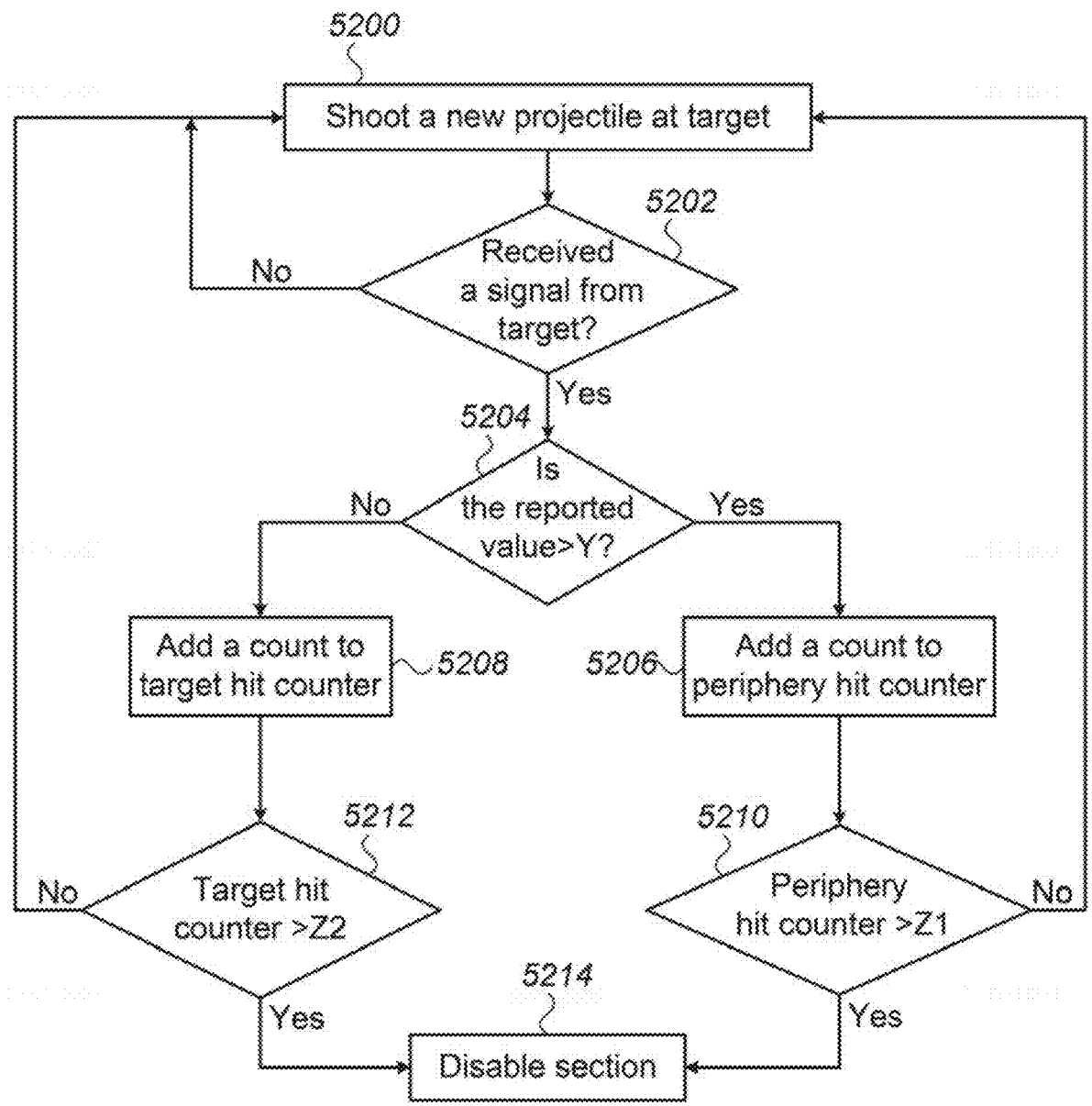
FIG. 15 is a flow chart that schematically illustrates a method for managing availability of sections of a shooting target, consistent with the disclosed embodiments.

FIG. 15 is a flow chart that schematically illustrates a method for managing availability of sections of shooting target 60, in accordance with an embodiment of the present invention. The method of FIG. 15 is carried out by processor 77.

The method begins with the user shooting a projectile at target 60, at a projectile shooting step S200. At a hit detection step S202, processor 77 checks whether wireless communication device 42 sent a signal indicating that the projectile physically hit target 60. Controller 40 of target assembly 28 may decide to send a signal, for example, using the method described in FIG. 14 above or using any other suitable method. If no signal has been received from device 42, the method loops back to step S200 for shooting a new projectile at target 60.

If a hit indication has been received from device 42, processor 77 checks, at a comparison step S204, whether the value of the overall voltage change received from device 42 exceeds a predefined value Y. In an embodiment, an overall voltage change larger than the value of Y indicates that the projectile hit the periphery area, and a value of overall voltage change smaller the value of Y indicates that the projectile hits target zone 62.

The following steps of the method describe operations in a specific section, but are applicable for all of the sections, as well as for the entire area of target 60.

In some embodiments, processor 77 is configured to hold for each section a counter variable for each target zone 62, referred to herein as a target-hit-counter, and a counter variable for the periphery area, referred to herein as a periphery-hit-counter. At the beginning of the game, processor 77 initializes these counters as sum=0.

In some embodiments, processor 77 further holds one or more thresholds used for limiting the number of hits allowed for each of the periphery and target zones of each sections, as will be described in detail below.

If the overall voltage change exceeds the value of Y, processor 77 receives a signal from device 42 of target assembly 28, of FIG. 11 above, and updates the respective periphery-hit-counter by one, at a periphery counting step S206. In other words, processor 77 may receive from circuitry connected to the conductive target, discrete signals indicative of a conductive lead line hit. The return signal from a conductive lead line hit may vary from return signals resulting from target zone hits. In this way, a conductive lead line hit may be discerned from a target zone hit. Alternatively, based on a signal received from target assembly 28, if the value of the overall voltage change is smaller than Y, processor 77 updates a target-hit-counter by one, at a target counting step S208. In other words, processor 77 may receive, from circuitry connected to a conductive target, discrete signals indicative of a target zone hit. Processor 77 may count the discrete signals indicative of lead line hits and target zone hits. Each type of discrete signal may be counted separately. Alternatively or additionally, a combined count for all types of hits may be counted, as described above.

As mentioned above, processor 77 limits the number of hits allowed for each of the periphery and target zones of each sections. In some embodiments, processor 77 holds a threshold denoted Z1 for the periphery-hit-counter described at step S206 above, and a threshold denoted Z2 for the target-hit-counter described in step S208.

At a comparison step S210, processor 77 may compare the counted discrete signals indicating target zone hits and conductive lead line hits (e.g., periphery hits) with a prestored threshold rule. For example, after increasing the periphery-hit-counter by one count at step S206, processor 77 may compare the updated periphery-hit-counter with threshold Z1. If the value of the periphery-hit-counter is smaller than Z1, the periphery area is still enabled for shooting and the method loops back to shoot a subsequent projectile at step S200. If the value of the periphery-hit-counter is larger than Z1, processor 77 disables the respective section, at a section disabling step S214.

Some disclosed embodiments may be configured to output an exhaustion signal indicating that the conductive target is spent when a prestored threshold rule is violated by at least one of the counted first discrete signals or the counted second discrete signals. An exhaustion signal may refer to any form of signal indicating that the conductive target is spent. A target may be said to be spent when it reaches a state where it either may not perform as desired or where it reaches a threshold of hits. A spent target may not necessarily no longer be functional, but may be considered spent when a prestored threshold rule is violated by a number of hits to target zones, lead lines, or both. The prestored threshold rule may be programed into the detachable circuitry or into a wirelessly connected device such as a mobile communications device. In some embodiments, the prestored threshold rule may be stored in a remote device and may be retrieved by the mobile communications device. For example, the prestored threshold rule may be retrieved from a remote server, a cloud storage platform, or any other remote storage location.

As used herein, a prestored threshold rule may be predefined condition or set of condition associated with hits to a target. In some embodiments, the threshold rule may define a threshold number of lead line hits regardless of a number of target zone hits. Accordingly, an exhaustion signal may be output based on lead line hits alone. For example, referring to FIG. 16, section 668 comprises six traces 64, assuming the value of Z1 is 2 and an average number of 1.5 traces 64 are affected in a single physical hit, then after three hits, almost all traces 64 are affected, therefore, section 66B is disabled at step S214. Similarly, in some embodiments, an exhaustion signal may be output based on a total number of target hits, regardless of a number of lead line hits. In some embodiments, a threshold rule may be defined based on a combined total of lead line and target zone hits. Accordingly, processor 77 may cause an exhaustion signal to be outputted when a total number of discrete signals associated with target zone hits and discrete signals associated with lead line hits reaches a threshold.

Thresholds used in conjunction with these threshold rules may be defined in a variety ways. In some embodiments, target zone hits and lead line hits may be counted as discrete signals, as described above. Accordingly, a threshold may be defined based on a number of discrete hits. Alternatively or additionally, a threshold may be defined based on a total change in electrical properties, such as changes in resistance or conductivity. The threshold amount may similarly be defined in numerous ways. In some embodiments, the threshold value may be a predetermined value (e.g., a default value of the system, a value defined by a target manufacturer, a value defined by a shooting range, etc.). According to some embodiments, a user may define or adjust one or more threshold values. For example, a user may adjust a threshold number of hits through a user interface of a mobile communications device, of assembly 265, or another computing device. In some embodiments, the threshold may be based on a type of target being used. Accordingly, the system may receive from the circuitry connected to the conductive target, an indicator of a target type, and the threshold may be determined based on the target type.

According to some embodiments, the exhaustion signal may be configured to cause on a display of a mobile communications device an indication that the target is spent. The indication may be displayed on the mobile communications device in any form, be it numerical, alphanumerical, graphical, audible, or a combination of one or more of the foregoing. For example, a display on the cell phone might use alphanumeric characters or sequences of characters to indicate a target or target region is spent. As another example, the indication may include a graphical presentation of at least one of an image or an animation; an audible signal; or other forms of notifications described herein. As yet another example the indication may be in the form of a game-related event, such as a game over indication (e.g., indicating that a game the shooter is participating in has ended).

Figure 16:
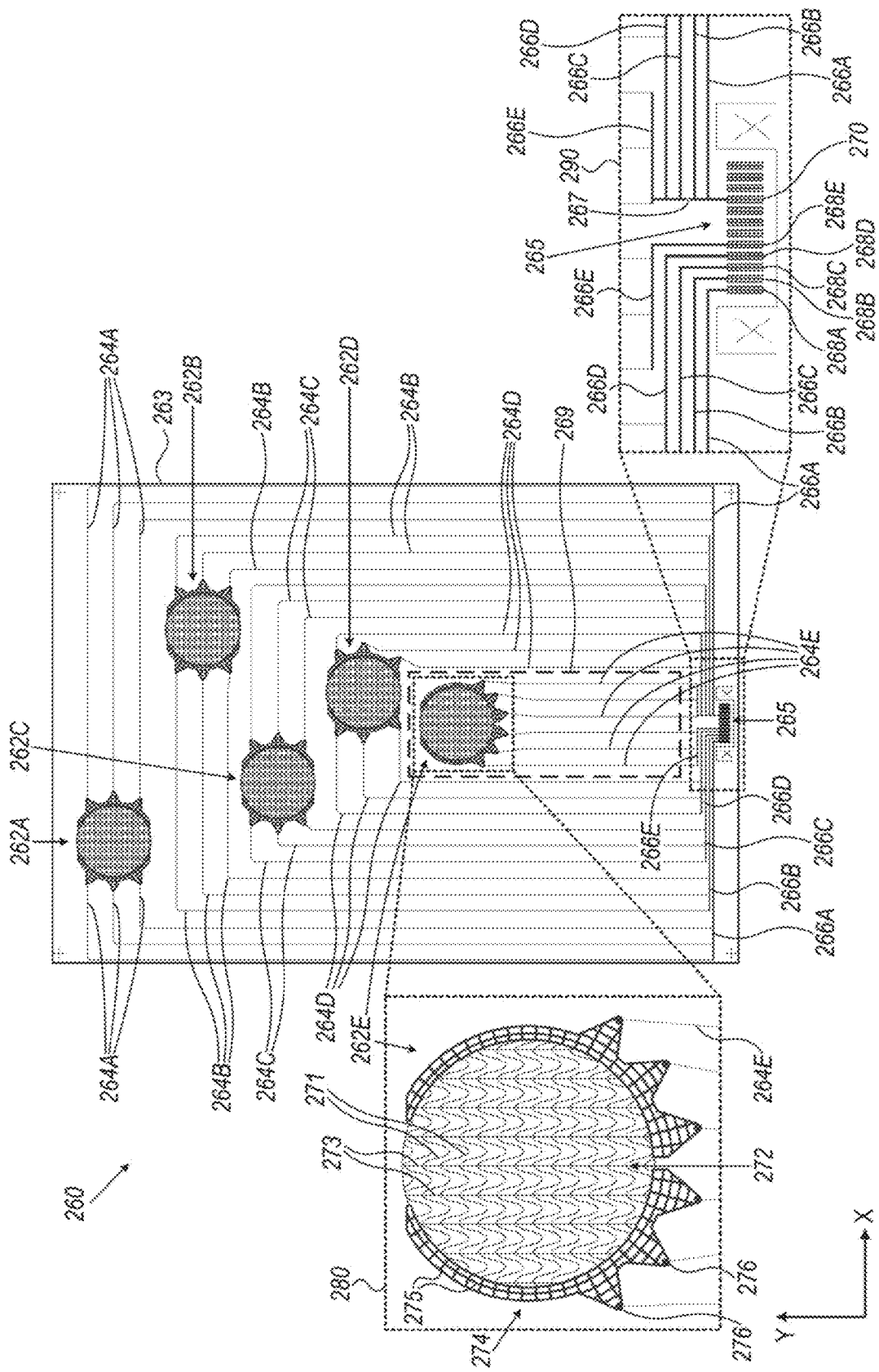
FIG. 16 is a schematic illustration of a shooting target, consistent with the disclosed embodiments.

In some embodiments, the exhaustion signal may be output based on hits associated with particular target zones. For example, the target may include multiple target zones, each associated with a set of lead lines, as shown in FIG. 16. Accordingly, an exhaustion signal may be generated based on hits to one of the targets or on a group of targets. For example, a threshold rule may be based on a counted number of lead line hits to one target zone regardless of lead line hits to other target zones. As another example, the exhaustion signal may be output when a total number of target zone hits and lead line hits for a particular target zone reaches a threshold. Accordingly, an exhaustion signal may not apply to an entire target but may apply to a particular target zone. For example, the exhaustion signal may cause a mobile device to overlay an indicator of a particular target zone being exhausted while indicating that other target zones are still active. Any other suitable means for indicating a target is spent described above may equally apply to a particular target zone.

Continuing with the previous example, processor 77 is configured to produce and overlay a visual indication indicative of section 66B currently invalid for shooting. Moreover, in another section (e.g., section 66B) of target 60 in which the value of the periphery-hit-counter is smaller than Z1, processor 77 is configured to produce and overlay a visual indication indicative of section 66E currently valid for shooting.

In other embodiments, in case all zones 62 and periphery area of all sections 66A-66F exceed the allowed number of hits, processor 77 is configured to overlay a visual indication indicative of target 60 invalid for shooting.

As described in FIG. 12B above, electronic assembly 41 is configured to measure one or more other electrical parameters indicative of hit detection, such as but not limited to a change in resistance or current flow.

Similarly, for target zone 62, if the value of the target-hit-counter is smaller than 72, target zone 62 is still enabled for shooting and the method loops back to shoot a new projectile at step S200. If the value of the target-hit-counter is larger than Z2, processor 77 disables the respective section, at a section disabling step S214.

In the example of section 66B, target zone 62 has a large area and contains a dense grid of traces, therefore the value of 72 may be set larger than the value of Z1. e.g., Z2=5 counts. Step S214 concludes the method of FIG. 15.

Shooting Target Having Multiple Conductive Inks of Different Electrical Conductivities.

FIG. 16 is a schematic, pictorial illustration of a shooting target 260, in accordance with another embodiment of the present invention. Shooting target 260 may serve, for example, as shooting target 33 of FIG. 11 above. In some embodiments, shooting target 260 comprises a substrate 263 having multiple patterns disposed thereon.

In some embodiments, shooting target 260 comprises one or more target zones, in the present example five target zones 262A, 262B, 262C, 262D and 262E, each of which comprising a grid of electrically-conductive circuit traces, also referred to herein as "traces" for brevity.

In an example embodiment shown in FIG. 16, all target zones are similar, but in other embodiments, at least one of the target zones may have different attributes, such as a different size, shape, layout and materials as will be described below.

Reference is now made to an inset 280 showing a detailed layout of target zone 262F.

In some embodiments, target zone 262E comprises a target pattern 272 having multiple vertical linear traces 273 oriented along Y-axis, and wavy traces 271 oriented along X-axis and laid out in a high spatial density. For example, traces 271 may have, each, a width between 100 μm and 500 μm, or any other suitable width, and a spacing between two adjacent traces 271 may be between 500 μm and 4 mm or any other suitable spacing. The aforementioned layout and dimensions are provided by way of example, and in other embodiments, target pattern 272 may have any other suitable layout of traces having any other suitable dimensions. Note that, due to the wavy shape, traces 271 are interleaved along at least one of X and Y axes so that a projectile that hits target pattern 272 may disconnect (i.e., sever) at least one, and more likely, two or more of traces 271. In some embodiments, the circuit traces of each target zone may include overlapping traces. For example, the target zones may include linear traces overlapping the wavy traces, or any other combinations of patterns.

In some embodiments, target zone 262E may comprise an interface pattern 274 made from a grid having a crisscross or any other suitable layout of traces 275, each of which having any suitable width and spacing between two adjacent traces 275. The interface pattern may function to interconnect a series of lead lines with a target zone, and defining a gap between an end of each lead line and the target zone. For example, each of the plurality of target zones may include at a periphery thereof, an interface pattern, as shown in FIG. 16. The interface pattern may include a series of spaced-apart spikes, as illustrated by way of example in FIG. 16, where lead lines electrically connected to the target zone through the tip of each spike of interface pattern 274.

In some embodiments, target zone 262E may comprises dots 276, configured to electrically connect between traces 275 of interface pattern 274 and electrical traces 264E, which are not part of target zone 262E and will be described in detail below.

As illustrated, spaced-apart traces 264 in FIGS. 16 and 64 in FIG. 12A serve as lead lines (conductive pathways) that electrically interconnect interface 270 with target zones 262 (in FIG. 16) and 62 (in FIG. 12A). As further illustrated, two sets of lead lines connect to each target zone. A first set of lead lines on one side of a target zone serve as supply leads and a second set of return lead lines on an opposite side of the target. The lead lines 264 may have a non-overlapping geometry, such as illustrated by way of example in FIGS. 12A and 16, and the target zone may be constructed of a geometry of a series of overlapping conductive traces, such as illustrated by way of example in target zones 62 and 262 of FIGS. 12A and 16, respectively. These differences in geometry may result in different electrical properties, such as resistance, conductivity, or other electrical properties as described herein. The supply and return leads do not need to be located on opposite sides of a target zone. For example, as illustrated in connection with target zone 262E in FIG. 16, both the supply and return lead lines generally connect to a common side of the target zone 262E. As used herein, the term "lead lines" does not necessarily imply that the pathways are linear. They can have any configuration so long as they are part of a circuit that interconnects the target interface with a target zone.

Each target zone may be associated with one or more conductive lead lines. In some embodiments, the plurality of spaced apart conductive lead lines may include at least four conductive lead lines associated with a single target zone. For example, a first pair of conductive lead lines may serve as supply leads and a second pair of conductive lead lines may serve as return leads, as shown in FIG. 16.

In some embodiments the lead lines may be spaced by a distance greater than a caliber of projectile for which the target is intended. For example, when a target is intended for use with ammunition of between .22 caliber through .45 caliber, the distance between adjacent lead lines may be somewhat greater than 11.43 mm. Since this is the dimension of a .45 caliber bullet, a hit that misses a target zone and instead strikes a region containing lead lines should sever no more than a single lead line, if a target is intended for use with up to .50 caliber bullets, the spacing between lead lines may be somewhat greater than 12.7 mm. The extent to which lead line spacing is greater than an intended caliber to be used with the target may be a function of the material used for the target substrate and may be a function of the projectile. Thus, the amount by which the spacing of lead lines is greater than intended bullet caliber to be used with target may be a matter of design choice. For example, for targets intended for use with bullets of between 0.10 and .50 caliber, the spacing between adjacent lead lines may be between 10 mm and 13 mm.

In some embodiments, at least some of the traces and dots of target zone 262E may comprise one or more types of electrically-conductive ink made from platinum, or graphene, or graphite, or carbon having an allotrope different than graphene or graphite, or any suitable alloy thereof. The alloying elements of shooting target 260 are described in detail below. Note that the above list is provided by way of example and in other embodiments, at least some of the target zones of shooting target 260, may comprise any other suitable element or an alloy of elements.

Reference is now made back to FIG. 16. In some embodiments, shooting target 260 comprises multiple sections, such as a shooting section 269 that comprises one or more target zones, such as target zone 262E described above, and traces 264E. The shape of target zone 262E may be round as shown in the example of FIG. 16, or may have any other suitable shape. Each of the target zones shown in FIG. 16, is electrically connected to respective electrical traces. In the present example, target zones 262A, 262B. 262C, 262D and 262E, are electrically connected to electrical traces 264A, 264B, 264C, 264D and 264E, respectively.

As illustrated in the example of FIG. 16, each target zone 262A-262E may be offset from each other both horizontally and vertically. Target zone 262A for example is offset horizontally (to the left of) target zone 262B. Target zone 262A is also offset vertically (above) target zone 262B. Some or all target zones on a particular target may be offset in one or more dimensions from another target zone. In other embodiments, offsets may only occur in one dimension.

In addition, at least one of the plurality of target zones have associated lead lines that approach from beneath the target zone, and a plurality of target zones have associated leads that approach from lateral sides of the target zone. As illustrated in FIG. 16 by way of example, the lead lines associated with target zone 262E all approach from beneath, while the lead lines for all other target zones approach from the lateral sides of the target zones. Alternatively, if designed with the interface 270 at the top of the target, at least one of the target zones might have lead lines that approach from above, while other target zones have lead lines that approach from above.

In some embodiments, the electrical traces are disposed at the periphery area of the respective shooting section. For example, in shooting section 269, electrical traces 264E are disposed at the periphery area, out of the area of target zone 262E. In some embodiments, target 26C comprises horizontal electrical traces 266A, 266B, 266C, 266D, and 266E, which are electrically connected to electrical traces 264A, 264B, 264C, 264D, and 264E.

In some embodiments, electrical traces 264A-264E are thinner than electrical traces 266A-266E and may be produced in the same process step or in different process steps. In alternative embodiments, electrical traces 264A-264E and 266A-266E are all similar and are formed in a single process step.

Reference is now made to an inset 290. In some embodiments, shooting target 260 comprises an electrical connecting assembly 265, also referred to herein as "assembly 265" for brevity. Assembly 265 is configured to connect between the aforementioned traces of target 260, and electronic assembly 41 shown in FIG. 1I above.

In some embodiments, assembly 265 comprises electrical connectors 268A. 268B, 268C. 268D, and 268E, which are electrically coupled to electrical traces 266A, 266B. 266C, 266D, and 266E, respectively. These electrical connectors may be of any suitable structure and may be affixed to the substrate in any suitable manner. For example, the electrical connectors may be printed on the substrate in a manner similar to the electrically conductive traces and lead lines as described herein. Alternatively, the electrical connectors may be mechanically affixed or bonded to the substrate.

As shown in inset 290, electrical traces 266A-266E are coupled, at each side of assembly 265, to multiple (e.g., three) traces 264A-264E. For example, each of electrical traces 266A is coupled to three electrical traces 264A. In other words, two traces 266A are connected to and are configured to exchange electrical current with six traces 264A. Therefore, as described above, traces 266A may have a larger width and/or comprise a suitable ink having higher conductivity compared to that of traces 264A.

In some embodiments, traces 266A-266E that are located at a first side of assembly 265, referred to herein as a left side, are coupled directly to electrical connectors 268A-268E, and traces 266A-266E that are located at a second side of assembly 265, referred to herein as a right side, are all coupled to a common trace 267, which is electrically coupled to a common electrical connector 270.

In this configuration, the target zones and respective shooting sections of shooting target 260 are electrically coupled to electronic assembly 41 via five respective pairs of electrical connectors. Each pair comprises one connector from among electrical connectors 268A-268E, and electrical connector 270, which is common to all shooting sections.

In some embodiments, one connector of each pair may be connected to a ground potential and the other connector may be coupled to the current source of electronic assembly 41, which drives the predefined current level to the traces described above.

Reference is now made back to the complete layout of shooting target 260 shown in FIG. 16. In some embodiments, a current source of controller 40 or of any other suitable control circuitry of electronic assembly 41, is configured to flow the electrical current. e.g., a direct current (DC) or an alternating current (AC), through each of the sections, and controller 40 is configured to measure the resulting voltage between the pair of connectors. For example, in shooting section 269, controller 40 is configured to flow a DC in a clockwise direction, from connector 268E to electrical connector 270, via traces 266E and 264E, target zone 262E and common trace 267, and to measure the resulting voltage between electrical connectors 268E and 270. In alternative embodiments, controller 40 is configured to flow the DC in a counterclockwise direction, or to flow an AC in both directions. In other embodiments, controller 40 of electronic assembly 41 is configured to measure one or more other electrical parameters indicative of hit detection, such as but not limited to a change in resistance or current flow.

In the example embodiment of FIG. 16, assembly 265 and traces 266A-266E are laid out at the lower edge of shooting target 260. In other embodiments, assembly 265 may be laid out at any other suitable location of shooting target 260, or even external to shooting target 260. In such embodiments, assembly 265 may be electrically coupled to shooting target 260 via leads or wires or any other suitable conductors and/or electronic or electrical assemblies. The traces of shooting target 260, may have any suitable shape for connecting between the target zones and assembly 265.

In the example configuration shown in FIG. 16, traces 264A may be arranged in a flipped "U" shape connecting between target zone 262A and traces 266A. In this configuration, traces 264E may be parallel to Y-axis and traces 266A-266E may be parallel to X-axis. In alternative embodiments, the traces connecting between the target zones and assembly 265 may be arranged in any other suitable configuration as depicted, for example, in FIGS. 12A and 12B above.

In some embodiments, shooting section 269, and any other shooting section of shooting target 260, constitutes an electrical circuit comprising multiple resistors laid out in a parallel and/or serial configuration. In such embodiments, a projectile hit may disconnect at least one of the aforementioned traces, which may result in a change of one or more electrical parameters, such as voltage, resistance and current flow, measured by electronic assembly 41. As shown in FIGS. 12A, 12B, and 16, each of respective shooting target 60, 70 and 260 has different patterns for the target zone and periphery area. Thus, a change in one of the aforementioned electrical parameters is indicative of whether the projectile hits the target zone or the periphery area.

In some embodiments, a shooting target, other than shooting target 260, may comprise two patterns made from the same type of ink. In a first configuration, the periphery area may comprise a narrow trace having an exemplary width of 200 μm, and therefore a high electrical resistance, e.g., in an order of tens of kilo-ohms. In this configuration, a projectile hit in the narrow trace may cause a larger change in the electrical parameters, compared to a projectile hit in the target zone. The narrow trace increases the overall resistance of the respective shooting section. This reduces the detection reliability of system 20 because the ability of electronic assembly 41 to detect small changes in the electrical parameters reduces compared to a wider trace. Moreover, a periphery area having a single narrow trace may result in a low durability of the target shooting. For example, a single projectile hit may disconnect the respective shooting section from electronic assembly 41, and may destroy the entire shooting target.

In a second configuration, the periphery area may comprise a wide trace having an exemplary width of 600 μm, and therefore a low electrical resistance. e.g., in an order of a single-digit kilo-ohms. In this configuration, a first projectile hit in the wide trace may cause smaller (or sufficiently small) change in the electrical parameters, relative to a projectile hit in the target zone, and therefore, may have small or no effect on the detection sensitivity. However, a second hit in the wide trace may result, as described in the first configuration, in reduced sensitivity, and in case of a complete disconnection of the trace, may destroy the entire shooting target. As shown in FIGS. 12A and 121, the periphery area may comprise multiple traces having a width limited by the available real estate of the shooting target.

In some embodiments, shooting target 260 is designed to maintain high sensitivity and durability by patterning in the periphery area of the shooting section, multiple traces made from a low-resistance ink and having a small width of about 200 μm or less, as will be described in detail below. Note that when the resistance of the periphery traces is smaller than the resistance of the target zone, the overall conductivity, and therefore also the detection sensitivity of the respective shooting section, increases.

Differences in electrical characteristics between the lead lines (e.g., the electrically conductive traces interconnecting the interface and the targets zones) and the electrical characteristics of the electrically-conductive circuit traces of the target zones may enable the external circuitry to differentiate a target region projectile hit from a lead line projectile hit. Such differentiation, as well as all hit detections, may occur within external circuitry selectively attached to the target (such as electrical assembly 41), may occur in other external circuitry (such as a paired cell phone or other mobile device), may occur on another processor (such as via a server networked to assembly 41 or to a mobile device that itself is networked to assembly 41), or may occur through a combination of such external circuitry. In other words, reference to external circuitry herein simply refers to circuits that are not permanently integrated into the target.

Due to differences in electrical characteristics between the lead lines and the electrically conductive traces of the target zones, severance of those pathways may exhibit differing electrical properties. For example, the electrical pathways of lead lines may have conductivity greater than electrical pathways of the electrically conductive traces in the target zones. Characteristics that may differ include material, thickness, shape, width, or other geometry or physical feature. As a result of these differences in characteristics, electrical pathway severance may result in differences in electrical properties detected. Such difference may be exhibited as differences in conductivity, resistivity, or other electrical parameters. In some embodiments, differences in changes in electrical properties may be based on more than one change. For example, the differences between a first change in the electrical property and a second change in the electrical property may be manifest as the result of differences in both geometry and conductivity.

By constructing the lead lines and the electrically conductive target traces differently so as to result in different electrical properties exhibited upon severance, external circuitry is capable of differentiating a target region projectile hit from a lead line projectile hit. In one embodiment, the sensitivity of the external circuitry is such that an electrical property change resulting from a lead line hit is not detected at all (e.g., it is below a detection threshold). In this way, the circuit is able to distinguish a lead line hit from a target zone hit. In other embodiments, the lead line hit and the target zone hit are both detectable by external circuitry, with the property of the resulting signal differing depending on which of the two structures are hit. In this way, the external circuitry is capable of distinguishing a lead line hit from a target zone hit. This can occur as the result of the external circuitry being configured to recognize one or more electrical properties (e.g., conductivity, resistivity) of a lead line hit as distinguished from a target zone hit which may exhibit a substantially different change in the same electrical property. The external circuitry may be programmed or otherwise designed to associate certain ranges of electrical properties with certain types of electrical pathway destruction.

Thus, in some embodiments, when a target zone is hit with a projectile, at least one processor may detect a first electrical signal reflective of severance of at least a portion of the conductive target zone hit. Similarly, when a lead line is hit by a projectile, at least one processor may detect a second electrical signal, different from the first electrical signal, representing severance of one or more of the lead lines. The at least one processor may then trigger an indicator of a target hit in response to the first electrical signal, but might prevent triggering of the target hit indicator in response to the second electrical signal.

The at least one processor may be located in a single location or spread across a variety of locations, depending on system design choice. For example, some or all of the at least one processor may be included in a circuit assembly directly connected to the target interface; a mobile communications device or processor in a fixed network paired to the target or the directly connected circuit assembly; or a remote network connected to the target via the cloud, through one or more of the aforementioned intermediary devices. Thus, all hit detection functions may occur in a single location or may occur using a series of processors in differing locations. Regardless, a detections may occur via the interface on the target, through which electrical signals may pass in order to be detected.

Detection may occur when a signal emanating from the target via the interface meets a predefined criteria (which may vary depending on system design). In some examples where the first signal reflects a rise or drop in conductivity or resistance, the system may recognize a target hit based on a value of the signal surpassing a threshold or falling within a particular range. An alternative range for the second signal may be reflective of a lead line hit. Or, the system may be designed to simply ignore the second signal as failing to meet the threshold required to record a target hit. Thresholding is but one exemplary mechanism of detection. Any other processor-based mechanism may be used to detect target hits and/or lead line hits.

In response to the first electrical signal, an indicator of a target hit may be triggered. That is, if the at least on processor recognizes the first electrical signal as reflecting a target hit, the at least one processor may output an indicator trigger signal. Depending on system design, the trigger signal may trigger one or more differing indicators. In some embodiments, the indicator may simply be a record of the hit. That record may be associated with a particular user. Additionally or alternatively, the trigger may cause an indicator to be displayed on an associated computing device. For example, if the shooter's cell phone is within a network of the at least one processor, the trigger may cause a change to occur on the cell phone of the shooter. Such change might include one or more of a count increase on a display, a graphical presentation to occur on the display, or a record to be stored in or via an app running on the cell phone.

The at least one processor may also detect, via the interface a second electrical signal representing a lead line hit, and prevent triggering of the target hit indicator in response to the second electrical signal. For example, the aforementioned at least one processor may recognize the second signal as reflecting something other than a target hit, and may be designed to prevent the triggering of the indicator in such circumstances. Preventing may include active prevention where explicit code run by the processor affirmatively blocks the triggering of a hit indicator when the second signal is detected, or it may in involve passive prevention, where the code run by the processor simply ignores the second signal, thereby preventing the triggering of a target hit indicator.

According to some embodiments, triggering of a hit indicator may be blocked based on a cumulative change for target zone hits and lead line hits. For example, as described herein, the system may detect first electrical signals representing severance of portions of one or more conductive target zone and second electrical signals representing severance of one or more lead lines. The system may then track a cumulative resistance change from the first electrical signals and the second electrical signals. This may indicate a total number of hits to a target, regardless of whether they are target or lead line hits. The system may prevent triggering of the target hit indicator based on the cumulative resistance change. For example, this may include comparing the cumulative resistance change to a predetermined threshold and preventing triggering of the target hit indicator if the cumulative resistance change exceeds the threshold. Thus any further trigger hit indications may be prevented.

The first electrical signal may reflect a first resistance and the second electrical signal may reflect a second resistance, different from the first resistance, and the at least one processor may be configured to distinguish between the first resistance and the second resistance. Alternatively, the first and second electrical signals may be any other electrical property other than resistance, which property may be evaluated by a processor to ascertain a target hit and/or a lead line hit.

A wireless transmitter may be included in circuitry assembly (e.g., 41 in FIG. 11) and a processor within such external circuitry may detect a hit and transmit a hit indicator to a wirelessly networked device (e.g., a cell phone of the shooter.) Alternatively, the such external circuitry may simply send indicators of signals from the target to a remote device which uses the signal to determine a hit. In such instances, the remote device might perform the signal analysis to determine a hit and trigger an indicator, which might appear on the very device that determined the hit. Regardless of whether the processor in circuitry attached to the target determines a hit or whether some other device such as a mobile communications device performs the final processing to determine a hit, the circuitry attached to the target may be said to have detected the first electrical signal and triggered the indication by virtue of having transmitted the data to another device.

The indicator may be displayed on the mobile communications device in any form, be it numerical, alphanumerical, graphical, or a combination of one or more of the foregoing. For example, a display on the cell phone might use alphanumeric characters or sequences of characters to congratulate the user for a hit; might indicate a portion of the target hit; might update a counter of hits on the display; might display an image or animation; or might cause sound (e.g., via an audible signal) to be emitted notifying the user of the hit. In some embodiments, the display may include an indicator light, which may light up to indicate a target hit or other events. Similarly, a paired device might emit a vibration to indicate a target hit. In addition or alternatively, the at least one processor may be configured to record in a memory location an indication of one or more of the first signal and the second signal. The record may occur in one or more of the shooter's mobile communications device, a remote storage device operated by a system provider (e.g., a remote server), a storage device operated by a shooting range where the shooter is located, and a remote storage device controlled by the shooter.

In some embodiments for example, the low-resistance ink allows patterning multiple narrow traces, such as traces 264E, so that a shooting section (e.g., shooting section 269) may have electrical resistivity of a single-digit kilo-ohms. Similarly, a higher resistance ink used in the target sections 262, may exhibit a higher resistance, enabling differentiation of a target zone hit from a lead line hit. Thus, the lead lines Ink resistivity is but one example. As discussed previously, other physical differences can also enable hit differentiation. Moreover, shooting section 269 can withstand at least one trace 264E being disconnected without losing functionality, and therefore also improve the durability of shooting section 269. These embodiments are applicable for all shooting sections of shooting target 260.

The difference in electrical properties between lead lines and target traces may be a matter of design choice. In one example, a ratio of a first change in electrical resistance to a second change in electrical resistance upon severance of lead lines and target zone traces may be at least 100:1. Such a significant difference may enable target hit detection to be readily distinguishable from a lead line hit. While such a wide variance may have certain benefits, it is not necessarily required. For example, in some embodiments, a first change in electrical resistance may be at least double the second change in electrical resistance.

As illustrated in FIG. 16, multiple lead lines 264 are redundantly connected to the same target zone. Target zone 262A for example, is located in a circuit between two sets of three lead lines 264A. The same is true for the other target zones 262B-E in the example of FIG. 16 as is also illustrated in the example of FIG. 12A where target zones 62 are connected to multiple redundant lead lines 64. As Illustrated in FIG. 12A, redundancy varies between target zones with some zones having four redundant lead lines and others having five or six. The extent of redundancy is a matter of design choice. From a functional standpoint, greater redundancy may make the target more robust in that redundancy enables detection of a target hit on a particular target zone after one of the conductive lead lines is completely 6R severed by a projectile or otherwise disconnected. Depending on the details of a particular circuit, a greater number of lead lines may enable the target to sustain destruction of multiple lead lines while enabling detection of hits on an associated target zone.

In some embodiments, at least some of traces 264A-264E and 266A-266E may comprise printed ink made from one or more chemical elements selected from a list consisting of silver, gold, copper, platinum, and/or from any suitable alloy comprising at least one of these elements. For example, at least some of traces 264A-264E and 266A-266E may comprise a printed ink made from a silver-based alloy, such as but not limited to silver-carbon, silver-chloride, or silver-nickel, graphene, graphite, and carbon having an allotrope different than graphene or graphite.

In some embodiments, at least one of the target zone traces (e.g., traces 271, 273 and 275) is made from ink having different (e.g., smaller) electrical conductivity compared to that of at least some of traces 264A-264E and 266A-266E of the periphery area outside the target zones. In other words, the periphery area has smaller resistivity relative to the target zone, and therefore has higher sensitivity to a change in conductivity caused by a projectile hit. In such embodiments, this configuration improves the detectability of a projectile hitting the target zone.

In some embodiments, the traces of at least one of the target zone and periphery area of shooting target 260 may comprise a large variety of alloying elements. For example, one or more chemical elements selected from a list consisting of: (a) silver, (b) copper, (c) gold, (d) aluminum, (e) calcium, (f) tungsten, (g) zinc, (h) nickel, (i) lithium, (j) iron, (k) platinum, (l) tin, (m) gallium, (n) niobium, (o) lead, (p) titanium, (q) mercury, (r) manganese, and (s) carbon, or any other suitable chemical elements, or any suitable combination thereof.

As described above, the voltage measured in a given shooting section, e.g., shooting section 269, depends on whether or not a hit occurred in this shooting section. In case of a projectile hit, the measured voltage depends on the hit location within the given shooting section. Since the ink conductivity and the density of traces differ between the target zone and the periphery, different voltage levels are typically measured when the hit occurred, for example, at target zone 262E and at traces 264E of the respective periphery area of shooting section 269.

Some embodiments may be configured such that a hit location within a particular target zone is indistinguishable electronically from a different hit location within the same target zone. Regardless, since hit detection is determined based on disconnection (e.g., severance) of traces, the material composition of the projectile causing the severance may have no impact on a resulting electrical signal resulting from the severance. Thus, a hit may be measured on the target even when striking projectile is made from a non-metal or is otherwise non-conductive.

In an embodiment, controller 40 in target assembly 28 is configured to detect a hit in a given section based on the voltage level measured on a respective connector pair of this section (e.g., connectors 268A and 270). In this example embodiment, controller 40 is configured to detect whether or not a projectile hit occurred at the respective shooting section, and to distinguish whether the hit occurred at target zone 262A or at one or more traces 264A of the periphery area. In other words, controller 40 is configured to determine the location in which the projectile physically hits target 260.

In some embodiments, wireless communication device 42 is configured to wirelessly send RF signals 44 conveying a location signal, indicative of the location in which the projectile physically hits target 260. As described in FIG. 11 above, device 42 may convey signals 44 to a wireless communication device 43 coupled to goggles 24, or to any other suitable wireless communication device of system 20.

The layout of target 260 is shown by way of example in order to illustrate certain embodiments, such as sensing and reporting the position of a projectile hit a in a multi-sectional non-uniform target. Embodiments of the present invention, however, are by no means limited to this specific layout, and the principles described herein may similarly be applied to other suitable layouts and/or suitable types of shooting targets. For example, in alternative embodiments, the target zone may have smaller resistivity relative to the periphery area, and therefore may have higher sensitivity to a change in conductivity caused by a projectile hit. In yet other embodiments, the target zone and periphery area may have similar resistivity.

Consistent with the embodiments described herein, an exemplary target may use redundant lead lines to its target regions. This may ensure that if a lead line is severed by a trajectory, an alternative conductive channel may exist and may enable the target region to continue to detect hits.

The target may include a substrate, lead lines, an electrical bus, and a plurality of target regions. The substrate may include any non-conductive material. By way of example, the substrate may include one or more layers of paper, plastic, cardboard, polymer or any other material. It can be treated with various laminations and/or covers to change its characteristics.

The lead lines may connect the target regions to the electrical bus, and may provide durability to the target, by allowing it to absorb projectile hits without affecting the target regions capability to detect subsequent projectile hits.

One alternative may be to use lead lines with very low resistance, so that projectile hits may produce little electrical impact on the electrical characteristics. Such lead lines may be achieved by using very wide lines or may be achieved by using a conductive ink with higher conductivity than that being used to deposit the target regions.

Another alternative may be to use lead lines with high resistance, so that projectile hits may produce significant electrical impact on the electrical characteristics. That impact may be significantly higher than that of a projectile hit in the target region, thus may allow the connected circuitry to distinguish between the two events.

Another strategy may be to use many, redundant lead lines, at the expense of the increased likelihood of the lead lines being severed by projectile hits.

Figure 17:
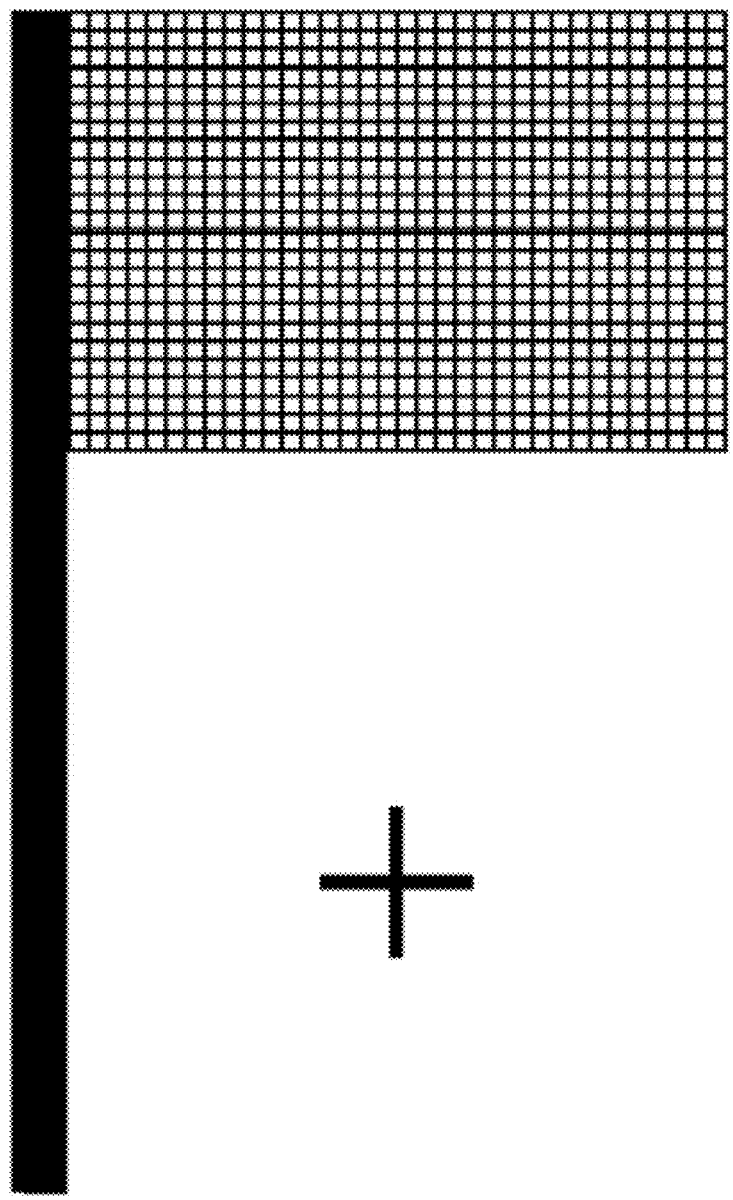
FIGS. 17 and 18 illustrate example target zones with reduced lead lines, consistent with the disclosed embodiments.
Figure 18:
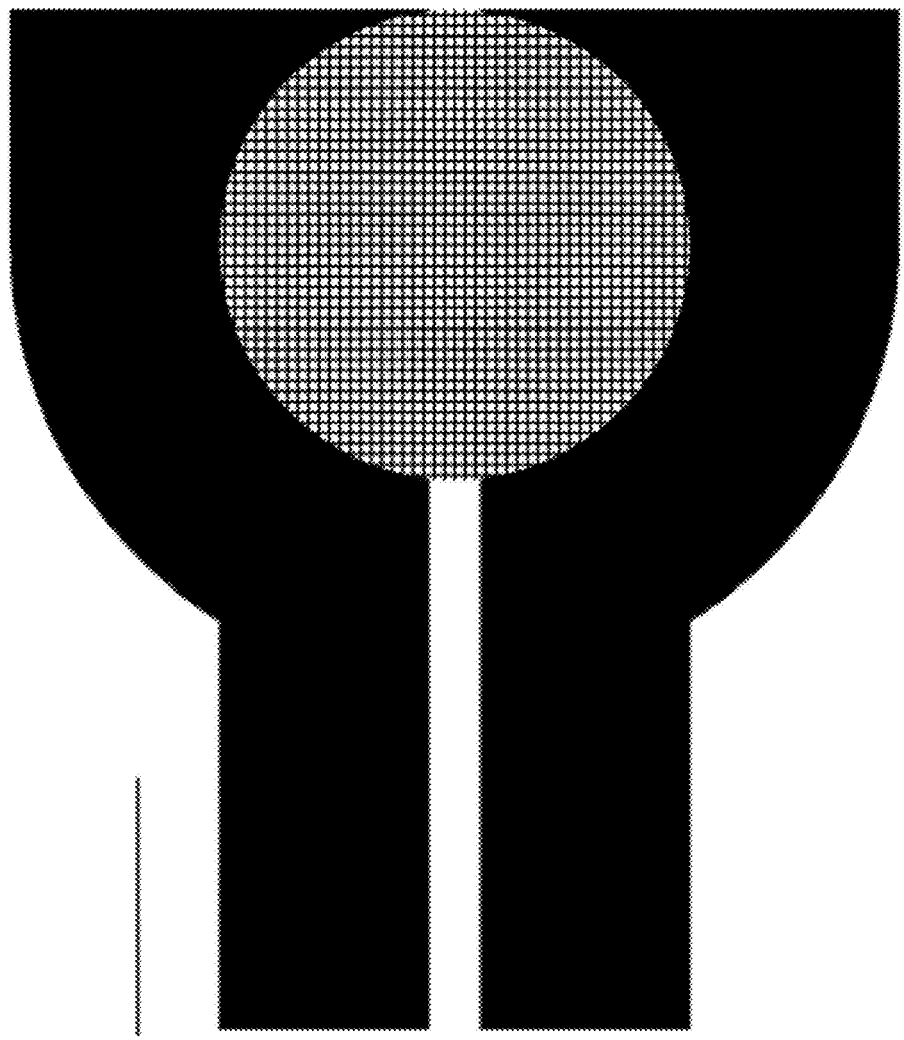

Another strategy may be to use fewer lead lines, sacrificing some redundancy for the reduced likelihood of the lead lines being severed. For example. FIGS. 17 and 18 demonstrate exemplary embodiments where there are reduced lead lines (illustrated as wide bold regions) connected to the mesh target regions. FIG. 17 shows a lead line on the left side, which is mostly out of the way of the target sheet. FIG. 18, while it shows reduced lead lines, show an alternative where the lead lines are very wide, and may be wider than the caliber of a projectile. In this way, even if the lead lines are hit by a projectile, the electrical connection would not be broken.

The electrical bus and lead lines may be deposited on the substrate by printing, etching or any other means of deposition. It may require post processing such as curing in order to achieve the desired electrical characteristics.

Figure 19:
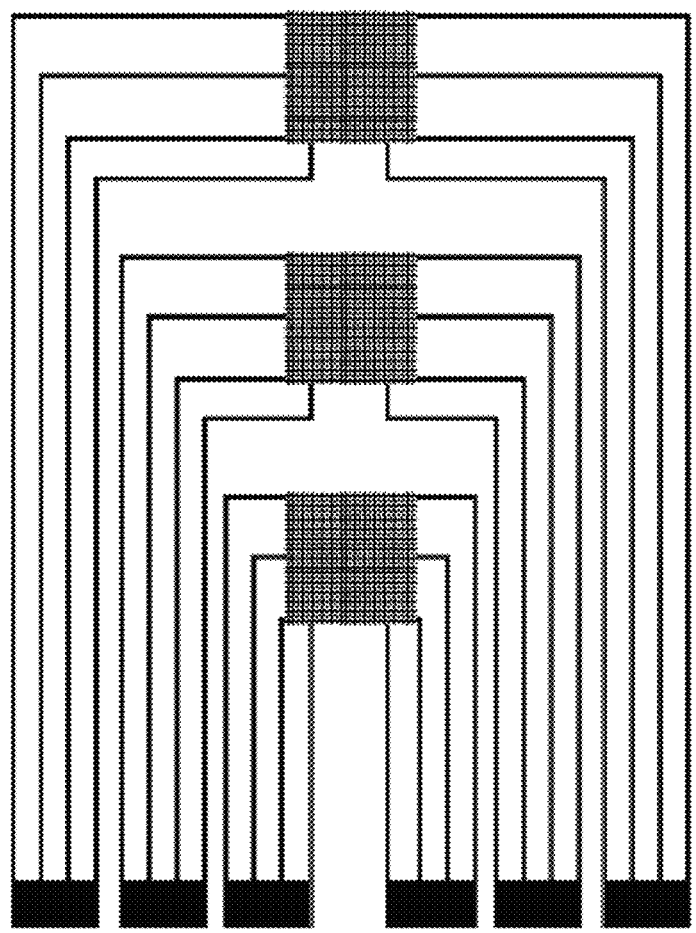
FIGS. 19-28 illustrate exemplary target regions and lead line configurations that may be implemented according to preference, consistent with the disclosed embodiments.
Figure 20:
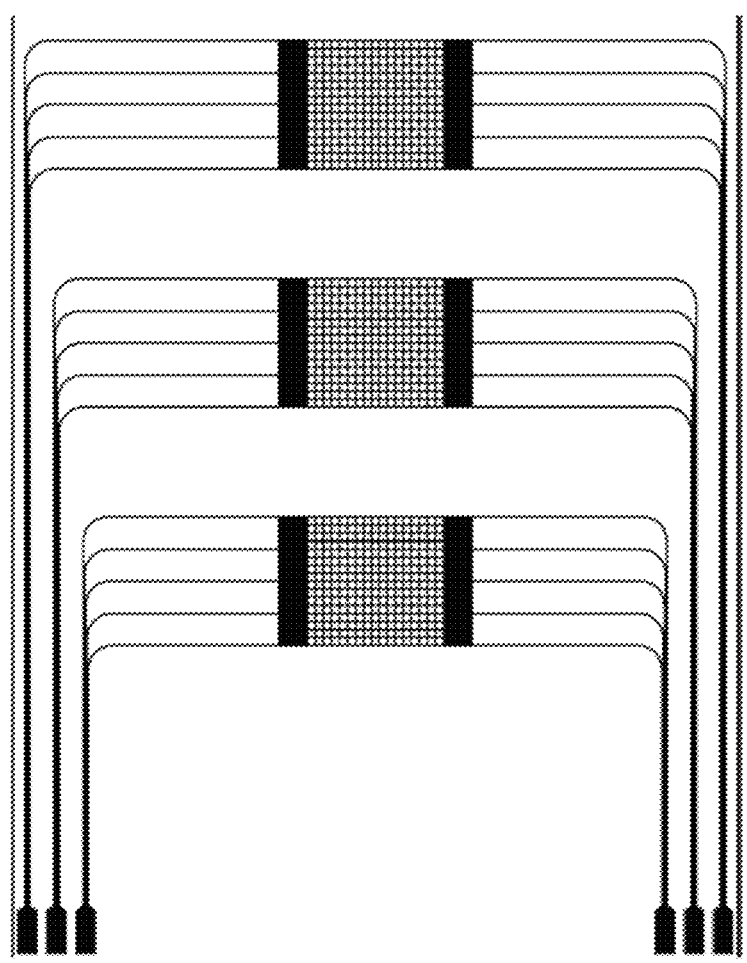
Figure 21:
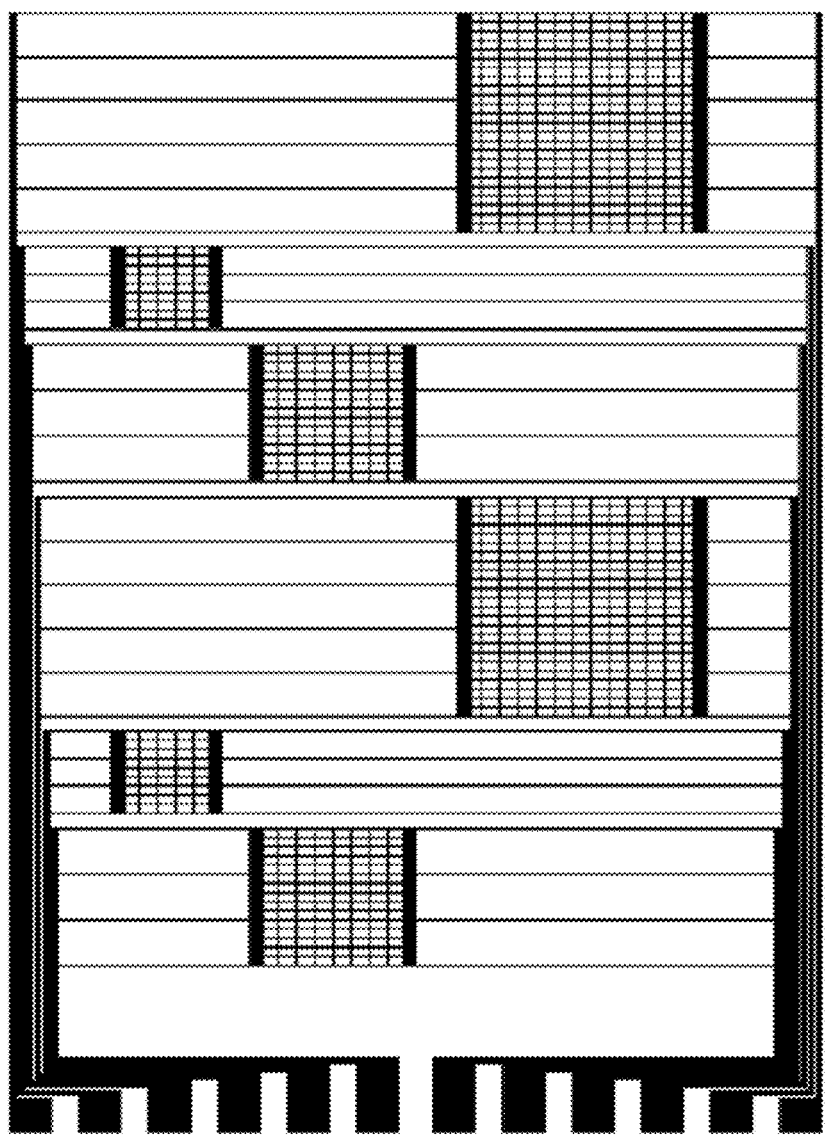
Figure 22:
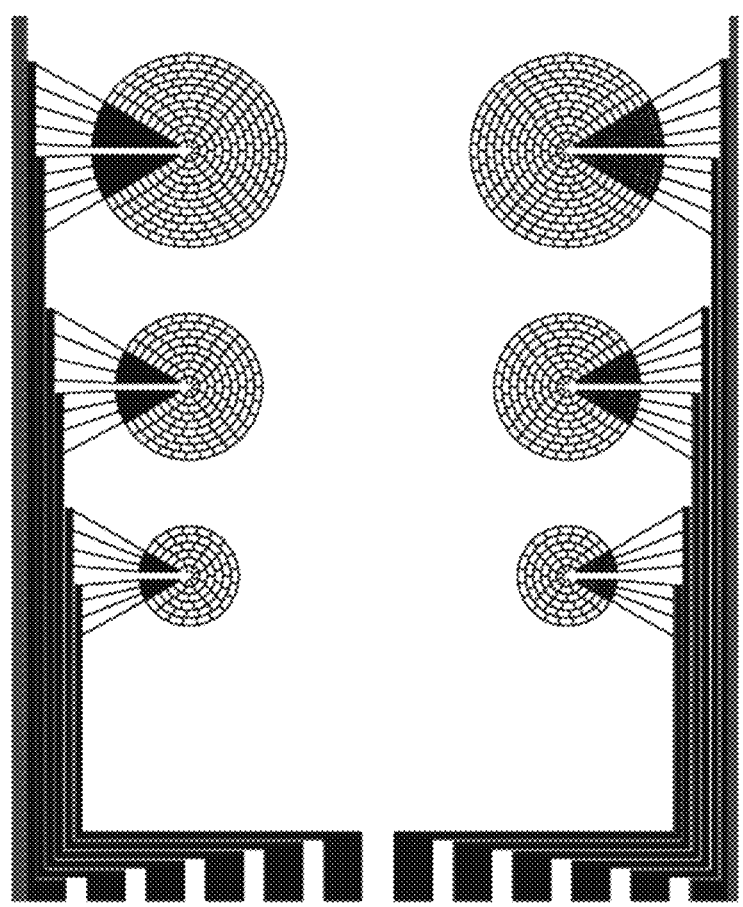
Figure 23:
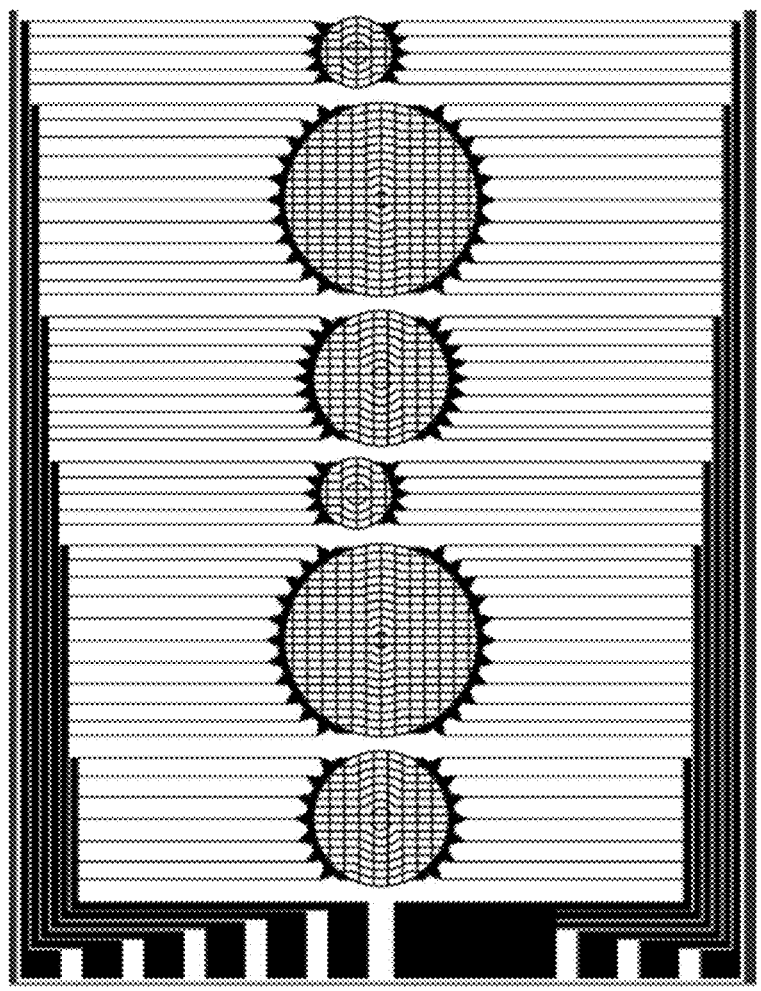
Figure 24:
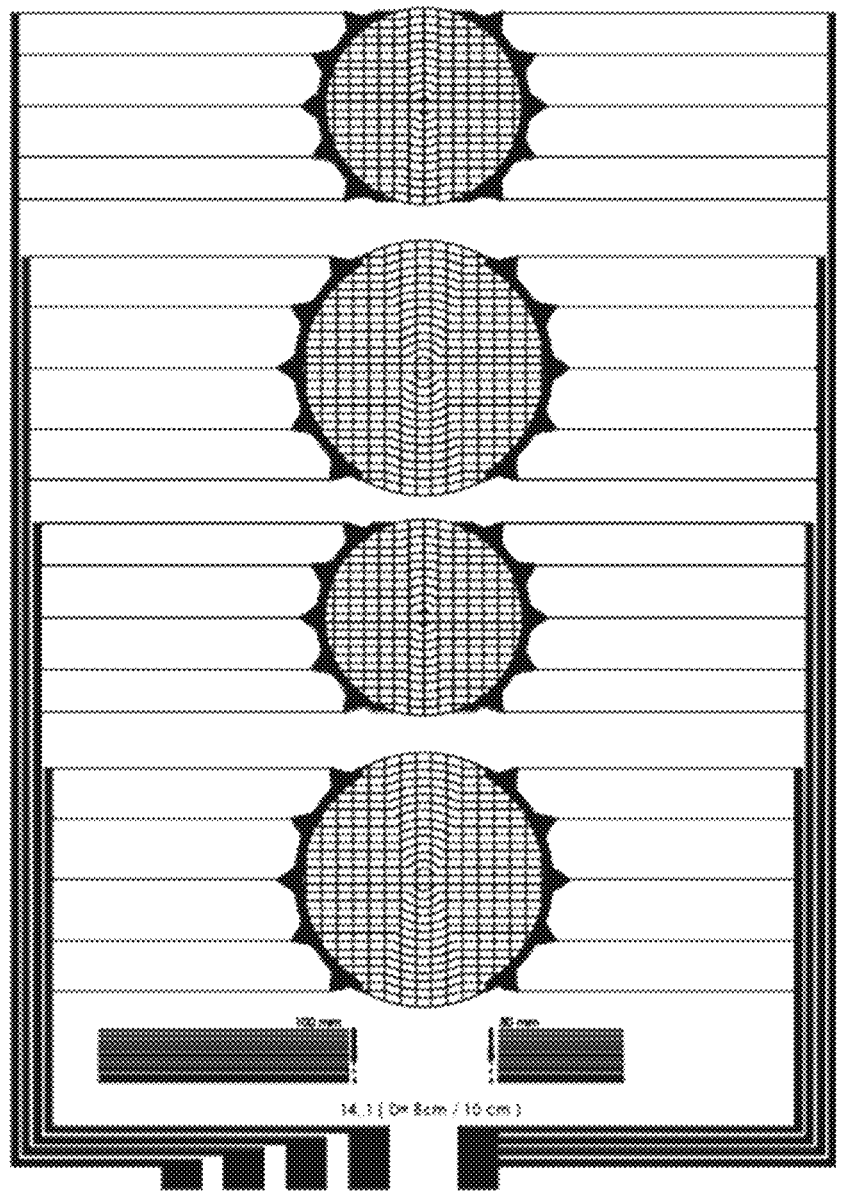
Figure 25:
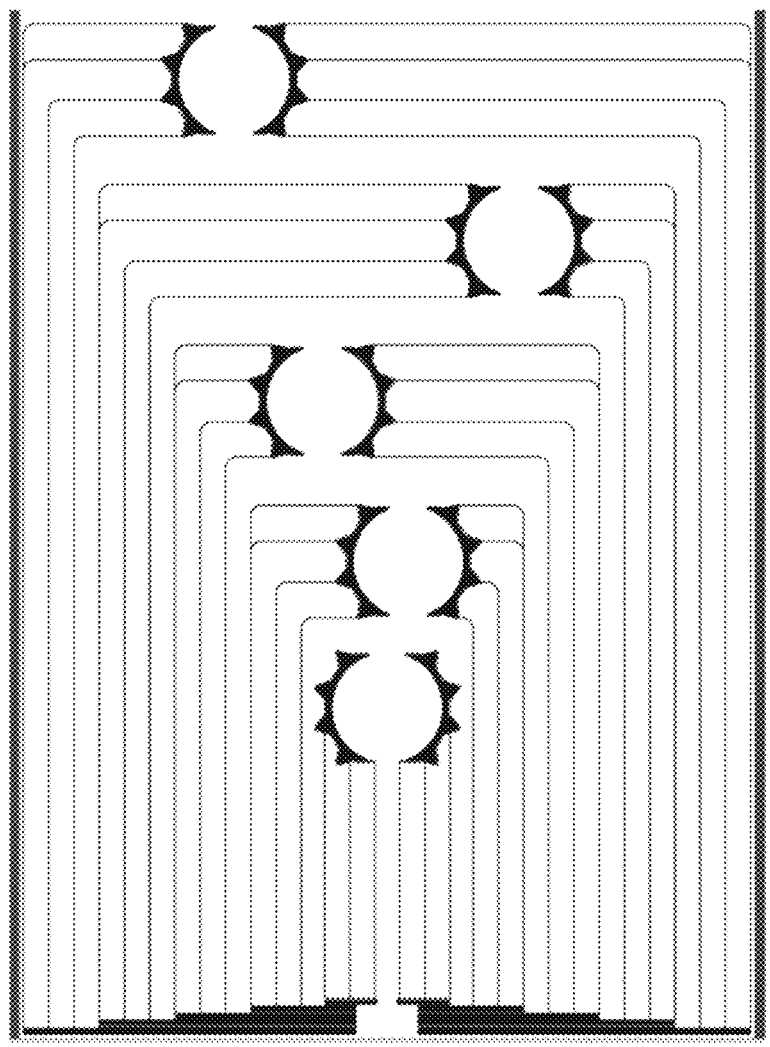
Figure 26:
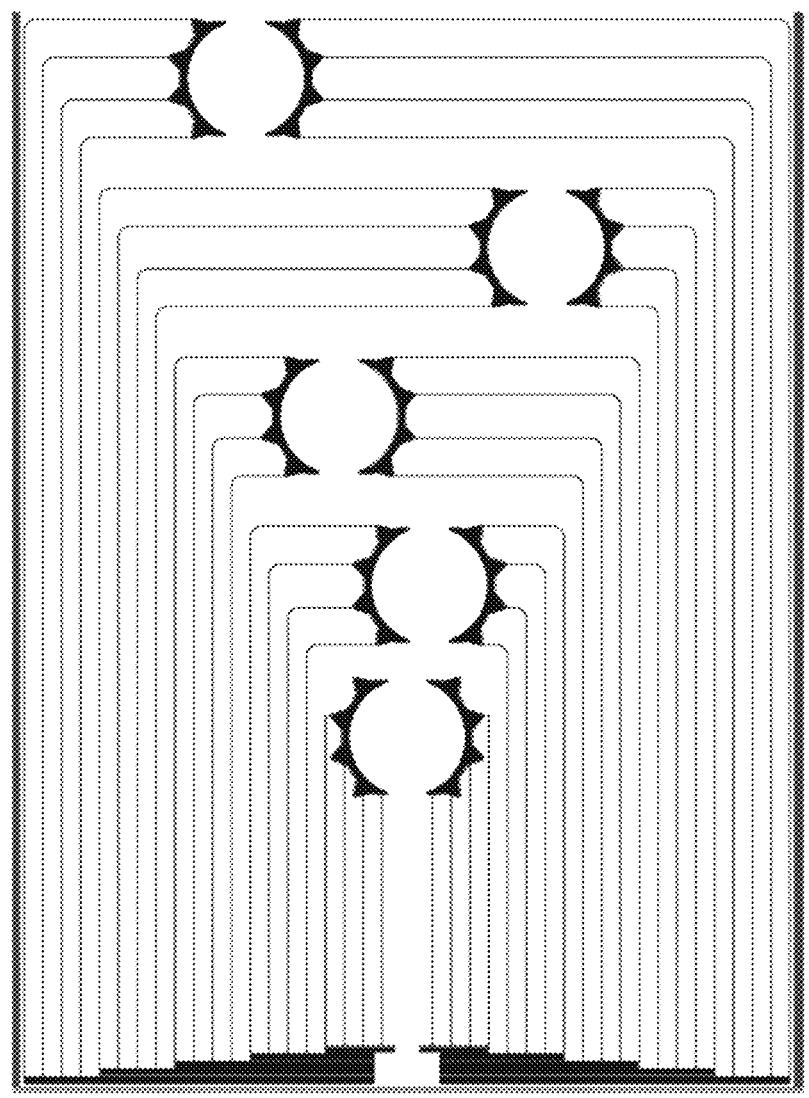

FIGS. 19-28 illustrate exemplary target region and lead line configurations that may be implemented according to preference. FIGS. 19 and 20 illustrate exemplary target regions configured in a vertical design, where the lead lines may extend from each target region toward the electrical bus. FIG. 20 in particular illustrates how multiple lead lines may be joined to decrease the amount of area on the target sheet that is covered by lead lines, thereby decreasing the probability of a projectile severing a lead line when it misses the target region, as compared to the design in FIG. 19.

FIGS. 21-26 also illustrate exemplary targets with different target region and lead line configurations that produce redundancy and robustness in the event that a projectile severs a lead line in a scenario where the projectile misses a target region.

Figure 27:
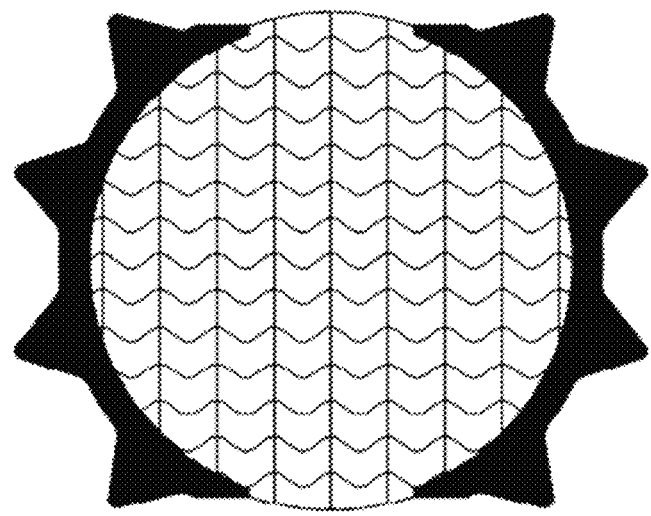
Figure 28:
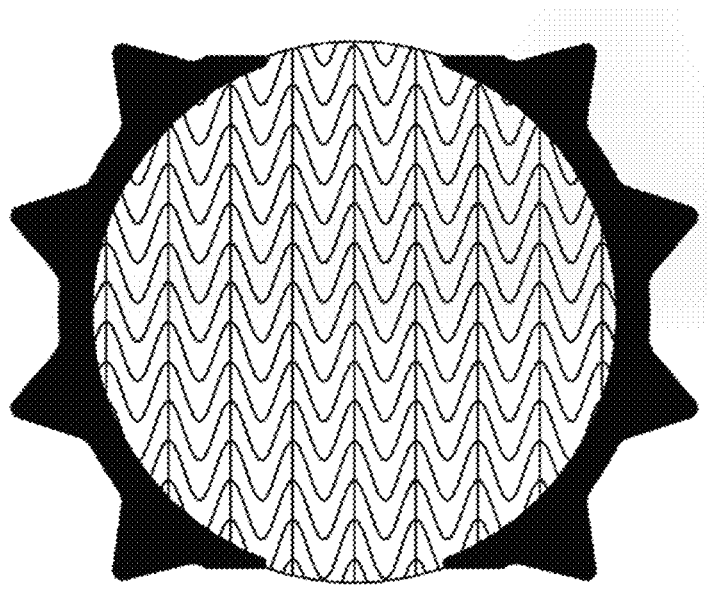

Similarly, FIGS. 27 and 28 illustrate exemplary target regions with different various designs that enable a user to shoot the target region multiple times because of redundant conductive lines running through the target region. Furthermore, the target regions may also include wider conductive lines that taper off into multiple points to connect to lead lines that serve as a buffer zone, which is described in more detail below. In such an exemplary manner, if a projectile were to strike the buffer zone, the buffer zone may be robust enough to stay intact and continue to register when projectiles hit the target regions.

Resistance Varies Between Target Regions and Leads

In exemplary targets, each circuit may be associated with each target region having a resistance that differs from a resistance of the lead lines associated with the target region. This may enable differentiation of target region hits from lead line hits.

An exemplary target may include a substrate, lead lines, an electrical bus and a plurality of target regions. When a user shoots the target, the user might hit the target regions, but the user might also miss them. By doing so, the projectile might go through a blank area of the substrate, and it might also sever one or more lead lines. The system may need to distinguish between a "hit" and a "miss" in order to provide the user with the correct feedback.

In order to do so, the target regions and the lead lines may be configured so that these events, hits and misses, may produce significantly different changes in resistance so that the circuitry may measure these different readings.

One alternative to do this may be to increase the resistance of the lead lines to a significantly higher level than that of the target regions, making every damage to the lead lines to produce a significantly higher resistance change compared to that of a damage to the target region.

Another alternative may be to decrease the resistance of the lead lines to a significantly lower level than that of the target regions, making every damage to the lead lines to produce a significantly smaller resistance change compared to that of a damage to the target region.

Both alternatives may be achieved using a few techniques, such as changing the resistance by changing the geometry of the deposited trace. For example, a 20 cm line with a width of 300 µm and a height of 5 µm may have double the resistance of a 20 cm line with a width of 300 µm and a height of 10 µm. Similarly, a 20 cm line with a width of 300 µm and a height of 5 µm may have 1.5 the resistance of a 20 cm line with a width of 450 µm and a height of 5 µm. By changing any of the 3D characteristics of the deposited trace, the resistance can be controlled and thus may make the lead line resistance higher or lower than that of the target region. Controlling these 3D characteristics may be dependent on the deposition technique, but can include different instructions to the printing nozzles (to discharge larger quantities of ink), to control the printing speed (and thus causing more ink to be deposited onto a given area), and printing multiple passes over the same area (causing a build-up of conductive material).

Figure 29:
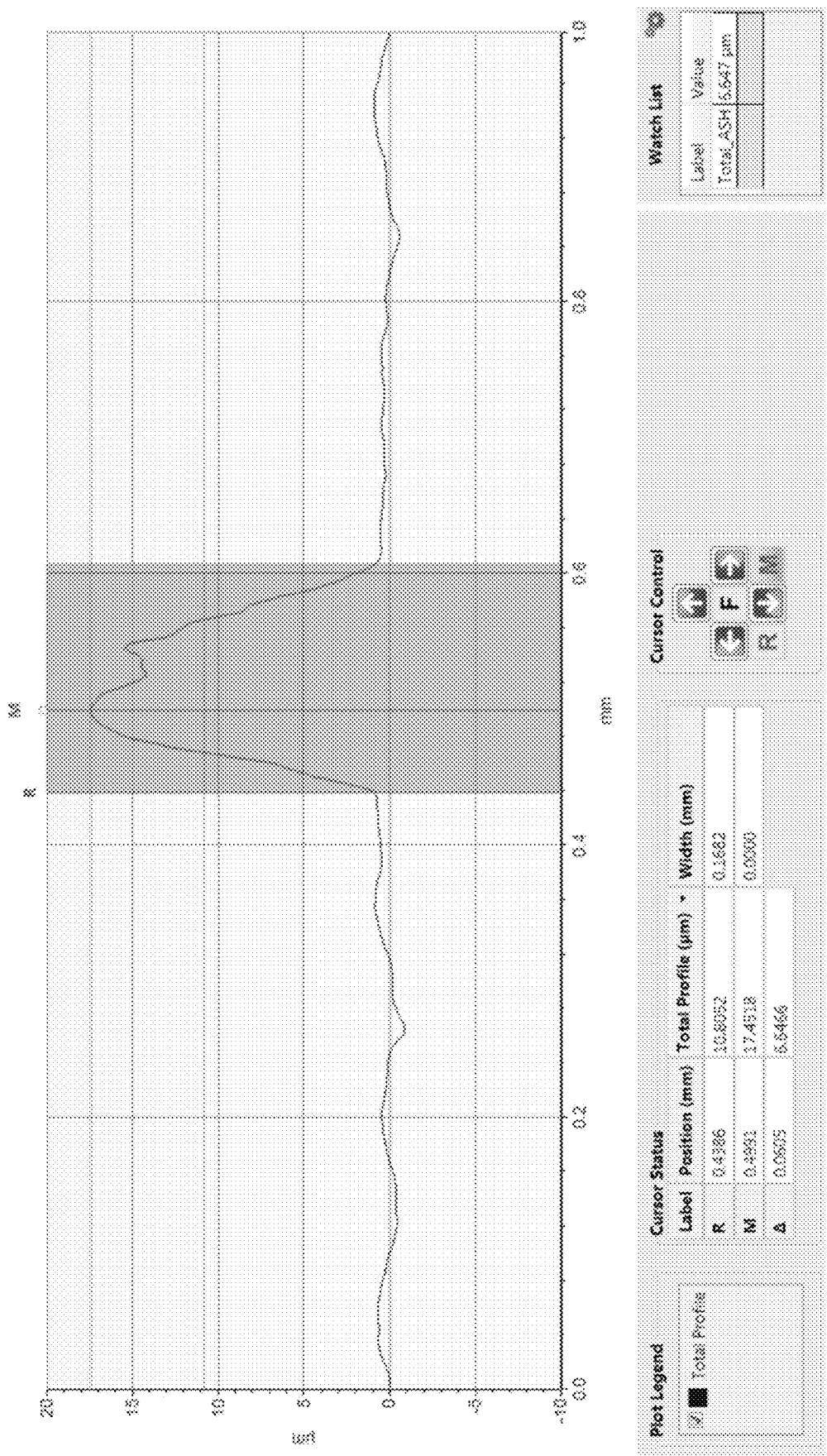
FIGS. 29 and 30 illustrate example geometric scans of a printed line profiles of various widths, consistent with the disclosed embodiments.
Figure 30:
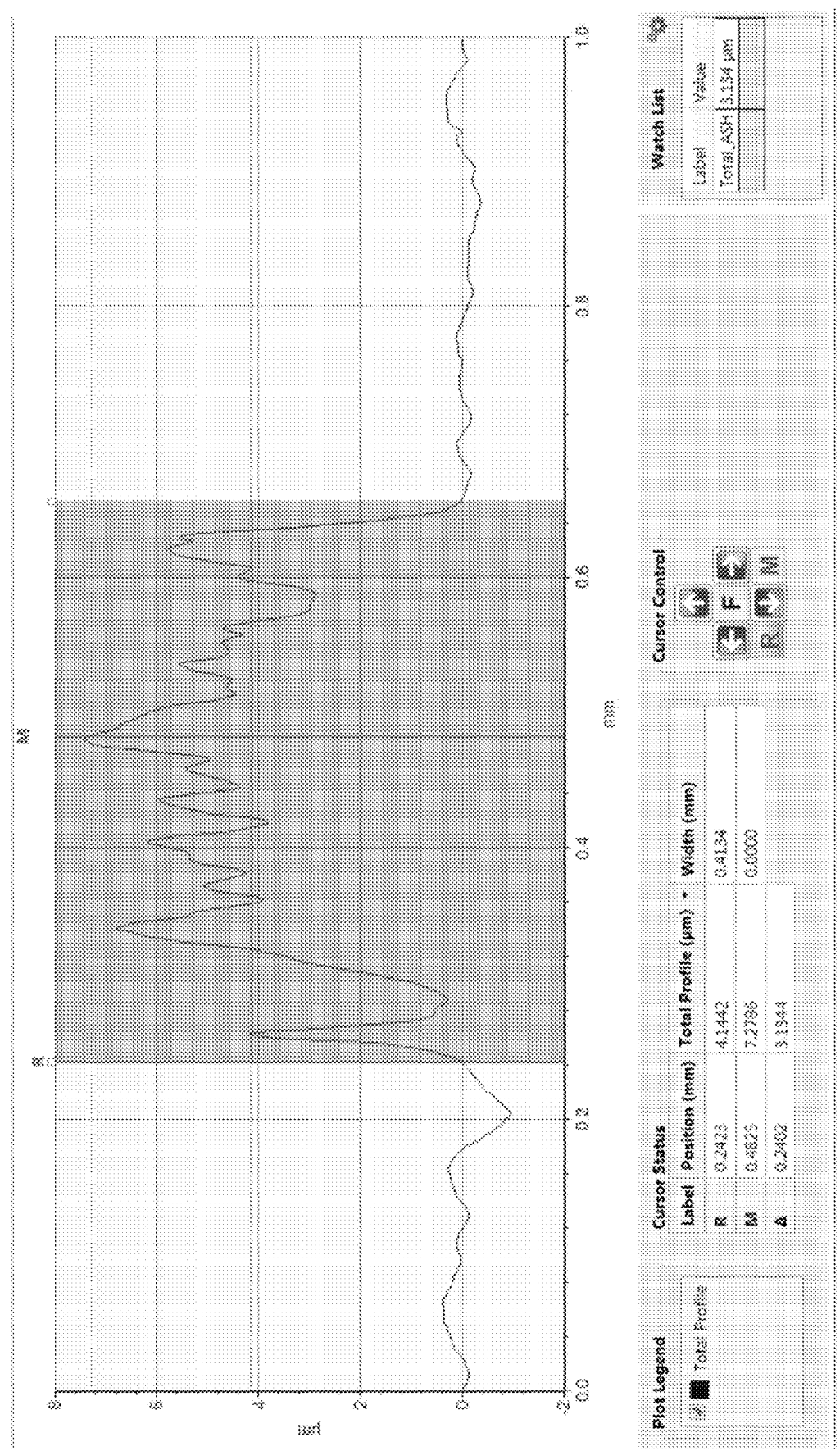

For example, FIG. 29 illustrates an example geometric scan of a printed line profile with a width of 0.2 mm and a height of 17 µm. FIG. 30 illustrates a geometric scan of an alternative line with a width of 0.4 mm and a height of substantially 6 µm. By altering these 3D characteristics, the electrical conductivity and resistance of the lines may be altered accordingly.

Another technique may be to use different conductive materials with different resistivity. These may be conductive ink or other materials that can be deposited on the substrate in techniques other than printing (such as etching).

For example, platinum, silver and gold have a higher conductivity (and lower resistivity) than copper, graphine and graphite. It is also possible to mix any combination of these materials to get more granular control over the resistance of the final material deposited on the substrate.

Circuit Detects Difference Between Lead Line and Target Hits

This concept is directed to the electronics that enable an exemplary target that may detect a difference between a target hit and severance of a lead line by detecting two different electrical signals. In this way, a miss that severs a lead line is not counted as a hit.

The circuitry may measure the attached target in a certain interval, monitoring any of its electrical characteristics, and may analyze them to detect changes.

It may filter any noises that might stem from external or internal interference and may leave only signals that are significant enough to represent any real change in the target. When such change is detected, its size may be evaluated. Due to the configuration of the lead lines and the target regions, the changes resulting of hits in a target region may be significantly different than a hit of a lead line (it can be higher or lower).

By analyzing the size of the changes, the processor can deduce what part of the target has been hit. Based on that information, the processor might give the user different feedback, based on the target area being hit.

As described above, FIG. 14 illustrates an exemplary algorithm that may be implemented for analyzing resistance changes and deducing the type of hit.

Software Limits Shots Based on Number of Circuitry Hits

Exemplary software of the invention may be capable of variably disabling the target based on an amount of destruction to the target, as opposed to simply an absolute number of hits. Thus, for example, if too many lead lines are hit, the target may be disabled, despite a relatively low number of shots actually hitting target regions. This feature may be important because the destruction of lead lines can disable target regions, making the counting of shots unreliable. In the exemplary target, the target may remain reliable because it may be disabled when it reaches an unreliable state.

Although the target may be configured to have redundant lead lines and to have target regions that can detect multiple projectile hits, in some situations, any target region can get to an unusable state. This can happen, for example, if all the lead lines connecting any of its sides to the bus have been severed. It can also happen if the target region has absorbed so many projectile hits that a subsequent projectile hit might pass through the target region without damaging any of its resistors, thus being completely un-detectable.

In order not to get any of these states, the software may keep track of the status of each of the target regions. Based on analyzing the reports coming from the circuitry, the software may count the number of hits both in each target region, and in each region's lead line. These counters may constantly compare a threshold, and when the counter exceeds the threshold, that region may become disabled, providing the user with a clear feedback. From that point on, any subsequent hits to this region's hit area or leads lines may be ignored by the software.

Caliber-Based Lead Line Spacing

In exemplary targets, conductive lead lines may be spaced from each other by a distance greater than a caliber of projectile for which the target was designed. This may ensure that a single shot will not destroy more than a single lead line, increasing the reliability and robustness of the product. To this end, the targets may be labeled or packaged with an indication of a caliber of projectile with which the targets are intended to be used.

In order to provide redundancy and reliability to the target, each region may be connected to multiple lead lines. When the user misses the target region, the projectile may go through the substrate and have a potential of severing lead lines connected to either that or another target region.

The dimensions of the hole the projectile leaves in the substrate can be considerably larger than the caliber of the projectile. When the projectile passes through the substrate, some miniature tears in the substrate might be formed, and the radius of these tears can exceed the projectile caliber.

The larger the spacing between the lead lines, the lower the chances of a single projective severing more than one lead line. However, increasing the spacing may also mean that in a given sheet width, fewer lead lines can fit, which may reduce the target redundancy. So the optimal configuration may balance between these two factors when deciding on the spacing of the lead lines.

Target Regions Formed of a Matrix of Resistors

An exemplary target configuration may include a plurality of resistors that may be arranged in parallel in groups and/or the groups may be arranged in series. The target region may be defined as a matrix of conductive traces, acting as parallel resistors, organized so that any projectile hitting the matrix would generate a change of its resistance. This change may be significant enough to be detected by a connected circuitry. The matrix may also be able to sustain multiple projectile hits without losing its detection capabilities.

The sensitivity of the target region may be derived from its resistance—the higher the resistance, the higher the sensitivity, since every projectile hit may cause a more significant change in the resistance. For that reason, a trace with high resistance level may be used, and as little as possible traces may be deposited (since these traces are acting as parallel resistors). On the other hand, the durability of the target region may be derived from the number of available traces in the matrix the more traces there are, higher the durability will be.

A possible balance between the two may be to use relatively high number of traces (high durability, low sensitivity) and deposit the traces in a non-straight manner (for example, wavy pattern) in order to increase its length and as a result, its resistance. This may increase the overall sensitivity of the region.

Figure 31:
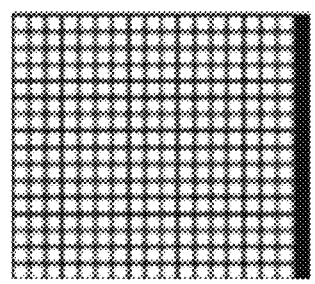
FIGS. 31-33 illustrate exemplary embodiments of possible target region matrix arrangements that may be implemented, consistent with the disclosed embodiments.
Figure 32:
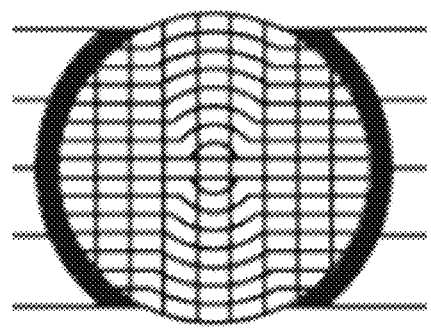
Figure 33:
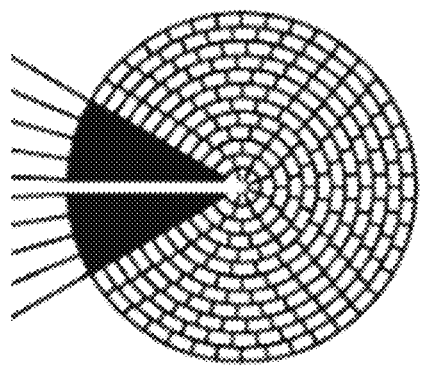

FIGS. 31-33 illustrate exemplary embodiments of possible target region matrix arrangements that may be implemented.

Buffer Zone Interconnects Target Region and Lead Lines

In order to minimize risk that a hit on a periphery of a target region disables an associated lead line, an exemplary embodiment may include conductive buffer zones at the periphery of its target regions to provide a standoff distance for lead connection. In this way, if a projectile strikes the periphery of a target region in a vicinity of a lead line connection, portions of the more robust buffer zone may be destroyed and may preserve electrical connection of the lead line to the target zone through non-destroyed portions of the buffer zone.

When using a conductive target that may include a target region and lead lines, a projectile may hit inside the hit zone, close to the periphery of the target region (for example, 80%), and might sever the lead line. The attached circuitry may detect that damage to the lead line, which may generate a feedback about a lead line being severed, while the user expects a feedback about a region hit.

In order to avoid that, the design may allow extra redundancy to the periphery of the target region. One way to achieve that can be to change the shape of the target region, compared to the printed graphics target zone, so that even hits in the periphery of the graphics target zone may sever only the target region and not the lead line. Furthermore, if the projectile hits the buffer zone, an exemplary embodiment may either register this as either a hit or a miss, according to designer's preference. For example, FIGS. 27 and 28 illustrate exemplary buffer zones surrounding the periphery of target regions with different matrix designs. While the buffer regions are indicated with bold solid lines, they may also be formed of a matrix of narrower lines.

Smart Target Formed by Dual Sided Printing

Exemplary smart targets may be relatively inexpensive to manufacture because they can be printed on a single sheet, with electrical circuitry printed on the backside and graphical images printed on the frontside.

Figure 34:
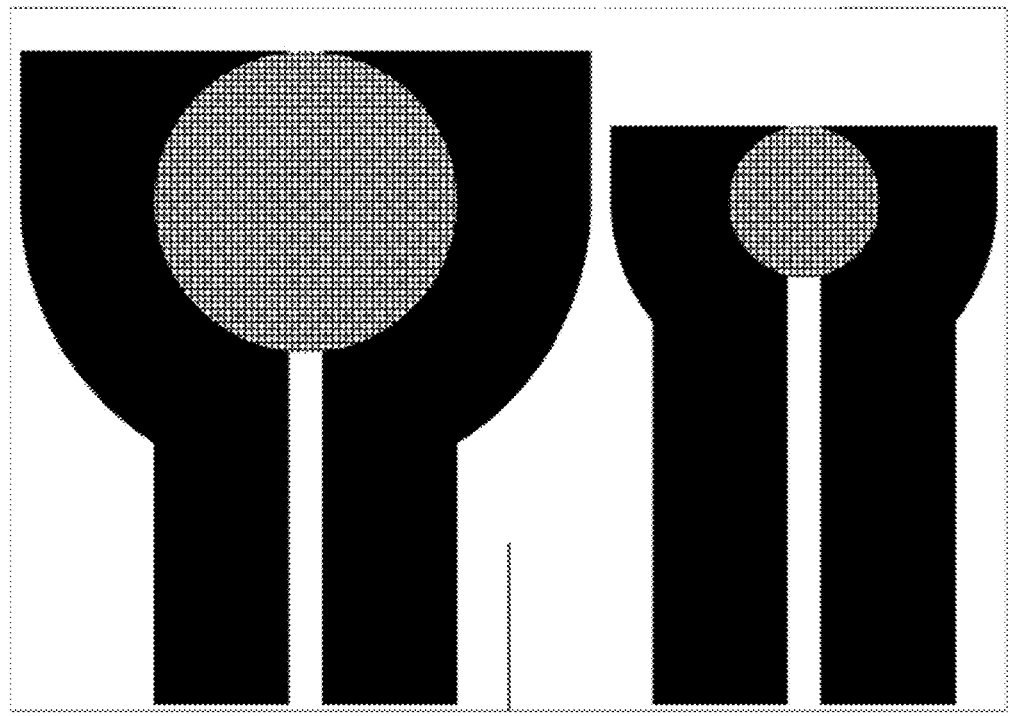
FIG. 34 illustrates a rear view an example target with conductive ink printed on the back, consistent with the disclosed embodiments.
Figure 35:
FIG. 35 illustrates a front view of the example target of FIG. 34, having a graphic image featured on the front side, consistent with the disclosed embodiments.

Instead of allowing the user to shoot on the conductive ink face directly, exemplary targets may feature a graphic image on the opposite side, which is registered to the conductive face but horizontally flipped. For example. FIG. 34 illustrates an example side of a smart target with conductive ink printed on the back from a front perspective. The conductive ink may be printed on either the front of back side of the smart target. FIG. 35 illustrates an example graphic image that may be featured on the front side from a front perspective. The combination of FIGS. 34 and 35 illustrate an example embodiment with dual sided printing of the electrical circuitry on the backside and the graphical image printed on the frontside.

Figure 36:
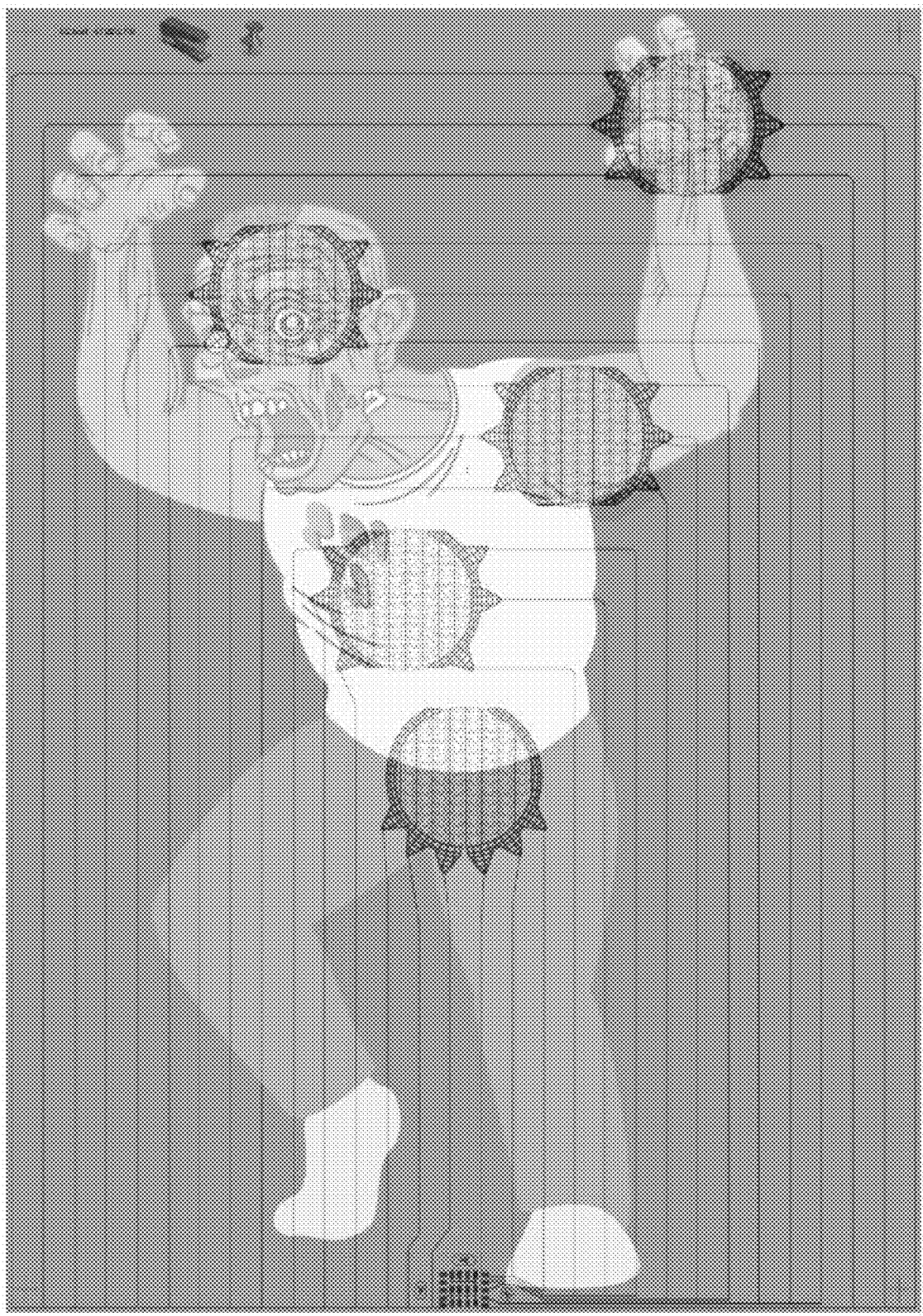
FIGS. 36 and 37 illustrate example targets with conductive ink printed on the back side and a graphical image of a zombie printed on the front, consistent with the disclosed embodiments.
Figure 37:
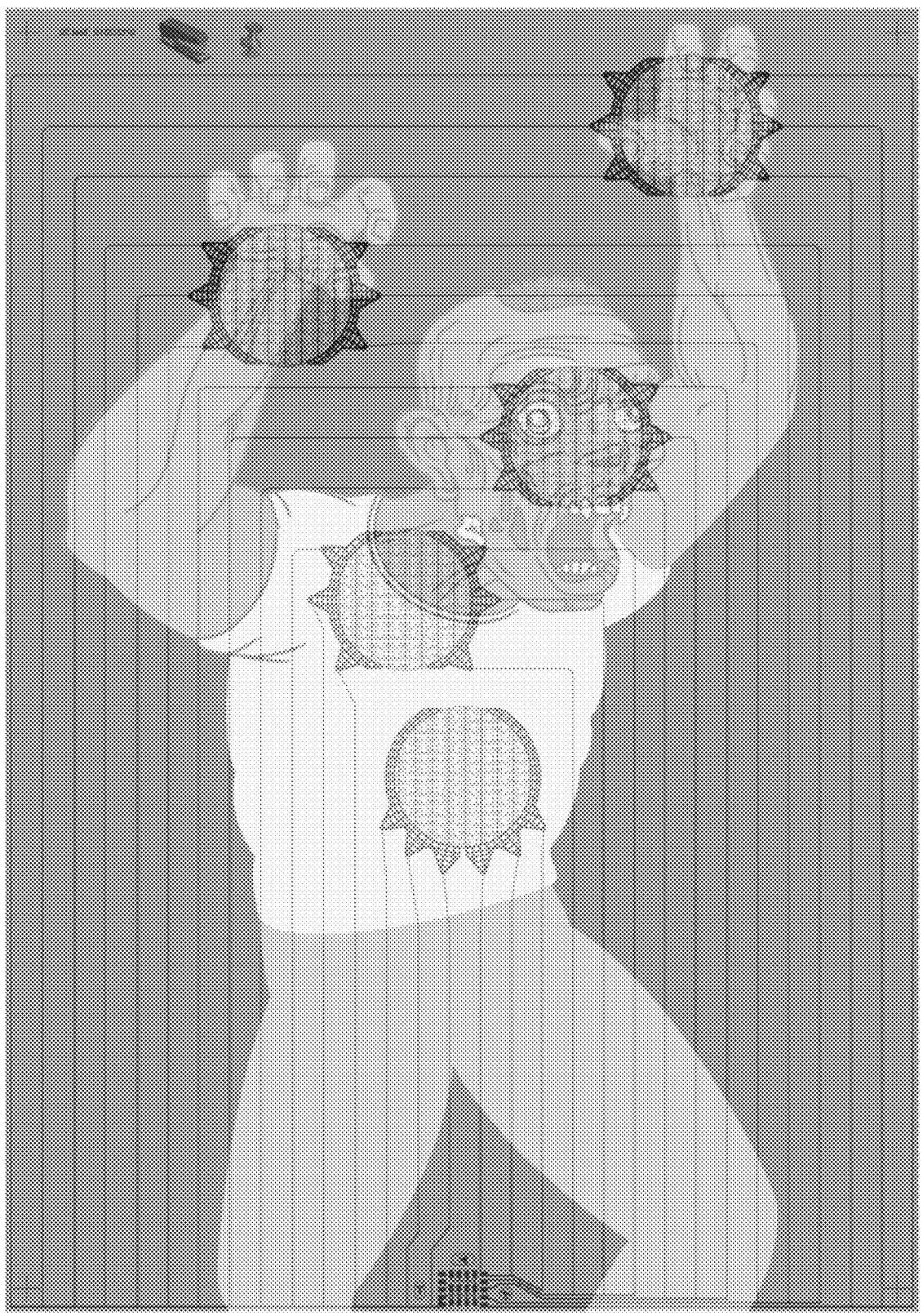

FIGS. 36 and 37 illustrate another exemplary embodiment. FIGS. 36 and 37 both illustrate a see through perspective of the target sheet, with the conductive ink printed on the back side, and the graphical image of a zombie printed on the front. By rearranging the graphical image on the front, a target designer may choose differing images on the front side, without altering circuitry on the back side. In other words, the same circuitry design can be used with multiple graphical images.

Zones May be Independently Disabled

Exemplary targets may have multiple, independent target regions for which associated shots can be separately counted. Sometimes, either because lead lines have been severed, or a region has sustained a level of damage beyond a threshold, the system may no longer be able to reliably count shots in a particular region, despite that other regions remain viable. In such situations, an indication may be sent to the shooter's cell phone (or to another interface) that subsequent shots in a particular region may no longer be counted. This may extend the useful life of the target.

Exemplary targets may be comprised of multiple target regions, each of which may be connected separately to the circuitry, sending signals about hits either to the target region or to the lead lines. These signals may be transmitted by the connected circuitry to the remote mobile device (for example, phone, tablet, computer or AR glasses).

The processor on the mobile device (or elsewhere) may analyze these signals and may determine whether the hit was to the hit zone or to the leg, and may count the number of hits. When the counter goes above a certain threshold (which can be different per zone, per target type), or when the circuitry sends a special signal the represents an area reaching an unusable state, the processor may provide a clear feedback to the user, enabling showing the user exactly which target region is disabled, allowing the user to keep using the system and focus their attention on any of the other usable target regions.

Figure 38:
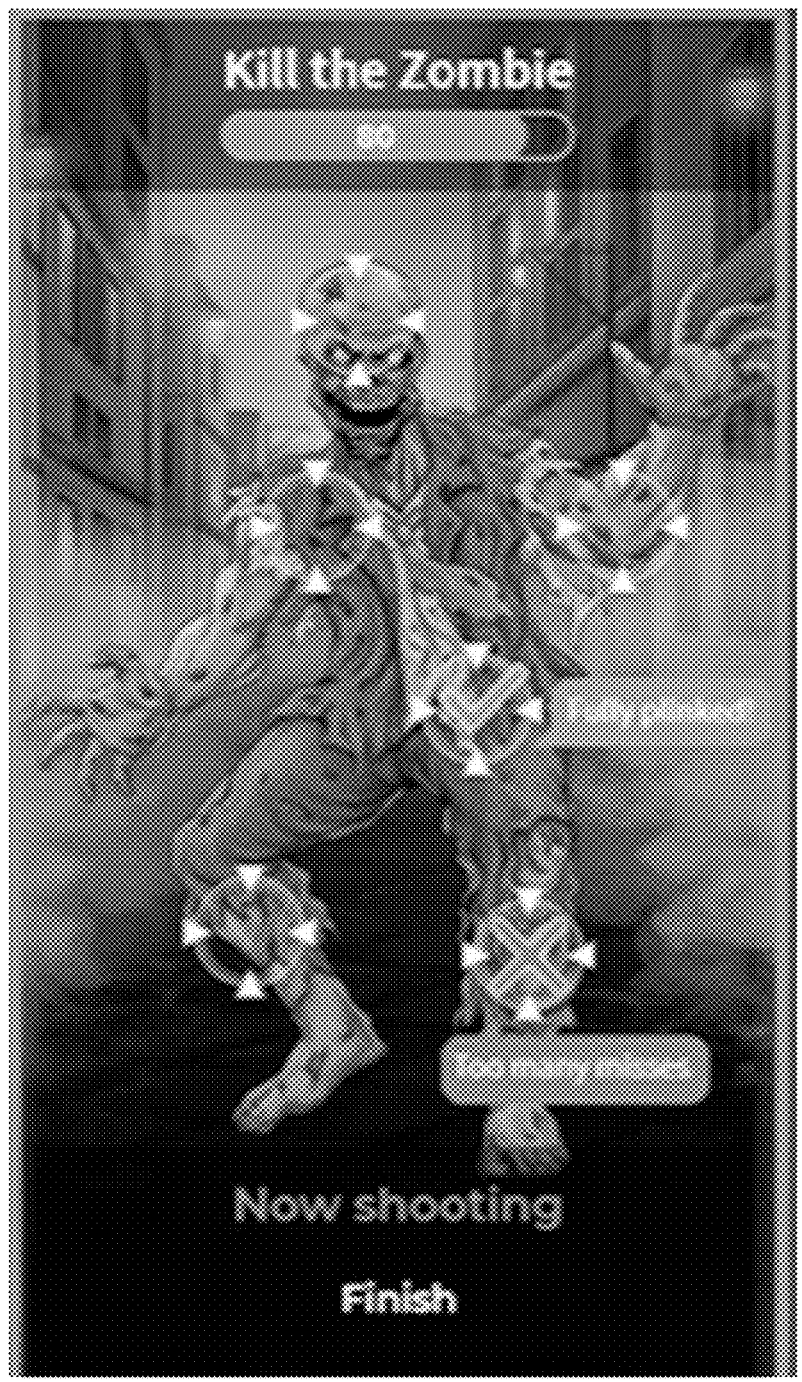
FIG. 38 illustrates an exemplary interface for providing feedback to a user, consistent with the disclosed embodiments.

The feedback may be positive, in the sense that the user has managed to hit the zone the required number of times, and it might be negative in the sense that the user has missed the target region multiple times (severing the lead lines in the process), and therefore leading that target region to an unusable state. FIG. 38 illustrates an exemplary embodiment that demonstrates both feedback types.

Target Clip Provides Prior Usage Check

In an exemplary system, the electric circuitry may be attached to the target which may perform a prior usage check to ensure, at a minimum, that the target has not sustained a threshold level of damage. This functionality may alternatively be performed, in whole or in part, by a mobile device, paired to circuitry in the clip. The pair may occur wirelessly. Such electric circuitry may include circuitry in a mobile device. Such a mobile device may clip onto a target and may perform a prior user check in this way.

For each target region in each target type, the system may hold a factory value for the digital representation of the resistance of that target region. Every change to the target region, either to the target region itself or to a lead line, may be reflected by a change in the target region's resistance, which may be measured by the digital representation and may be transmitted from the circuitry to a mobile device.

Upon a connection of a conductive target to the circuitry, a signal may be sent to the mobile device notifying it about the connection. The mobile device then may send a signal to the circuitry, instructing it to measure all the target regions of the conductive target. The circuitry may perform this measurement and may send the digital values back to the mobile device, where each of the digital values may be compared to the factory value, allowing a pre-defined tolerance (for example +−10%).

If any of the digital values breaches the tolerance range of the factory value, this region may be deemed as used and/or damaged, and a blocking feedback may be presented to the user, instructing them to replace the conductive target with a new one.

As described above, FIG. 13 illustrates an example embodiment of an architecture 80 for the target clip's circuitry that may be used in connection with a mobile device and may perform the measurement on the target 60. The architecture 80 may include an amplifier 86 that receives an input from the electrical bus of the target 60 and a current source 82. A first digital potentiometer 84 may serve as a voltage reference measurement in comparison to the voltage measurement from a second digital potentiometer 88 that measures the voltage output from amplifier 86 at the analog to digital convertor 40. Based on this comparison, the output reading from the digital potentiometers 84 and 88 may then be transmitted through transmitter 42 to a second device. This transmitter 42 may also contain a receiver and may be configured to use any transmitting means such as radio waves and Bluetooth signals. The transmitter 42 may be configured to transmit the voltage differential reading between the first digital potentiometer 84 and the second digital potentiometer 88 that may be interpreted by the second device for certain readings that represent hits and/or misses of the target regions.

Target Type Automatically Detected by Connected Clip

There may be many different target types, all that may be sharing a common bus configuration. Since games and competitions may have varying rules and scoring criteria that depend on the target type, it may be important for the target type to be identified before shooting at a particular target begins. One way to identify a target type may be for a user to manually enter or scan a code. However, it may be possible for automatic target type detection based on information electronically encoded into the target that may be detected by the clip. As described above, FIG. 5 illustrates an exemplary embodiment of the clip, that may be connected to an exemplary embodiment of a target as shown in FIG. 3.

In addition to the conductive target bus offering contactors to measure each of the target regions, it may also include a printed encoding system, which may enable the circuitry attached to the target to be probed, enable the circuitry to decode the printed code, and also enable the circuitry to detect the target type. An exemplary embodiment of the bus is illustrated in FIG. 4. FIG. 16 illustrates another embodiment of the bus in close detail 290 showing contactors 268A-E. The signal from the target regions 262A-E may be transferred to lead lines 264A-E, traveling towards the electrical bus 265 through the lead lines 266A-E to the contactors 268A-E. The contactors 268A-E alternatively may be configured into a single contactor 270.

The bus may contain any number of contact slots. For example, the bus may contain 11 contact slots, each of which can be either grounded (connected to ground) or cleared. Each target type may have a different arrangement of these slots, so that for example, one target type arrangement may be {Ground, Clear, Clear, Clear, Clear, Clear, Clear, Clear, Clear, Clear, Clear}, and a another target type arrangement might be {Ground, Ground, Clear, Clear, Clear, Clear, Clear, Clear, Clear, Clear, Clear}.

The attached circuitry may read these slots as data bits, where a grounded slot can be read as 1 and a clear slot can be read as 0, or vice versa.

By reading the probing result in above manner, the circuitry may calculate a number ranging between 0-2047 (2 to power of 11) and may transmit this number as a signal to the mobile application. This number may denote the target type.

The mobile application may then query a remote server for this target type, and may fetch data relating to this specific target type, including the target graphics and may show to the user via the mobile application, game rules, game scoring scheme and more.

This method may be completely automatic and does not necessarily require the user to type/scan or otherwise explicitly tell the mobile application what kind of target is being attached to the circuitry.

Interactive Cell Phone App Guides Shots

In an exemplary embodiment of the system, a shooter's mobile communications device can be used to involve the shooter in challenges and games. For example, the shooter's cell phone or smart glasses may provide visual and/or audio commands of where to shoot. This gamification of the shooting range has the ability to take the sport to a new level.

Lead Line Arrangement for Five Separate Target Regions

Due to size limitations of standard targets, the maximum number of independent conductive target regions that can be incorporated into a target may be live, and this may only happen if the lead lines for one of the target regions extend from an edge of the target region facing the bus, while the remainder of the lead lines extend from edges of target regions that do not face the bus. This geometry may be necessary to maximize the functionality of a conductive target.

For a target sheet containing X1 number of target regions. X2 number of lead lines per target regions. X3 amount of space between each lead line and a maximum sheet width of X4 cm, different target sheets may be designed according to these parameters to contain at least one target region to maximize the number of target regions on the target sheet.

A conductive target may be configured to have a substrate, an electrical bus on the substrate, and external circuitry where one or more target regions are interconnecting with the bus through a plurality of supply lead lines and a plurality of return lead lines. The spacing between each lead line may be larger than a particular projectile's caliber to avoid any single projectile from severing a lead line if the projectile strikes the target in a region other than a target region. The lead lines for each target region of the plurality of target regions may generally approach from a side facing the electrical bus and/or may generally approach from a direction other than from a direction of the bus and any number of combinations of general approach directions. As used herein, the term "generally approach" refers to the overall direction from which the lead line extends from the target, regardless of whether the direction changes within a few inches of the target region. Depending on the target regions and their placement on a conductive target, any number of combinations and orientations of the plurality of lead lines may be implemented to fit the desired number of target regions on the conductive target.

In an exemplary embodiment with five conductive target regions, each conductive target region may have a plurality of lead lines associated with them. A first target region of the plurality of target regions may have its lead lines approach the first target region from a side facing the electrical bus while the remaining target regions may have lead lines that approach each respective target region from directions other than from a direction of the electrical bus.

Disclosed embodiments may include any one of the following bullet-pointed features alone or in combination with one or more other bullet-pointed features, whether implemented as an apparatus, method, by at least one processor, and/or stored as executable instructions on non-transitory computer-readable media;

- A conductive target
- a substrate
- an electrical interface on the substrate, the electrical interface being configured for selective electrical connection to external circuitry
- at least one target zone on the substrate, the at least one target zone being defined by a plurality of electrically-conductive circuit traces and being configured to enable detection of a projectile hit that disconnects at least one of plurality of the electrically-conductive circuit traces
- a plurality of spaced-apart conductive lead lines on the substrate, the plurality of lead lines electrically interconnecting the interface with the at least one target zone, wherein the plurality of conductive lead lines are redundantly connected to the at least one target zone in a manner enabling detection of a target hit on a particular target zone after one of the conductive lead lines associated with the particular target zone is completely severed by a projectile
- wherein the substrate includes at least one layer of paper or plastic
- wherein the target is configured for attachment via at least one connector or clip to the interface, to thereby enable the external circuitry to detect the severance of the electrically conductive circuit traces
- wherein the at least one target zone includes a plurality of target zones, and wherein each of the plurality of target zones are associated with a first set of conductive supply lead lines and a second set of conductive return lead lines
- wherein the plurality of spaced apart conductive lead lines includes at least four conductive lead lines associated with a single target zone
- wherein a first pair of conductive lead lines serve as supply leads and a second pair of conductive lead lines serve as return leads
- wherein the plurality of spaced apart conductive lead lines include at least three supply lead lines and at least three return lead lines connected to a common target zone
- wherein the at least one target zone includes at least two target zones, and wherein each of the at least two target zones are supplied by redundant supply leads
- wherein the at least one target zone includes at least two target zones, and wherein each of the two target zones are supplied by redundant return leads
- wherein the at least one target zone includes at least two target zones, and each of the two target zones are supplied by redundant supply leads and redundant return leads
- wherein a width of each of the plurality of lead lines is between 100 μm and 500 μm
- wherein the at least one target zone is configured such that an electrical signal emanating therefrom will change in response to severance of a portion of the conductive target pathways, regardless of a material composition of a projectile causing the severance
- wherein the at least one target zone is configured such that a non-metal trajectory is capable of causing the change.

wherein a spacing between adjacent lead lines is greater than 12.7 mm wherein a spacing between adjacent lead lines is between 10 mm and 13 mm wherein the conductive lead lines and the electrically-conductive circuit traces are printed on the substrate with conductive ink where at least some of the plurality of target zones are offset from each other both horizontally and vertically wherein the first set of conductive lead lines associated with each of the target zones and the second set of conductive lead lines associated with each of the target zones converge at the interface to thereby enable the plurality of lead lines to make electrical connection with external circuitry connected to the interface wherein the lead lines and the electrically conductive circuit traces of the target zones differ in conductivity wherein at least one of the plurality of target zones have associated lead lines that approach from beneath the target zone, and a plurality of target zones have associated leads that approach from lateral sides of the target zone wherein each target zone includes a plurality of wavy traces an electrical interface on the substrate, the electrical interface being configured for selective electrical connection to external circuitry at least one target zone on the substrate, the target zone being defined by a plurality of electrically-conductive circuit traces and being configured to exhibit a first change in an electrical property as the result of a target zone hit by a projectile a plurality of spaced-apart conductive lead lines on the substrate, electrically interconnecting the interface with the at least one target zone wherein the plurality of conductive lead lines are configured to exhibit a second change in the electrical property, different from the first change in the electrical property, as the result of a lead line projectile hit, to thereby enable the external circuitry to differentiate a target zone projectile hit from a lead line projectile hit wherein the first change in an electrical property and the second change in an electrical property include at least one of a change in resistance or a change in conductivity wherein portions of the at least one target zone are printed with a first conductive ink with a first conductivity wherein portions of the plurality of lead lines are printed with a second conductive ink having a second conductivity, and wherein the first conductivity differs from the second conductivity wherein the second conductivity is greater than the first conductivity wherein the first conductive ink includes one or more materials selected from a group consisting of: platinum, silver, gold, copper, an alloy comprising silver and carbon, an alloy including silver and chlorine, an alloy including silver and nickel, graphene, graphite, and carbon having an allotrope different than graphene or graphite wherein the second conductive ink includes one or more materials selected from a group consisting of platinum, silver, gold, copper, an alloy comprising silver and carbon, an alloy including silver and chlorine, an alloy including silver and nickel, graphene, graphite, and carbon having an allotrope different than graphene or graphite wherein the first conductive ink comprises one or more materials selected from a group consisting of: platinum, graphene, graphite, and carbon having an allotrope different than graphene or graphite, and wherein the second conductive ink includes one or more materials selected from a group consisting of: platinum, silver, gold, copper, an alloy including silver and carbon, an alloy including silver and chlorine, an alloy including silver and nickel wherein portions of the at least one target zone are formed of first electrical pathways exhibiting a first conductivity, and wherein portions of the plurality of lead lines are formed of second electrical pathways exhibiting second conductivity different from the first conductivity wherein the first change in electrical resistance is at least double the second change in electrical resistance wherein the target zone has a first geometry that enables the target zone to exhibit the first change in electrical resistance, and wherein the plurality of lead lines have a second geometry that enables the plurality of lead lines to exhibit the second change in electrical resistance.

wherein the first geometry includes a pattern of interconnected traces and the second geometry includes non-overlapping pathways wherein differences between the first change in the electrical property and the second change in the electrical property are manifest as the result of differences in both geometry and conductivity.

wherein the plurality of electrically-conductive circuit traces of each target zone include wavy traces wherein the plurality of electrically-conductive circuit traces of each target zone include linear traces overlapping the wavy traces wherein a width of each of the plurality of lead lines is between 100 μm and 500 μm wherein each of the plurality of target zones includes at a periphery thereof an interface pattern.

wherein the interface pattern includes a grid wherein the interface pattern includes a series of spaced-apart spikes, and wherein each of the plurality of lead lines are electrically connect to a respective target zone through a tip of each spike of the interface pattern Circuitry for use in connection with a conductive target having an interface, at least one conductive target zone and a plurality of conductive lead lines electrically connecting the interface to the at least one conductive target zone at least one processor configured to detect via the interface, a first electrical signal representing severance of a portion of the al least one conductive target zone by a projectile hi within the at least one conductive target zone at least one processor configured to detect via the interface a second electrical signal, different from the first electrical signal, wherein the second electrical signal represents severance of one of the plurality of lead lines by a projectile hit on the one of the plurality of lead lines at least one processor configured to trigger an indicator of a target hit in response to the first electrical signal at least one processor configured to prevent triggering of the target hit indicator in response to the second electrical signal wherein the first electrical signal is a first resistance and the second electrical signal is a second resistance, different from the first resistance, and wherein the at least one processor is configured to distinguish between the first resistance and the second resistance a wireless transmitter and wherein the at least one processor is configured to cause the indicator to be transmitted, via the wireless transmitter, to a mobile communications device wherein the indicator is configured to cause, on a display of the mobile communications device, an indication of the target hit.

wherein the indication of the target hit includes a display of alphanumeric characters.

wherein the indication of the target hit includes a graphical presentation of at least one of an image or animation wherein the indication of the target hit includes an update to a counter presented on the display.

wherein the indicator is configured to cause on the mobile communications device an audible signal indicating the target hit a display device and wherein the at least one processor is configured to cause an indication of the target hit to be displayed on the display device wherein the display device comprises an indicator light wherein the at least one processor is configured to record in a memory location an indication of the second signal wherein the memory location includes memory of a mobile communications device wherein the memory location includes a remote server at least one processor is configured to detect a plurality first electrical signals representing severance of portions of the at least one conductive target zone and a plurality of second electrical signals representing severance of one of the plurality of lead lines.

wherein each of the first electrical signals and second electrical signals include a resistance, and wherein the at least one processor is configured to track a cumulative resistance change from the first electrical signals and the second electrical signals at least one processor is configured to prevent triggering of the target hit indicator based on the cumulative resistance change wherein preventing triggering of the target hit indicator based on the cumulative resistance change includes comparing the cumulative resistance change to a predetermined threshold wherein the first electrical signal is a first change in conductivity and the second electrical signal is a second change in conductivity, different from the first change in conductivity, and wherein the at least one processor is configured to distinguish between the first change in conductivity and the second change in conductivity.

wherein preventing triggering of the target hit indicator includes blocking triggering of the target hit indicator wherein preventing triggering of the target hit indicator includes ignoring the second signal a method for use in connection with a conductive target having an interface, at least one conductive target zone and a plurality of conductive lead lines electrically connecting the interface to the at least one conductive target zone detecting via the interface, a first electrical signal representing severance of a portion of the at least one conductive target zone by a projectile hit within the at least one conductive target zone detecting via the interface a second electrical signal, different from the first electrical signal, wherein the second electrical signal represents severance of one of the plurality of lead lines by a projectile hit on the one of the plurality of lead lines triggering an indicator of a target hit in response to the first electrical signal preventing triggering of the target hit indicator in response to the second electrical signal A non-transitory computer readable medium for use in connection with a conductive target having an interface, at least one conductive target zone and a plurality of conductive lead lines electrically connecting the interface to the at least one conductive target zone, the computer readable medium containing instructions that when executed by at least one processor, cause the at least one processor to perform a method detecting via the interface, a first electrical signal representing severance of a portion of the at least one conductive target zone by a projectile hit within the at least one conductive target zone detecting via the interface a second electrical signal, different from the first electrical signal, wherein the second electrical signal represents severance or one of the plurality of lead lines by a projectile hit on the one of the plurality of lead lines triggering an indicator of a target hit in response to the first electrical signal preventing triggering of the target hit indicator in response to the second electrical signal A non-transitory computer readable medium for regulating use of a conductive target having at least one conductive target zone and a plurality of conductive lead lines electrically connected to the at least one conductive target zone, the computer readable medium containing instructions that when executed by at least one processor, cause the at least one processor to perform a method receiving from circuitry connected to a conductive target, a plurality of discrete first signals, each discrete first signal being indicative of a target zone hit receiving from the circuitry connected to the conductive target, a plurality of discrete second signals, each discrete second signal being indicative of a conductive lead line hit counting the plurality of discrete first signals and discrete second signals comparing the counted discrete first signals and discrete second signals with a prestored threshold rule outputting an exhaustion signal indicating that the conductive target is spent when the prestored threshold rule is violated by at least one of the counted first discrete signals or the counted second discrete signals wherein the threshold rule is configured such that when a counted number of second discrete signals reaches a threshold, the exhaustion signal is outputted regardless of the number of first discrete signals counted receiving, from the circuitry connected to the conductive target, an indicator of a target type and wherein the threshold is determined based on the target type wherein the threshold rule is configured such that when a counted number of first discrete signals reaches a threshold, the exhaustion signal is outputted regardless of the number of second discrete signals counted wherein the threshold rule is configured to cause the exhaustion signal to be outputted when a total number of first discrete signals and second discrete signals reaches a threshold receiving, from the circuitry connected to the conductive target, an indicator of a target type and wherein the threshold is determined based on the target type wherein counting the plurality of discrete first signals includes updating a target-hit counter wherein counting the plurality of discrete first signals includes updating a periphery-hit counter wherein the exhaustion signal is configured to cause on a display of a mobile communications device, an indication that the target is spent wherein the indication that the target is spent includes a display of alphanumeric characters wherein the indication that the target is spent includes a graphical presentation of at least one of an image or animation wherein the indication that the target is spent includes a graphical presentation of at least one of an image or animation wherein the indication that the target is spent includes an audible signal wherein the indication that the target is spent is a game over indication wherein the at least one conductive target zone includes a first conductive target zone and a second conductive target zone, and wherein the plurality of conductive lead lines includes a first plurality of conductive lead lines associated with the first conductive target zone and a second plurality of conductive lead lines associated with the second conductive target zone wherein the threshold rule is configured such that when a counted number of second discrete signals associated with the first plurality of conductive lead lines reaches a threshold, the exhaustion signal is outputted regardless of a counted number of second discrete signals associated with the second plurality of conductive lead lines wherein the threshold rule is configured such that the exhaustion signal is outputted regardless of a counted number of first discrete signals associated with the first conductive target wherein the threshold rule is configured to cause the exhaustion signal to be outputted when a total number of first discrete signals associated with the first target zone and second discrete signals associated with the first plurality of lead lines reaches a threshold wherein the at least one conductive target zone includes a first target zone and at least one second target zone, and wherein the exhaustion signal includes an indication that the first target zone is spent wherein the exhaustion signal is configured to cause on a display on a mobile communications device, an indication that the first target zone is spent wherein the display includes an image including a representation of the conductive target and wherein the indication that the first target zone is spent includes an overlay of an indicator on a region of the image associated with the first target zone A method for regulating use of a conductive target receiving from circuitry connected to a conductive target, a plurality of discrete first signals, each discrete first signal being indicative of a target zone hit receiving from the circuitry connected to the conductive target, a plurality of discrete second signals, each discrete second signal being indicative of a conductive lead line hit counting the plurality of discrete first signals and discrete second signals comparing the counted discrete first signals and discrete second signals with a prestored threshold rule outputting an exhaustion signal indicating that the conductive target is spent when the prestored threshold rule is violated by at least one of the counted first discrete signals or the counted second discrete signals A system for regulating use of a conductive target at least one processor configured to receive from circuitry connected to a conductive target, a plurality of discrete first signals, each discrete first signal being indicative of a target zone hit at least one processor configured to receive from the circuitry connected to the conductive target, a plurality of discrete second signals, each discrete second signal being indicative of a conductive lead line hit at least one processor configured to count the plurality of discrete first signals and discrete second signals at least one processor configured to compare the counted discrete first signals and discrete second signals with a prestored threshold rule at least one processor configured to output an exhaustion signal indicating that the conductive target is spent when the prestored threshold rule is violated by at least one of the counted first discrete signals or the counted second discrete signals A non-transitory computer readable medium for automatically ascertaining a target identity associated with a disposable conductive target having an interface connectable to detachable electronics electrically probing the conductive target via the detachable electronics connected to the interface receiving at least one return signal in response to the probing, wherein the return single includes identity information from which an identity of the target is derivable causing a look up of the return signal in a data structure associating return signals with target identities to ascertain an identity of the target accessing auxiliary information associated with the identified target causing the auxiliary information to be presented to a shooter via a mobile communications device of the shooter wherein the target identity is a target type wherein the target type is represented by an alphanumerical code wherein the return signals correspond to an index value encoded in the interface wherein the return signals correspond to electrical responses of target zones on the conductive target wherein the electrical responses are associated with a conductivity of the target zones wherein the electrical responses are associated with a resistance of the target zones wherein the auxiliary information includes a graphical representation of the target, presented on the mobile communications device of the shooter wherein the graphical representation is augmented with one or more graphics or animations wherein the auxiliary information includes rules of a shooting game, presented on the mobile communications device of the shooter wherein the auxiliary information includes a plurality of shooting game options associated with the identified target prompting the shooter to select one of the shooting game options wherein the auxiliary information includes audio data to be presented via at least one speaker of the mobile communications device of the shooter wherein the auxiliary information includes graphical information to be presented on smart glasses of the shooter prompting the user to confirm the auxiliary information wherein causing a look up includes transmitting the identity information to a remote server via a wireless transmitter associated with the mobile communications device wherein causing a look up includes comparing the identity information with information stored on the mobile communications device A method for automatically ascertaining a target identity associated with a disposable conductive target electrically probing the conductive target via the detachable electronics connected to the interface receiving at least one return signal in response to the probing, wherein the return single includes identity information from which an identity of the target is derivable causing a look up of the return signal in a data structure associating return signals with target identities to ascertain an identity of the target accessing auxiliary information associated with the identified target causing the auxiliary information to be presented to a shooter via a mobile communications device of the shooter A system for automatically ascertaining a target identity associated with a disposable conductive target at least one processor configured to electrically probe the conductive target via the detachable electronics connected to the interface at least one processor configured to receive at lea % t one return signal in response to the probing, wherein the return single includes identity information from which an identity of the target is derivable at least one processor configured to cause a look up of the return signal in a data structure associating return signals with target identities to ascertain an identity of the target at least one processor configured to access auxiliary information associated with the identified target at least one processor configured to cause the auxiliary information to be presented to a shooter via a mobile communications device of the shooter A conductive target configured for selective connection to a connector containing external circuitry for counting target hits an electrical bus on the substrate, the electrical bus being configured for selective electrical connection to the external circuitry at least one electrically conductive target region on the substrate at least one conductive lead line on the substrate, the lead line electrically interconnecting the bus with the at least one target region at least one non-symmetrical perforation in the substrate adjacent the electrical bus, the at least one non-symmetrical perforation corresponding to at least one protrusion extending from the connector, to thereby prevent the connector from being incorrectly oriented during attachment to the target wherein the at least one perforation includes a plurality of holes wherein the at least one perforation includes a non-symmetrical pattern of perforations wherein the non-symmetry of the perforation pattern includes at least one of the perforations having a size that differs from at least one other of the plurality of perforations wherein the non-symmetry of the perforation pattern includes at least one of the perforations having an orientation that differs from at least one other of the plurality of perforations wherein the non-symmetry of the perforation pattern includes at least one of the perforations having a shape that differs from at least one other of the plurality of perforations wherein the non-symmetry of the perforation pattern includes a non-symmetry of spacing between adjacent perforations wherein the perforation pattern includes upper perforations and lower perforations, and the non-symmetry of the perforation pattern includes differing numbers of upper and lower perforations.

wherein the perforation pattern includes first side perforations and second side perforations, and the non-symmetry of the perforation pattern includes differing numbers of first side perforations and second side perforations wherein the at least one perforation includes a single perforation having a non-symmetrical shape wherein the non-symmetrical shape is a shape of at least one of an object or a logo wherein the substrate includes a printed graphic indicating an orientation of the connector wherein the printed graphic includes an outline having a shape corresponding to a shape of the connector wherein the printed graphic includes printed text wherein the electrical bus is configured such that the selective electrical connection with the external circuitry enables the external circuitry to detect the severance of electrically conductive circuit traces in the at least one target region wherein the substrate includes at least one layer of paper, plastic, cardboard, or wood wherein the at least one target region includes a plurality of target regions, and wherein each of the plurality of target regions are associated with a first set of conductive lead lines and a second set of conductive return lead lines wherein the at least one target region is configured such that when connected to control circuitry, an electrical signal emanating from the target region will change in response to severance of a portion of the conductive target pathways, regardless of a material composition of a projectile causing the severance wherein the conductive lead lines are printed on the substrate with conductive ink.

A non-transitory computer readable medium for enabling remote recording and comparison of shots fired at multiple disposable targets pairing a first wireless transmitter, temporarily attached to a first disposable target, with a first mobile communications device associated with a first shooter wirelessly receiving from the first transmitter, in a first wireless hop, signals indicative of projectile hits on the first disposable target accessing information indicative of an identity of the first shooter accessing an address of a remote server where a record associated with the first shooter is maintained causing a second wireless transmitter located in the first mobile communications device to transmit in a second hop to the remote server for storage in the first shooter's associated record, the information indicative of the first shooter's identity and information indicative of projectile hits on the first disposable target pairing a third wireless transmitter, temporarily attached to a second disposable target, with a second mobile communications device associated with a second shooter wirelessly receiving from the third wireless transmitter, in a third wireless hop, signals indicative of projectile hits on the second disposable target accessing information indicative of an identity of the second shooter accessing the address of the remote server where a record associated with the second shooter is maintained causing a fourth wireless transmitter located in the second mobile communications device to transmit in a fourth hop to the remote server for storage in the second shooter's associated record, the information indicative of the second shooter's identity and information indicative of projectile hits on the second disposable target transmitting for display to the second shooter on the second mobile communications device, information about the projectile hits on the first target by the first shooter transmitting for display to the first shooter on the first mobile communications device, information about she projectile hits on the second target by the second shooter wherein the first shooter is located in a first location and the second shooter is located in a second location, remote from the first location, and wherein the remote server is configured to establish a competition between the first shooter and the second shooter determining, prior to the second hop whether the mobile communications device has wireless connectivity to a network, and delaying transmission of the second hop until wireless connectivity is established wherein the mobile communications device is a cell phone wherein the mobile communications device is smart glasses receiving. in response to the second hop, information relating to the hits on target, and causing the mobile communications device to display the information wherein the information includes shooter statistics wherein the information includes game instructions wherein the information includes comparative data with other shooters who are participating in a common competition wherein the information includes comparative data about how current hits on target impact a status of the shooter in multiple competitions wherein the information includes an experience level of the first shooter or the second shooter.

wherein the information includes an indication of a winner of a competition determining the winner based on the projectile hits on the first target and the projectile hits on the second target causing the second mobile communications device to display an image representing the first disposable target with an indication of target hits on at least one target region of the first disposable target causing the first mobile communications device to display an image representing the second disposable target with an indication of target hits on at least one target region of the second disposable target receiving, from the first shooter or second shooter, an image associated with a shooting session, and wirelessly uploading the image to the remote server wherein the image is uploaded in a manner permitting others to view the image wherein accessing information indicative of the identity of the second shooter includes prompting the first shooter to provide the identity of the second shooter wherein displaying the competitive data includes presenting a leaderboard ranking a plurality of shooters competing in the common competition based on performance wherein the leaderboard includes shooters shooting at the same type of target establishing communication with a first mobile communications device associated with a first shooter, wherein the first mobile communications device is paired with a first wireless transmitter, temporarily attached to a first disposable target and wherein the first mobile communications device wirelessly receives from the first transmitter, in a first wireless hop, signals indicative of projectile hits on the first disposable target maintaining a first record associated with the first shooter receiving in a second hop via a second wireless transmitter located in the first mobile communications device information indicative of the first shooter's identity and first hit information indicative of projectile hits on the first disposable target storing the first hit information in association with the first record establishing communication with a second mobile communications device associated with a second shooter, wherein the second mobile communications device is paired with a third wireless transmitter, temporarily attached to a second disposable target and wherein the first mobile communications device wirelessly receives from the third transmitter, in a third wireless hop, signals indicative of projectile hits on the second disposable target maintaining a second record associated with the second shooter receiving in a fourth hop via a second wireless transmitter located in the second mobile communications device information indicative of the second shooter's identity and second hit information indicative of projectile hits on the second disposable target transmitting for display to the second shooter on the second mobile communications device, information about the projectile hits on the first target by the first shooter transmitting for display to the first shooter on the first mobile communications device, information about the projectile hits on the second target by the second shooter at least one processor configured to establish communication with a first mobile communications device associated with a first shooter, wherein the first mobile communications device is paired with a first wireless transmitter, temporarily attached to a first disposable target and wherein the first mobile communications device wirelessly receives from the first transmitter, in a first wireless hop, signals indicative of projectile hits on the first disposable target.

maintain a first record associated with the first shooter
receive in a second hop via a second wireless transmitter located in the first mobile communications device information indicative of the first shooter's identity and first hit information indicative of projectile hits on the first disposable target
store the first hit information in association with the first record
establish communication with a second mobile communications device associated with a second shooter, wherein the second mobile communications device is paired with a third wireless transmitter, temporarily attached to a second disposable target and wherein the first mobile communications device wirelessly receives from the third transmitter, in a third wireless hop, signals indicative of projectile hits on the second disposable target
maintain a second record associated with the second shooter
receive in a fourth hop via a second wireless transmitter located in the second mobile communications device information indicative of the second shooter's identity and second hit information indicative of projectile hits on the second disposable target
transmit for display to the second shooter on the second mobile communications device, information about the projectile hits on the first target by the first shooter
transmit for display to the first shooter on the first mobile communications device, information about the projectile hits on the second target by the second shooter
receiving from a mobile communications device of a shooter, target hit data obtained via electronic circuitry temporarily connected to a disposable conductive target
receiving from the mobile communications device of the shooter, identity information of the shooter
receiving from the mobile communications device of the shooter, GPS data reflective of a location where fired shots occurred, from which the target hit data was generated
updating a database, associating the location with the identity information of the shooter and the target hit data
storing data on a plurality of shooters and enabling output of the shooter data organized by shooting location
identifying at least one pattern within at least one of the target hit data and location data collected overtime for a particular shooter, and storing a notation of the identified pattern
transmitting the identified pattern to a shooting range associated with the location where the shots were fired
sending an offer to a wireless mobile communications device of the shooter based on the identified pattern
wherein the offer includes a promotion for a shooting range associated with the location where the shots were fired
wherein the offer includes a promotion for a merchant within a predetermined distance from the location where the shots were fired performing a lookup using the GPS data to ascertain a shooting range corresponding to the location where the shots were fired
wherein performing the lookup includes comparing the location to stored shooting range locations
wherein the database is configured to associate the identity information with target hit data from a plurality of differing shooting sessions on a plurality of differing days, and to output to the mobile communications device during a shooting session on a particular day, data reflecting prior shooting performance of the shooter
determining that the shooter has not previously been associated with the shooting range in the database
awarding to the shooter a badge associated with the shooting range
performing a lookup using the GPS data to ascertain a merchant corresponding to the location where the shots were fired
wherein performing the lookup includes comparing the location to a database of merchant locations
wherein ascertaining the merchant includes determining that the location is within a predetermined distance of the merchant
providing to the mobile communications device of the shooter, data indicative of the location
wherein the data indicative of the location includes a map
wherein the data indicative of the location includes a list of shooting ranges
receiving from a mobile communications device of a shooter, target hit data obtained via electronic circuitry temporarily connected to a disposable conductive target
receiving from the mobile communications device of the shooter, identity information of the shooter
receiving from the mobile communications device of the shooter. GPS data reflective of a location where fired shots occurred, from which the target hit data was generated
updating a database, associating the location with the identity information of the shooter and the target hit data
wherein the database is configured to associate the identity information with target hit data from a plurality of differing shooting sessions on a plurality of differing days, and to output to the mobile communications device during a shooting session on a particular day, data reflecting prior shooting performance of the shooter
at least one processor configured to receive from a mobile communications device of a shooter, target hit data obtained via electronic circuitry temporarily connected to a disposable conductive target
at least one processor configured to receive from the mobile communications device of the shooter. GPS data reflective of a location where fired shots occurred, from which the target hit data was generated
at least one processor configured to update a database, associating the location with the identity information of the shooter and the target hit data
wherein the database is configured to associate the identity information with target hit data from a plurality of differing shooting sessions on a plurality of differing days
wherein the at least one processor is configured to output to the mobile communications device during a shooting session on a particular day, data reflecting prior shooting performance of the shooter
a conductive target configured for use with projectiles meeting a caliber restriction
at least one conductive target region on a substrate
at least two spaced-apart conductive lead lines on the substrate and electrically connected to the at least one target region, wherein the at least two spaced-apart conductive lead lines are redundantly connected to the at least one target region in a manner enabling electrical detection of a target region hit after one of the redundant conductive lead lines is severed by a projectile meeting the caliber restriction, and wherein a spacing between the redundant conductive lead lines is greater than the caliber restriction wherein the spacing between the redundant conductive lead lines is at least one millimeter greater than a diameter of bullets of the caliber restriction wherein the spacing between the lead lines is at least 10 mm wherein the caliber restriction is 45 and wherein the spacing between the redundant lead lines is at least 12 mm wherein the plurality of redundant lead lines includes at least two redundant supply lead lines and at least two redundant return lead lines wherein a lead line width is no greater than 500 microns an electrical bus on the substrate, the electrical bus being configured for selective electrical connection to external circuitry at least one target region on the substrate, the at least one target region being electrically connected to the electrical bus, and being defined by a matrix of groups of electrically parallel resistors, wherein the groups are electrically arranged in series, and wherein the resistors an: configured for destruction by projectiles to thereby enable detection of hits in the at least one target region as the result of destroyed resistors wherein the at least one target region includes a plurality of spaced apart target regions lacking resistors therebetween wherein each of the plurality of spaced apart target regions is part of a distinct electrical circuit enabling independent detection of projectile hits in each target region wherein the resistors are formed by undulating conductive pathways wherein spacing between resistors is less than 11 mm further comprising a plurality of conductive lead lines electrically connecting the electrical bus to the at least one target region, wherein spacing between adjacent lead lines is greater than 11 mm and spacing between resistors is less than 11 mm wherein the at least one target region includes four spaced-part regions wherein the at least one target region includes five spaced-apart regions at least one target region on the substrate, the target region including a plurality of conductive target pathways a plurality of lead lines electrically connecting the electrical bus with the at least one target region at least one electrically conductive buffer zone located at a periphery of the plurality of conductive target pathways, for interconnecting the plurality of conductive target pathways with at least one of the plurality of lead lines, wherein the at least one buffer zone has a width greater than a lead line width and has a height at a connection point to the at least one of the plurality of lead lines that spaces the connection point a distance from an outer periphery location of the plurality of conductive pathways so that an electrical connection between the connection location and plurality of conductive pathways is protected from destruction by a projectile hit on an outer periphery of the target region wherein the buffer zone is formed of a plurality of electrical pathways between the connection point and the target region wherein a thickness of the plurality of electrical pathways is greater than a lead line thickness wherein the buffer zone tapers toward to the connection location wherein the buffer zone includes a plurality of spikes about the periphery of the target region, and wherein each spike includes a connection location wherein the spikes are electrically connected by peripheral buffer zone connection regions with electrical pathways wider than a lead line width and a width of conductive pathways in the target region wherein the at least one target zone has a supply buffer zone for connection to at least one supply lead and a return buffer zone for connection to at least one return lead wherein the supply buffer zone has a greater conductivity than a conductivity of the target region wherein a lead line width is no greater than 500 microns a method of making a smart target obtaining a sheet of material having a printable frontside and a printable backside printing on the backside, using conductive ink, at least one target region and a plurality of lead lines electrically connected to the at least one target region printing on the frontside, using non-conductive ink, a shooting image, the shooting image having at least one hit zone, wherein the at least one hit zone on the frontside is registered with the at least one target region on the backside to thereby enable a projectile striking the at least one registered hit zone on the frontside to electrically disturb an associated target region on the backside wherein the sheet of material is paper stock wherein the sheet of material is a polymer wherein the at least one target region includes a plurality of target regions electrically isolated from each other wherein printing on the backside includes printing a plurality of redundant lead lines wherein the redundant lead lines include at least two supply lead lines and at least two return lead lines to a single target region a single sheet of substrate having a frontside and a backside at least one electrically conductive target region printed in conductive ink on the backside a plurality of electronically conductive lead lines printed in conductive ink on the backside, the lead lines being electrically connected to the at least one target region a target image printed in non-conductive ink on the front side, wherein the target image includes at least one hit zone and wherein the at least one hit zone on the frontside is registered with the at least one target region on the backside so that a projectile striking the at least one registered hit zone on the frontside electrically disturbs an associated target region on the backside wherein the at least one electrically conductive target regions includes a first target region and a second target region, and wherein the at least one hit zone includes a first hit zone and a second hit zone, and wherein the first target region is registered with the first hit zone, and the second target region is registered with the second hit zone wherein the first target region is electrically separated from the second target region such that a projectile strike on the first region is electrically distinguishable from a projectile strike on the second region an electrical bus printed on the backside in conductive ink, and wherein the plurality of lead lines connect the electrical bus with the at least one target region wherein the conductive ink forming the plurality of lead lines has a conductivity differing from the conductive ink forming the at least one target region receiving from circuitry connected to the conductive target, a plurality of first discrete signals, each first discrete signal being indicative of a target area hit in a first of the plurality of electrically isolated target regions receiving from circuitry connected to the conductive target, a plurality of second discrete signals, each second discrete signal being indicative of a target area hit in a second of the plurality of electrically isolated target regions determining based on the discrete signals that the first of the plurality of electrically isolated target regions has sustained damage surpassing a damage threshold output a notification signal that the first of the plurality of electrically isolated target regions is disabled enable continued receipt of the second discrete signals thereby permitting a shooter to continue using the target to record hits in the second electrically isolated target region despite that the first electrically isolated target region is disabled wherein the notification signal includes information that causes a graphical indicator to appear on a graphical representation of the target wherein the graphical indication includes a color alteration on an image of the first electrically isolated target region wherein the graphical indication includes an icon on an image of the first electrically isolated target region receiving from the circuitry connected to the conductive target, a plurality of additional discrete signals, each additional discrete signal being indicative of a target area hit in additional electrically isolated target regions wherein as each additional target region sustains threshold-surpassing damage, additional notification signals are outputted indicating associated disablement wherein the damage threshold is based on a total number of hits counted in the first target area wherein the damage threshold is based on a quality of the discrete signals circuitry for use in connection with a conductive target having an electrical bus, at least one conductive target region, and a plurality of conductive lead lines electrically connecting the bus to the at least one target region at least one processor configured to initiate a damage check of the conductive target, after electrical connection of the at least one processor to the bus and before the at least one processor enables usage of the conductive target at least one processor configured to analyze, during the damage check, return signals from the conductive target to determine whether at least one of the at least one target region or at least one of the plurality of conductive lead lines is damaged at least one processor configured to upon a damage determination, output a damage signal indicating that at least some of the at least one conductive target area is non-functional wherein the circuitry includes a wireless transmitter and wherein the at least one processor is configured to output, via the wireless transmitter, the damage signal to a mobile communications device for displaying to a shooter an indication of non-functionality of the conductive target wherein the indication of non-functionality includes a text indicating that at least a portion of the target is non-functional wherein the indication of non-functionality includes a graphical representation of a portion of the conductive target that is non-functional wherein during analyzing, the at least one processor is configured to determine an extent of target damage, and to output the damage signal when the determined extent of target damage surpasses a threshold wherein the damage check includes sending at least one voltage through the plurality of lead lines and measuring, via the bus, resulting electrical output signals a conductive target system a housing configured to be selectively attachable to and detachable from a disposable conductive target having an electrical bus located adjacent a lower edge region thereof and having at least one opening therethrough in a vicinity of the electrical bus at least one protrusion associated with the housing and being configured to align with and extend through the at least one opening a manner enabling the housing to hang from and be supported by the lower edge region of the conductive target electronic circuitry in the housing, the electronic circuitry including electrical contacts configured to be aligned with and to make electrical contact with the bus when the at least one protrusion extends through the at least one opening and the housing hangs from the lower edge region wherein the at least one opening includes a plurality of openings and the at least one protrusion includes a plurality of protrusions wherein the at least one protrusion is integral with the housing wherein the housing includes a clip for maintaining the at least one protrusion in the at least one opening wherein the at least one protrusion is configured to form the at least one opening by pressing against at least one perforated area in the target wherein the circuitry includes a wireless transmitter configured to transmit to a mobile communications device of a shooter information about target hits wherein the conductive target is configured to exert a downward force on the hanging target and thereby stabilize the lower edge region of the target causing a mobile communications device of a shooter to pair with electronics connected to a conductive target present to the shooter via the mobile communications device at least one shooting command receive from the electronics connected to the conductive target, target-hit information compare the target-hit information with the shooting command to determine compliance of the shooter with the shooting command provide compliance feedback to the user via the mobile communications device wherein the at least one command directs the shooter to hit a particular portion of the conductive target, and wherein the feedback advises the user whether the particular portion of the target was hit wherein the particular portion is defined by a color wherein the particular portion is an image of a character on the target wherein the particular portion is an image of a body part on the target wherein the at least one command directs the shooter to score hits within a prescribed time period, and wherein the feedback advises the user of a number of complying hits during the prescribed time period wherein the at least one command directs the shooter to hit portions of the target in a particular sequence wherein the at least one command is part of a game wherein the at least one command includes a sequence of commands, with each command in the sequence being provided between target hits an electrical bus on the substrate, the electrical bus being configured for selective electrical connection to the external circuitry five conductive target regions on the substrate, including a first conductive target region, a second conductive target region, a third conductive target region, a fourth conductive target region, and a fifth conductive target region a plurality of supply lead lines and return lead lines interconnecting the bus with each of the rive conductive target regions, wherein each of the five conductive target regions is connected to a plurality of supply lead lines and a plurality of return lead lines, wherein the lead lines associated with the first conductive target region approach the first conductive target region from a side of the first conductive target region facing the bus, and wherein the lead lines associated with the second conductive target region, the third conductive target region, the fourth conductive target region, and the fifth conductive target region approach each respective target region from directions other than from a direction of the bus wherein the lead lines associated with the first conductive target region connect to a side of the first conductive target region facing the bus, and wherein the lead lines associated with the second conductive target region, the third conductive target region, the fourth conductive target region, and the fifth conductive target region connect to sides of each respective target region that do not face the bus wherein the supply lead lines associated with the second conductive target region, the third conductive target region, the fourth conductive target region, and the fifth conductive target region connect to one side of the target region, and wherein the return lead lines associated with the second conductive target region, the third conductive target region, the fourth conductive target region, and the fifth conductive target region connect to a side of an associated target region opposite the side to which the supply lead lines are connected.

wherein each of the five conductive target regions are connected to at least three supply lead lines and a least three return lead lines Systems and methods disclosed herein involve unconventional improvements over conventional approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure may be implemented as hardware alone.

Computer programs based on the written description and methods of this specification are within the skill of a software developer. The various functions, scripts, programs, or modules may be created using a variety of programming techniques. For example, programs, scripts, functions, program sections or program modules may be designed in or by means of languages, including JAVASCRIPT, C. C++, JAVA, PHP, PYTHON. RUBY, PERL. BASH, or other programming or scripting languages. One or more of such software sections or modules may be integrated into a computer system, non-transitory computer readable media, or existing communications software. The programs, modules, or code may also be implemented or replicated as firmware or circuit logic.

Moreover, while illustrative embodiments have been described herein, the scope may include any and all embodiments having equivalent elements, modifications, omissions, combinations (e.g., of aspects across various embodiments, adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. Circuitry for use in connection with a conductive target having an interface, at least one conductive target zone and a plurality of conductive lead lines electrically connecting the interface to the at least one conductive target zone, the circuitry comprising:
    at least one processor configured to:
        detect via the interface, a plurality of first electrical signals representing severance of portions of the at least one conductive target zone by projectile hits within the at least one conductive target zone;
        detect via the interface a plurality of second electrical signals, different from the first electrical signals, wherein the second electrical signals represent severance of the plurality of lead lines by projectile hits on one of the plurality of lead lines;
        trigger an indicator of a target hit in response to at least one of the first electrical signals; and
        prevent triggering of the target hit indicator in response to at least one of the second electrical signals.

2. The circuitry of claim 1, wherein the at least one of the first electrical signals is a first resistance and the at least one of the second electrical signals is a second resistance, different from the first resistance, and wherein the at least one processor is configured to distinguish between the first resistance and the second resistance.

3. The circuitry of claim 1, further comprising a wireless transmitter and wherein the at least one processor is configured to cause the indicator to be transmitted, via the wireless transmitter, to a mobile communications device.

4. The circuitry of claim 3, wherein the indicator is configured to cause, on a display of the mobile communications device, an indication of the target hit.

5. The circuitry of claim 4, wherein the indication of the target hit includes a display of alphanumeric characters.

6. The circuitry of claim 4, wherein the indication of the target hit includes a graphical presentation of at least one of an image or animation.

7. The circuitry of claim 4, wherein the indication of the target hit includes an update to a counter presented on the display.

8. The circuitry of claim 3, wherein the indicator is configured to cause on the mobile communications device an audible signal indicating the target hit.

9. The circuitry of claim 1, further comprising a display device and wherein the at least one processor is configured to cause an indication of the target hit to be displayed on the display device.

10. The circuitry of claim 1, wherein the display device comprises an indicator light.

11. The circuitry of claim 1, wherein the at least one processor is configured to record, in a memory location, an indication of the at least one of the second signals.

12. The circuitry of claim 11, wherein the memory location includes memory of a mobile communications device.

13. The circuitry of claim 11, wherein the memory location includes a remote server.

14. The circuitry of claim 1, wherein each of the first electrical signals and second electrical signals include a resistance, and wherein the at least one processor is further configured to track a cumulative resistance change from the first electrical signals and the second electrical signals.

15. The circuitry of claim 14, wherein the at least one processor is further configured to prevent triggering of the target hit indicator based on the cumulative resistance change.

16. The circuitry of claim 15, wherein preventing triggering of the target hit indicator based on the cumulative resistance change includes comparing the cumulative resistance change to a predetermined threshold.

17. The circuitry of claim 1, wherein the at least one of the first electrical signals is a first change in conductivity and the at least one of the second electrical signals is a second change in conductivity, different from the first change in conductivity, and wherein the at least one processor is configured to distinguish between the first change in conductivity and the second change in conductivity.

18. The conductive target of claim 1, wherein preventing triggering of the target hit indicator includes blocking triggering of the target hit indicator.

19. The conductive target of claim 1, wherein preventing triggering of the target hit indicator includes ignoring the second signal.

20. A method for use in connection with a conductive target having an interface, at least one conductive target zone and a plurality of conductive lead lines electrically connecting the interface to the at least one conductive target zone, the method comprising:
  detecting via the interface, a plurality of first electrical signals representing severance of portions of the at least one conductive target zone by projectile hits within the at least one conductive target zone;
  detecting via the interface a plurality of second electrical signals, different from the first electrical signals, wherein the second signals represent severance of of the plurality of lead lines by projectile hits on one of the plurality of lead lines;
  triggering an indicator of a target hit in response at least one of the first electrical signals; and
  preventing triggering of the target hit indicator in to at least one of the second electrical signals.

21. A non-transitory computer readable medium for use in connection with a conductive target having an interface, at least one conductive target zone and a plurality of conductive lead lines electrically connecting the interface to the at least one conductive target zone, the computer readable medium containing instructions that when executed by at least one processor, cause the at least one processor to perform a method, the method comprising:
  detecting via the interface, a plurality of first electrical signals representing severance of portions of the at least one conductive target zone by projectile hits within the at least one conductive target zone;
  detecting via the interface a plurality of second electrical signals, different from the first electrical signals, wherein the second signals represent severance of of the plurality of lead lines by projectile hits on one of the plurality of lead lines;
  triggering an indicator of a target hit in response at least one of the first electrical signals; and
  preventing triggering of the target hit indicator in to at least one of the second electrical signals.

* * * * *